(12) United States Patent
Martin-Cocher et al.

(10) Patent No.: US 12,322,145 B2
(45) Date of Patent: Jun. 3, 2025

(54) ANGULAR MODE SYNTAX FOR TREE-BASED POINT CLOUD CODING

(71) Applicant: BlackBerry Limited, Waterloo (CA)

(72) Inventors: Gaelle Christine Martin-Cocher, Waterloo (CA); Jonathan Taquet, Talensac (FR); Sébastien Lasserre, Thorigné-Fouillard (FR)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 17/765,042

(22) PCT Filed: Oct. 1, 2020

(86) PCT No.: PCT/CA2020/051297
§ 371 (c)(1),
(2) Date: Mar. 30, 2022

(87) PCT Pub. No.: WO2021/062530
PCT Pub. Date: Apr. 8, 2021

(65) Prior Publication Data
US 2022/0351423 A1    Nov. 3, 2022

(30) Foreign Application Priority Data
Oct. 1, 2019   (EP) .................................. 19200891

(51) Int. Cl.
*G06T 9/40*    (2006.01)
(52) U.S. Cl.
CPC ...................... *G06T 9/40* (2013.01)
(58) Field of Classification Search
CPC ......... G06T 9/40; G06T 9/001; H04N 19/597; H04N 19/70; H04N 19/96
See application file for complete search history.

(56) References Cited

U.S. PATENT DOCUMENTS 11,871,037 B2   1/2024   Ramasubramonian
11,941,855 B2   3/2024   Ray et al.
(Continued)

FOREIGN PATENT DOCUMENTS

CN      105678076       6/2016
WO   WO2016003340      1/2016
(Continued)

OTHER PUBLICATIONS

Kathariya et al., Scalable Point Cloud Geometry Coding with Binary Tree Embedded Quadtree, 2018, IEEE International Conference on Multimedia and Expo, pp. 1-7 (Year: 2018).*
(Continued)

*Primary Examiner* — Kathleen M Broughton
(74) *Attorney, Agent, or Firm* — Conley Rose, P.C.; J. Robert Brown, Jr.

(57) ABSTRACT

Method and devices for coding point cloud data using an angular coding mode. The angular coding mode may be signaled using in an angular mode flag to signal that a volume is to be coded using the angular coding mode. The angular coding mode is applicable to planar volumes that have all of their occupied child nodes on one side of a plane bisecting the volume. A planar position flag may signal which side of the volume is occupied. Entropy coding may be used to code the planar position flag. Context determination for coding may take into account angular information for child nodes or groups of child nodes of the volume relative to a location of a beam assembly that has sampled to point cloud. Characteristics of the beam assembly may be coded into a dedicated syntax in the bitstream.

17 Claims, 21 Drawing Sheets

(56) References Cited

U.S. PATENT DOCUMENTS

| | | | |
|---|---|---|---|
| 2019/0051017 A1* | 2/2019 | Beek | G06T 7/521 |
| 2019/0087978 A1 | 3/2019 | Tourapis et al. | |
| 2019/0087979 A1* | 3/2019 | Mammou | H04N 19/597 |
| 2019/0131721 A1 | 5/2019 | Dani et al. | |
| 2021/0327095 A1 | 10/2021 | Van der Auwera et al. | |
| 2021/0327098 A1 | 10/2021 | Ray et al. | |
| 2021/0327099 A1 | 10/2021 | Van der Auwera et al. | |
| 2021/0407143 A1 | 12/2021 | Van der Auwera et al. | |
| 2021/0409778 A1 | 12/2021 | Ramasubramonian et al. | |
| 2022/0337872 A1 | 10/2022 | Park et al. | |
| 2022/0353549 A1* | 11/2022 | Lasserre | H04N 19/167 |
| 2022/0358686 A1* | 11/2022 | Lasserre | H04N 19/96 |
| 2022/0376702 A1* | 11/2022 | Lasserre | G06T 9/004 |
| 2022/0398784 A1* | 12/2022 | Taquet | G06T 9/40 |

FOREIGN PATENT DOCUMENTS

| | | |
|---|---|---|
| WO | WO2019081087 | 5/2019 |
| WO | WO2020119487 | 6/2020 |
| WO | WO2020189982 | 9/2020 |

OTHER PUBLICATIONS

Chu et al., Off-axis points encoding/decoding with orbital angular momentum spectrum, 2017, Scientific Reports 7:43757, pp. 1-9. (Year: 2017).*

Dybedal et al., Embedded Processing and Compression of 3D Sensor Data for Large Scale Industrial Environments, 2019, Sensors 19 (636): 1-20. (Year: 2019).*

Ahn et al., Large Scale 3D Point Cloud Compression Using Adaptive Radial Distance Prediction in Hybrid Coordinate Domains, 2015, 9(3): 422- 434. (Year: 2015).*

Sun et al., A Novel Point Cloud Compression Algorithm Based on Clustering, 2019, IEEE Robotics and Automation Letters, 4(2) 2132-2139. (Year: 2019).*

Holenstein et al., Watertight Surface Reconstruction of Caves from 3D Laser Data, 2011, IEEE International Conference on Intelligent Robots and Systems, pp. 1-8. (Year: 2011).*

Sebastien Lasserre et al. "An improvement of the planar coding mode" ISO/IEC JTC1/SC29/WG11 MPEG2019/m50642 Oct. 2019, Geneva, CH.

Chenxi Tu et al. "Real-Time Streaming Point Cloud Compression for 3D LiDAR Sensor Using U-Net" Received Jun. 25, 2019, accepted Aug. 2, 2019, date of publication Aug. 14, 2019, date of current version Aug. 28, 2019.

Armin Hornung et al. "OctoMap: An Efficient Probabilistic 3D Mapping Framework Based on Octrees" Autonomous Robots (2013) Preprint, final version available at DOI 10.1007/s10514-012-9321-0.

Sebastian Schwarz et al. "Emerging MPEG Standards for Point Cloud Compression" IEEE Journal on Merging and Selected Topics in Circuits and Systems, vol. 9, No. 1, Mar. 2019.

"G-PCC codec description v4" ISO/IEC JTC1/SC29/WG11 N18673 Jul. 2019, Gothenburg, SE.

Sebastien Lasserre et al. "An Improvement of the planar coding mode The angular coding mode" (CE 13.22 related) m50642.

The Extended European Search Report, EP Application No. 19200891.0 dated Mar. 20, 2020.

KR Office Action, Appln No. 9-5-2024-079100346 Sep. 19, 2024.

US Office Action, U.S. Appl. No. 17/765,015 dated Jun. 12, 2024.

Notice of Submission of Opinion, KR Application No. 10-2022-7014079 dated Oct. 21, 2024.

EESR, European Application No. 19200890.2 dated Mar. 20, 2020.

ISR, PCT/CA2020/051295 dated Dec. 23, 2020.

Progressive compression and transmission of PointTexture images; In-Wook Song et al.; Available online at www.sciencedirect.com; Received Apr. 19, 2025; accepted Oct. 13, 2005; Available online Nov. 29, 2005.

Dynamic 3D Point Cloud Compression; Miguel Branco Roque Nazare Fereira; Nov. 2017.

* cited by examiner (a)

(b)

ANGULAR MODE SYNTAX FOR TREE-BASED POINT CLOUD CODING

FIELD

The present application generally relates to point cloud compression and, in particular to methods and devices for improved compression of occupancy data in tree-based coding of point clouds.

BACKGROUND

Data compression is used in communications and computer networking to store, transmit, and reproduce information efficiently. There is an increasing interest in representations of three-dimensional objects or spaces, which can involve large datasets and for which efficient and effective compression would be highly useful and valued. In some cases, three-dimensional objects or spaces may be represented using a point cloud, which is a set of points each having a three coordinate location (X, Y, Z) and, in some cases, other attributes like color data (e.g. luminance and chrominance), transparency, reflectance, normal vector, etc. Point clouds can be static (a stationary object or a snapshot of an environment/object at a single point in time) or dynamic (a time-ordered sequence of point clouds).

Example applications for point clouds include topography and mapping applications. Autonomous vehicle and other machine-vision applications may rely on point cloud sensor data in the form of 3D scans of an environment, such as from a LiDAR scanner. Virtual reality simulations may rely on point clouds.

It will be appreciated that point clouds can involve large quantities of data and compressing (encoding and decoding) that data quickly and accurately is of significant interest. Accordingly, it would be advantageous to provide for methods and devices that more efficiently and/or effectively compress data for point clouds. Such methods may result in savings in storage requirements (memory) through improved compression, or savings in bandwidth for transmission of compressed data, thereby resulting in improved operation of 3D vision systems, such as for automotive applications, or improved speed of operation and rendering of virtual reality systems, as examples.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
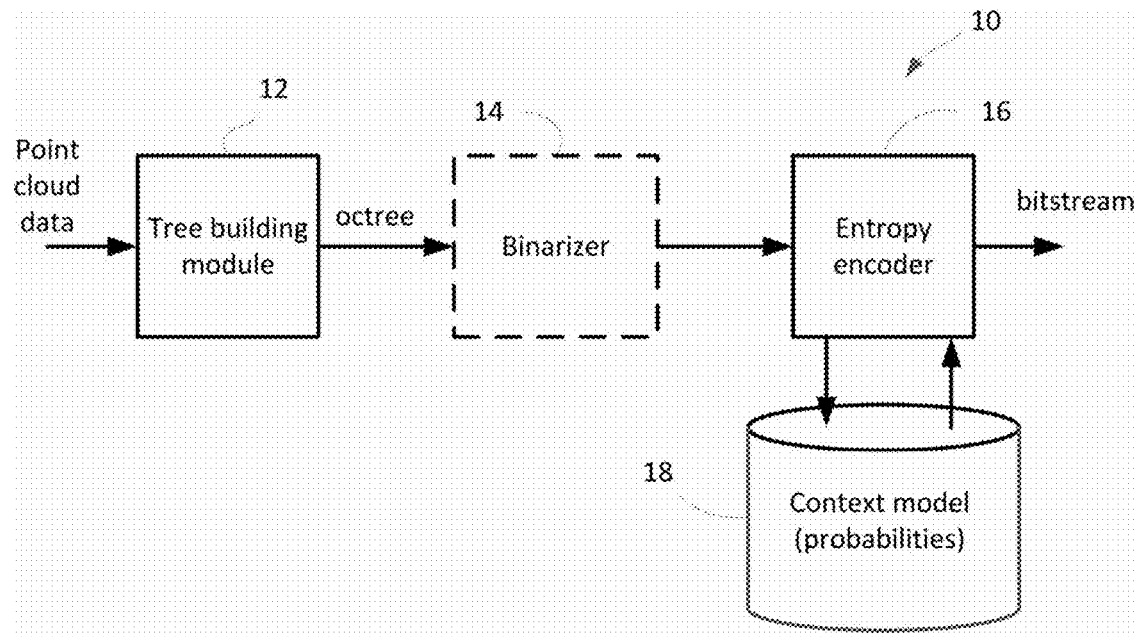
FIG. 1 shows a simplified block diagram of an example point cloud encoder.

The present application describes methods of encoding and decoding point clouds, and encoders and decoders for encoding and decoding point clouds.

In one aspect, the present application describes a method of encoding a point cloud to generate a bitstream of compressed point cloud data representing a three-dimensional location of an object, the point cloud being located within a volumetric space recursively split into sub-volumes and containing points of the point cloud, wherein a volume is partitioned into a first set of child sub-volumes and a second set of child sub-volumes, the first set of child sub-volumes being positioned in a first plane and the second set of child sub-volumes being positioned in a second plane parallel to the first plane, and wherein an occupancy bit associated with each respective child sub-volume indicates whether that respective child sub-volume contains at least one of the points. The method may include determining whether the volume is planar based on whether all child sub-volumes containing at least one point are positioned in either the first set or the second set; encoding in the bitstream a planar mode flag to signal whether the volume is planar; encoding in the bitstream occupancy bits for the child sub-volumes of the first set including, for at least one occupancy bit, inferring its value and not encoding it in the bitstream based on whether the volume is planar; and outputting the bitstream of compressed point cloud data.

In another aspect, the present application describes a method of decoding a bitstream of compressed point cloud data to produce a reconstructed point cloud representing a three-dimensional location of a physical object, the point cloud being located within a volumetric space recursively split into sub-volumes and containing points of the point cloud, wherein a volume is partitioned into a first set of child sub-volumes and a second set of child sub-volumes, the first set of child sub-volumes being positioned in a first plane and the second set of child sub-volumes being positioned in a second plane parallel to the first plane, and wherein an occupancy bit associated with each respective child sub-volume indicates whether that respective child sub-volume contains at least one of the points. The method may include reconstructing the points of the point cloud by reconstructing the occupancy bits by decoding from the bitstream a planar mode flag that indicates whether the volume is planar, wherein the volume is planar if all child sub-volumes containing at least one point are positioned in either the first set or the second set; and decoding from the bitstream occupancy bits for the child sub-volumes of the first set including, for at least one occupancy bit, inferring its value and not decoding it from the bitstream based on whether the volume is planar.

In some implementations, determining whether the volume is planar may include determining that the volume is planar by determining that at least one of the child sub-volumes in the first set contains at least one of the points and that none of the child sub-volumes in the second set contain any of the points, and the method may further include, based on the volume being planar, encoding a planar position flag to signal that said at least one of the child sub-volumes is in the first plane. In such implementations, in some cases encoding occupancy bits includes refraining from coding occupancy bits associated with the second set and inferring values for the occupancy bits associated with the second set based on the second set containing no points. Encoding occupancy bits may further include inferring a last one of the occupancy bits associated with the first set in coding order to have a value indicating occupied based on determining that all other occupancy bits of the first set in the coding order have a value indicating unoccupied.

In some implementations, determining whether the volume is planar includes determining that the volume is not planar and, on that basis, encoding occupancy bits based on at least one of the occupancy bits in the first set and at least one of the occupancy bits in the second set having a value indicating occupied.

In some implementations, the point cloud is defined with respect to a Cartesian axis in the volumetric space, the Cartesian axis having a vertically-oriented z-axis normal to a horizontal plane, and the first plane and the second plane are parallel to the horizontal plane. In some other implementations, the first plane and the second plane are orthogonal to the horizontal plane.

In some implementations, the method includes first determining that the volume is eligible for planar mode coding. Determining that the volume is eligible for planar mode coding may include determining a probability of planarity and determining that the probability of planarity is greater than a threshold eligibility value.

In some implementations, encoding the planar mode flag may include encoding a horizontal planar mode flag and encoding a vertical planar mode flag.

In yet another aspect, the present application describes a method of encoding a point cloud to generate a bitstream of compressed point cloud data representing a three-dimensional location of an object, the point cloud being located within a volumetric space recursively split into sub-volumes and containing points of the point cloud, wherein a volume is partitioned into a first set of child sub-volumes and a second set of child sub-volumes, the first set of child sub-volumes being positioned in a first plane and the second set of child sub-volumes being positioned in a second plane parallel to the first plane, and wherein an occupancy bit associated with each respective child sub-volume indicates whether that respective child sub-volume contains at least one of the points, both the first plane and the second plane being orthogonal to an axis. The method may include determining whether the volume is planar based on whether all child sub-volumes containing at least one point are positioned in either the first set or the second set; entropy encoding in the bitstream a planar mode flag to signal whether the volume is planar, wherein entropy encoding includes determining a context for coding the planar mode flag based, in part, on one or more of: (a) whether a parent volume containing the volume is planar in occupancy, (b) occupancy of a neighboring volume at a parent depth, the neighboring volume being adjacent the volume and having a face in common with the parent volume, or (c) a distance between the volume and a closest already-coded occupied volume at a same depth as the volume and having a same position on the axis as the volume; encoding occupancy bits for at least some of the child sub-volumes; and outputting the bitstream of compressed point cloud data.

In a further aspect, the present application describes a method of decoding a bitstream of compressed point cloud data to produce a reconstructed point cloud representing a three-dimensional location of a physical object, the point cloud being located within a volumetric space recursively split into sub-volumes and containing points of the point cloud, wherein a volume is partitioned into a first set of child sub-volumes and a second set of child sub-volumes, the first set of child sub-volumes being positioned in a first plane and the second set of child sub-volumes being positioned in a second plane parallel to the first plane, and wherein an occupancy bit associated with each respective child sub-volume indicates whether that respective child sub-volume contains at least one of the points, both the first plane and the second plane being orthogonal to an axis. The method may include reconstructing the points of the point cloud by reconstructing the occupancy bits by entropy decoding from the bitstream a planar mode flag that indicates whether the volume is planar, wherein the volume is planar if all child sub-volumes containing at least one point are positioned in either the first set or the second set, wherein entropy decoding includes determining a context for decoding the planar mode flag based, in part, on one or more of: (a) whether a parent volume containing the volume is planar in occupancy, (b) occupancy of a neighboring volume at a parent depth, the neighboring volume being adjacent the volume and having a face in common with the parent volume, or (c) a distance between the volume and a closest already-coded occupied volume at a same depth as the volume and having a same position on the axis as the volume; and reconstructing occupancy bits for the child sub-volumes.

In some implementations, the parent volume containing the volume is planar in occupancy if a parent planar mode flag indicates that the parent volume is planar.

In some implementations, the distance is near or far and may be based on calculating a distance metric and comparing it to a threshold.

In some implementations, determining the context for coding the planar mode flag may be based on a combination of (a), (b) and (c).

In some implementations, determining whether the volume is planar includes determining that the volume is planar and, as a result, entropy encoding a plane position flag to signal whether the at least one point is positioned in the first set or the second set. Entropy encoding the plane position flag may include determining a context for coding the plane position flag. Determining a context may be based, in part, on one or more of: (a') occupancy of the neighboring volume at the parent depth; (b') the distance between the volume and the closest already-coded occupied volume; (c') a plane position, if any, of the closest already-coded occupied volume; or (d') a position of the volume within the parent volume. In some cases, determining the context for coding the plane position flag may be based on a combination of three or more of (a'), (b'), (c'), and (d').

In some implementations, the distance is near, not too far, or far and may be based on calculating a distance metric and comparing it to a first threshold and a second threshold.

In a further aspect, the present application describes a method of encoding a point cloud (e.g., a geometry of a point cloud) acquired by means of a beam assembly comprising a set of beams, to generate a bitstream of compressed point cloud data The point cloud (e.g., the geometry of the point cloud) may be defined in a tree structure (e.g., by a tree structure) having a plurality of nodes having parent-child relationships and representing a three-dimensional location of an object. Moreover, the point cloud may be located within a volumetric space recursively split into sub-volumes and containing points of the point cloud. A volume may be partitioned into a set of child sub-volumes. An occupancy bit associated with each respective child sub-volume may indicate whether that respective child sub-volume contains at least one of the points. The method may include, for a current node associated with a volume split into child sub-volumes, determining an occupancy pattern for the volume based on occupancy statuses of the child sub-volumes of the volume. The method may further include entropy encoding a representation of the occupancy pattern into the bitstream. Therein, entropy encoding the occupancy pattern may include determining angular information for child sub-volumes or groups of child sub-volumes of the volume. The angular information may be indicative of one or more elevation angles relative to a location associated with the beam assembly within the volumetric space. Entropy encoding the occupancy pattern may further include determining a context for encoding the representation of the occupancy pattern based on the angular information. Entropy encoding the occupancy pattern may yet further include entropy encoding the representation of the occupancy pattern using the determined context.

In a further aspect, the present application describes a method of decoding a bitstream of compressed point cloud data to generate a reconstructed point cloud (e.g., a geometry of a reconstructed point cloud). The point cloud (e.g., the geometry of the point cloud) may have been acquired by means of a beam assembly comprising a set of beams. The point cloud may be defined in a tree structure (e.g., by a tree structure) having a plurality of nodes having parent-child relationships and representing a three-dimensional location of an object. Moreover, the point cloud may be located within a volumetric space recursively split into sub-volumes and containing points of the point cloud. A volume may be partitioned into a set of child sub-volumes. An occupancy bit associated with each respective child sub-volume may indicate whether that respective child sub-volume contains at least one of the points. The method may include, for a current node associated with a volume split into child sub-volumes, determining angular information for child sub-volumes or groups of child sub-volumes of the volume. The angular information may be indicative of one or more elevation angles relative to a location associated with the beam assembly within the volumetric space (and, e.g., relative to a plane, such as the horizontal plane, containing the location associated with the beam assembly). The method may further include determining a context for decoding a representation of an occupancy pattern of the volume based on the angular information. The occupancy pattern may indicate occupancy statuses of the child sub-volumes of the volume. The method may further include entropy decoding the bitstream to generate a reconstructed representation of the occupancy pattern using the determined context.

In some implementations, determining the angular information may include determining a first elevation angle for a reference location within the volume relative to a reference location of the beam assembly. Determining the angular information may further include determining a specific beam that is assumed to have acquired the points within the volume, based on the first elevation angle. Determining the angular information may further include determining an origin location of the specific beam. Determining the angular information may yet further include determining the one or more elevation angles for child sub-volumes or groups of child sub-volumes of the volume relative to the origin location of the specific beam.

In some implementations, the method may further include first determining that the volume is eligible for determining the context based on the angular information by determining a measure of an angular size of the volume as seen from a reference location of the beam assembly. Determining that the volume is eligible may further include comparing the measure of the angular size to a measure of a difference angle between adjacent beams of the beam assembly. Determining that the volume is eligible may yet further include determining, based on a result of the comparison, that the volume is eligible for determining the context based on the angular information.

In some implementations, a planar volume may be a volume, partitioned into a plurality of sets of child sub-volumes in respective parallel planes, for which all child sub-volumes containing at least one point are positioned in the same plane. Then, determining the context for coding the representation of the occupancy pattern may include determining a context for coding a plane position flag based on the angular information. The plane position flag may signal a position of the plane in which the child sub-volumes containing at least one point are positioned. Further, entropy coding the representation of the occupancy pattern may include entropy coding the plane position flag using the determined context.

In some implementations, determining the angular information may include determining respective elevation angles for each of the plurality of parallel planes, relative to the origin location of the specific beam. Determining the context for coding the plane position flag may include comparing the respective elevation angles for each of the plurality of parallel planes to a beam angle of the specific beam (e.g., by computing differences between respective angles). Determining the context for coding the plane position flag may further include determining the context for coding the plane position flag based on results of respective comparisons.

In some implementations, determining the context for coding the plane position flag based on results of respective comparisons may be based on at least one of differences between the beam angle of the specific beam and respective elevation angles for each of the plurality of parallel planes, magnitudes of differences between the beam angle of the specific beam and respective elevation angles for each of the plurality of parallel planes, and/or a quantization result of a difference between a largest one among magnitudes of differences between the beam angle of the specific beam and respective elevation angles for each of the plurality of parallel planes and a smallest one among magnitudes of differences between the beam angle of the specific beam and respective elevation angles for each of the plurality of parallel planes.

In some implementations, determining the context for coding the representation of the occupancy pattern may include determining contexts for coding occupancy bits for child sub-volumes of the volume. Then, entropy coding the representation of the occupancy pattern may include entropy coding the occupancy bits using the determined contexts.

In some implementations, determining the angular information may include determining respective elevation angles for each of the child sub-volumes of the volume, relative to the origin location of the specific beam. Determining the contexts for coding occupancy bits for child sub-volumes of the volume may include comparing the respective elevation angles for each of the child sub-volumes of the volume to a beam angle of the specific beam. Determining the contexts for coding occupancy bits for child sub-volumes of the volume may further include determining the contexts for coding occupancy bits for child sub-volumes of the volume based on results of respective comparisons.

In some implementations, the beam assembly may be a rotating beam assembly. The point cloud may be defined with respect to a Cartesian axis in the volumetric space. The Cartesian axis may have a vertically oriented z-axis normal to a horizontal plane and substantially parallel to an axis of rotation of the rotating beam assembly.

In some implementations, the bitstream may include one or more parameters describing characteristics of the beam assembly.

In a further aspect, the present application describes a method of decoding a bitstream of compressed point cloud data to generate a reconstructed point cloud. The point cloud may have been acquired by means of a set of beams. Further, the point cloud may be located within a volumetric space recursively split into sub-volumes and containing points of the point cloud. The method may include decoding, from the bitstream, a first parameter indicative of whether an angular mode shall be used for coding point cloud data. The method may further include, if the first parameter indicates that point cloud data shall be coded using the angular mode, decoding, from the bitstream, first angular information relating to beam angles of the set of beams relative to respective beam origin locations. The method may further include, for a current volume split into sub-volumes, determining second angular information relating to angles of sub-volumes or groups of sub-volumes of the volume relative to a location associated with the set of beams. The method may yet further include decoding the point cloud data for the volume based on the first angular information and the second angular information.

In some implementations, decoding the first angular information may include, for a beam assembly comprising at least some beams of the set of beams, decoding, from the bitstream, a second parameter indicative of a number of beams in the beam assembly and determining the number of beams in the beam assembly based on the second parameter. The method may further include, for each beam among the number of beams indicated by the second parameter, decoding, from the bitstream, one or more third parameters indicative of the beam origin location of the respective beam.

In some implementations, decoding the one or more third parameters indicative of a beam origin location of the respective beam may include decoding a parameter indicative of whether the beam origin location of the beam is expressed relative to a reference location of the beam assembly. Decoding the one or more third parameters may further include, if the beam origin location of the beam is expressed relative to a reference location of the beam assembly, decoding a parameter indicative of a coordinate of the beam origin location of the beam along a main axis of the beam assembly. Decoding the one or more third parameters may further include, if the beam origin location of the beam is expressed relative to a reference location of the beam assembly, decoding a parameter indicative of whether the beam origin location is displaced from the main axis of the beam assembly. Decoding the one or more third parameters may yet further include, if the beam origin location of the beam is expressed relative to a reference location of the beam assembly, and if the beam origin location is displaced from the main axis of the beam assembly, decoding a parameter expressing a displacement of the beam origin location from the main axis of the beam assembly.

In some implementations, decoding the first angular information may include checking whether the bitstream comprises a fourth parameter indicative of a number of beam assemblies that each comprise at least some beams of the set of beams, and if so, decoding the fourth parameter from the bitstream. Decoding the first angular information may further include, if the fourth parameter is not present or is equal to zero, inferring the number of beam assemblies to be one. Decoding the first angular information may yet further include, if the fourth parameter is equal to one, decoding a fifth parameter that is indicative of a number of beam assemblies minus two.

In some implementations, decoding the first angular information may include, for a beam assembly comprising at least some beams of the set of beams, checking whether the bitstream comprises a sixth parameter indicative of whether a reference location of the beam assembly is at the origin of a coordinate system of the volumetric space, and if so, decoding the sixth parameter. Decoding the first angular information may further include, if the sixth parameter is not present in the bitstream or if the sixth parameter indicates that the reference location of the beam assembly is at the origin of the coordinate system, taking the origin of the coordinate system as the reference location of the beam assembly. Decoding the first angular information may further include otherwise decoding, from the bitstream, parameters indicating the coordinates of the reference location of the beam assembly.

In some implementations, decoding the first angular information may include, for a beam assembly comprising at least some beams of the set of beams, decoding, from the bitstream, a seventh parameter indicative of whether a main axis of the beam assembly is arranged along a coordinate axis of the volumetric space. Decoding the first angular information may further include, if the seventh parameter indicates that the main axis of the beam assembly is arranged along a coordinate axis of the volumetric space, decoding a parameter indicative of the specific coordinate axis that the main axis of the beam assembly is arranged along to, and taking the specific coordinate axis as the main axis (e.g., orientation of the main axis) of the beam assembly. Decoding the first angular information may further include otherwise decoding parameters indicative of angles expressing an orientation of the main axis of the beam assembly and determining the main axis of the beam assembly based on these parameters. The main axis may be assumed to run through the reference location of the beam assembly.

In some implementations, decoding the first angular information may include, for a beam assembly comprising at least some beams of the set of beams, decoding, from the bitstream, an eighth parameter indicative of a number of beams in the beam assembly and determining the number of beams in the beam assembly based on the eighth parameter. Decoding the first angular information may further include, for each beam among the number of beams in the beam assembly, decoding, from the bitstream, one or more ninth parameters indicative of a beam angle of the respective beam.

In some implementations, decoding the one or more ninth parameters indicative of a beam angle of the respective beam may include decoding a parameter indicative of whether the beam angle is expressed as a tangent of an angle. Decoding the one or more ninth parameters may further include decoding a parameter expressing the beam angle.

In some implementations, the method may further include first determining that the volume is eligible for decoding the point cloud data for the volume based on the first angular information and the second angular information. For a beam assembly comprising at least some beams of the set of beams, the determination of angular eligibility may include determining a measure of an angular size of the volume as seen from a reference location of the beam assembly. The determination of angular eligibility may further include comparing the measure of the angular size to a measure of a difference angle between angles of adjacent beams of the beam assembly. The determination of angular eligibility may yet further include determining, based on a result of the comparison, whether (or that) the volume is eligible for decoding the point cloud data for the volume based on the first angular information and the second angular information.

In some implementations, determining the second angular information may include determining a first angle for a reference location within the volume relative to a reference location of a beam assembly comprising at least some beams of the set of beams. Determining the second angular information may further include determining a specific beam of the beam assembly that is assumed to have acquired the points within the volume, based on the first elevation angle. Determining the second angular information may further include determining a beam origin location of the specific beam. Determining the second angular information may yet further include determining the angles of sub-volumes or groups of sub-volumes of the volume relative to the beam origin location of the specific beam.

In a further aspect, the present application describes a method of encoding a point cloud acquired by means of a set of beams, to generate a bitstream of compressed point cloud data. The point cloud may be located within a volumetric space recursively split into sub-volumes and containing points of the point cloud. The method may include encoding, into the bitstream, a first parameter indicative of whether an angular mode shall be used for coding point cloud data. The method may further include, if the first parameter indicates that point cloud data shall be coded using the angular mode, encoding, into the bitstream, first angular information relating to beam angles of the set of beams relative to respective beam origin locations. The method may yet further include, if the first parameter indicates that point cloud data shall be coded using the angular mode, for a current volume split into sub-volumes, determining second angular information relating to angles of sub-volumes or groups of sub-volumes of the volume relative to a location associated with the set of beams. The method may yet further include, if the first parameter indicates that point cloud data shall be coded using the angular mode, for the current volume, encoding the point cloud data for the volume based on the first angular information and the second angular information.

In a further aspect, the present application describes encoders and decoders configured to implement such methods of encoding and decoding.

In yet a further aspect, the present application describes non-transitory computer-readable media storing computer-executable program instructions which, when executed, cause one or more processors to perform the described methods of encoding and/or decoding.

In yet another aspect, the present application describes a computer-readable signal containing program instructions which, when executed by a computer, cause the computer to perform the described methods of encoding and/or decoding.

Other aspects and features of the present application will be understood by those of ordinary skill in the art from a review of the following description of examples in conjunction with the accompanying figures.

Any feature described in relation to one aspect or embodiment of the invention may also be used in respect of one or more other aspects/embodiments. These and other aspects of the present invention will be apparent from, and elucidated with reference to, the embodiments described herein.

At times in the description below, the terms "node", "volume" and "sub-volume" may be used interchangeably. It will be appreciated that a node is associated with a volume or sub-volume. The node is a particular point on the tree that may be an internal node or a leaf node. The volume or sub-volume is the bounded physical space that the node represents. The term "volume" may, in some cases, be used to refer to the largest bounded space defined for containing the point cloud. A volume may be recursively divided into sub-volumes for the purpose of building out a tree-structure of interconnected nodes for coding the point cloud data. The tree-like structure of partitioning of volumes into sub-volumes may be referred to as a "parent" and "child" relationship, where the sub-volumes are child nodes or child sub-volumes to the parent node or parent volume. Sub-volumes within the same volume may be referred to as sibling nodes or sibling sub-volumes.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

A point cloud is a set of points in a three-dimensional coordinate system. The points are often intended to represent the external surface of one or more objects. Each point has a location (position) in the three-dimensional coordinate system. The position may be represented by three coordinates (X, Y, Z), which can be Cartesian or any other coordinate system. The points may have other associated attributes, such as color, which may also be a three components value in some cases, such as R, G, B or Y, Cb, Cr. Other associated attributes may include transparency, reflectance, a normal vector, etc., depending on the desired application for the point cloud data.

Point clouds can be static or dynamic. For example, a detailed scan or mapping of an object or topography may be static point cloud data. The LiDAR-based scanning of an environment for machine-vision purposes may be dynamic in that the point cloud (at least potentially) changes over time, e.g. with each successive scan of a volume. The dynamic point cloud is therefore a time-ordered sequence of point clouds.

Point cloud data may be used in a number of applications, including conservation (scanning of historical or cultural objects), mapping, machine vision (such as autonomous or semi-autonomous cars), and virtual reality systems, to give some examples. Dynamic point cloud data for applications like machine vision can be quite different from static point cloud data like that for conservation purposes. Automotive vision, for example, typically involves relatively small resolution, non-colored, highly dynamic point clouds obtained through LiDAR (or similar) sensors with a high frequency of capture. The objective of such point clouds is not for human consumption or viewing but rather for machine object detection/classification in a decision process. As an example, typical LiDAR frames contain on the order of tens of thousands of points, whereas high quality virtual reality applications require several millions of points. It may be expected that there will be a demand for higher resolution data over time as computational speed increases and new applications are found.

While point cloud data is useful, a lack of effective and efficient compression, i.e. encoding and decoding processes, may hamper adoption and deployment. A particular challenge in coding point clouds that does not arise in the case of other data compression, like audio or video, is the coding of the geometry of the point cloud. Point clouds tend to be sparsely populated, which makes efficiently coding the location of the points that much more challenging.

One of the more common mechanisms for coding point cloud data is through using tree-based structures. In a tree-based structure, the bounding three-dimensional volume for the point cloud is recursively divided into sub-volumes. Nodes of the tree correspond to sub-volumes. The decision of whether or not to further divide a sub-volume may be based on resolution of the tree and/or whether there are any points contained in the sub-volume. A node may have an occupancy flag that indicates whether its associated sub-volume contains a point or not. Splitting flags may signal whether a node has child nodes (i.e. whether a current volume has been further split into sub-volumes). These flags may be entropy coded in some cases and in some cases predictive coding may be used.

The three-dimensional volume for the point cloud can also be define by using a bounding box. A quad-tree plus binary-tree (QTBT) structure for the bounding box allow to partition the point-cloud in non-cubic volumes which may better represent the overall shape of the point cloud or objects within the point-cloud. A quad-tree (QT) partitioning splits a volume into four sub-volumes, for example by splitting the volume using two planes cutting the volume into four parts. A binary tree (BT) partitioning splits a volume into two sub-volumes, for example by splitting the volume using one plane cutting the volume into two parts.

A commonly-used tree structure is an octree. In this structure, the volumes/sub-volumes are all cubes and each split of a sub-volume results in eight further sub-volumes/sub-cubes. Another commonly-used tree structure is a KD-tree, in which a volume (cube or rectangular cuboid) is recursively divided in two by a plane orthogonal to one of the axes. Octrees are a special case of KD-trees, where the volume is divided by three planes, each being orthogonal to one of the three axes. A KD-tree may typically be obtained by applying recursively a Binary Tree (BT) partitioning.

The partitioning of a volume is not necessarily into two sub-volumes (KD-tree) or eight sub-volumes (octree), but could involve other partitions, including division into non-cuboid shapes or involving non-adjacent sub-volumes.

The present application may refer to octrees for ease of explanation and because they are a popular candidate tree structure for automotive applications, but it will be understood that the methods and devices described herein may be implemented using other tree structures.

Reference is now made to FIG. 1, which shows a simplified block diagram of a point cloud encoder 10 in accordance with aspects of the present application. The point cloud encoder 10 includes a tree building module 12 for receiving point cloud data and producing a tree (in this example, an octree) representing the geometry of the volumetric space containing the point cloud and indicating the location or position of points from the point cloud in that geometry.

In the case of a uniformly partitioned tree structure, like an octree, each node may be represented by a sequence of occupancy bits, where each occupancy bit corresponds to one of the sub-volumes in the node and signals whether than sub-volume contains at least one point or not. Occupied sub-volumes are recursively split up to a maximum depth of the tree. This may be termed the serialization or binarization of the tree. As shown in FIG. 1, in this example, the point cloud encoder 10 includes a binarizer 14 for binarizing the octree to produce a bitstream of binarized data representing the tree.

This sequence of bits may then be encoded using an entropy encoder 16 to produce a compressed bitstream. The entropy encoder 16 may encode the sequence of bits using a context model 18 that specifies probabilities for coding bits based on a context determination by the entropy encoder 16. The context model 18 may be adaptively updated after coding of each bit or defined set of bits. The entropy encoder 16 may, in some cases, be a binary arithmetic encoder. The binary arithmetic encoder may, in some implementations, employ context-adaptive binary arithmetic coding (CABAC). In some implementations, coders other than arithmetic coders may be used.

In some cases, the entropy encoder 16 may not be a binary coder, but instead may operate on non-binary data. The output octree data from the tree building module 12 may not be evaluated in binary form but instead may be encoded as non-binary data. For example, in the case of an octree, the eight flags within a sub-volume (e.g. occupancy flags) in their scan order may be considered a $2^8-1$ bit number (e.g. an integer having a value between 1 and 255 since the value 0 is not possible for a split sub-volume, i.e. it would not have been split if it was entirely unoccupied). This number may be encoded by the entropy encoder using a multi-symbol arithmetic coder in some implementations. Within a sub-volume, e.g. a cube, the sequence of flags that defines this integer may be termed a "pattern".

A convention that is typically used in point cloud compression is that an occupancy bit value of 1 signals that the associated node or volume is "occupied", i.e. that it contains at least one point, and an occupancy bit value of 0 signals that the associated node or volume is "unoccupied", i.e. that it contains no points. More generally, an occupancy bit may have a value indicating occupied or a value indicating unoccupied. In the description below for ease of explanation, example embodiments may be described in which the convention of 1=occupied and 0=unoccupied is used; however it will be understood that the present application is not limited to this convention.

Figure 2:
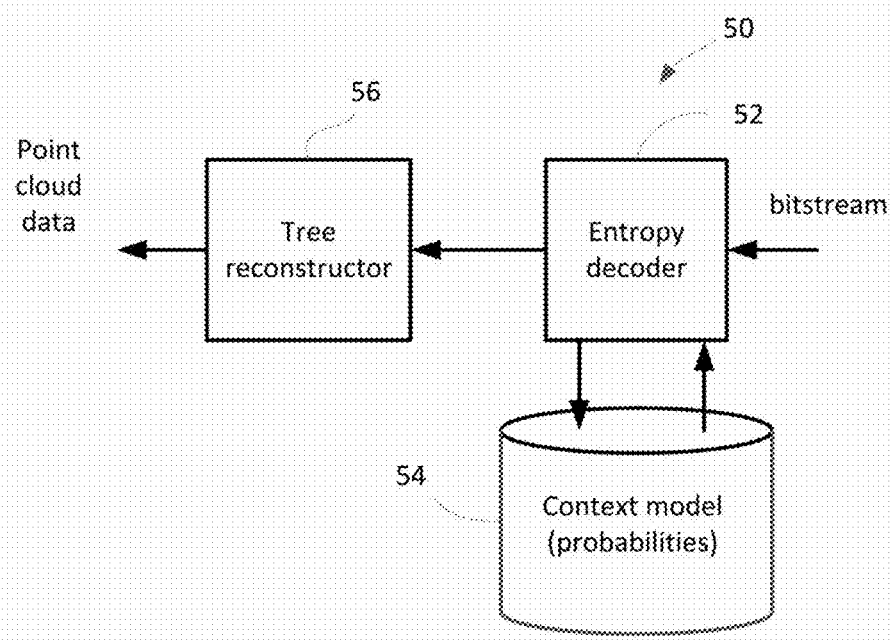
FIG. 2 shows a simplified block diagram of an example point cloud decoder.

A block diagram of an example point cloud decoder 50 that corresponds to the encoder 10 is shown in FIG. 2. The point cloud decoder 50 includes an entropy decoder 52 using the same context model 54 used by the encoder 10. The entropy decoder 52 receives the input bitstream of compressed data and entropy decodes the data to produce an output sequence of decompressed bits. The sequence is then converted into reconstructed point cloud data by a tree reconstructor 56. The tree reconstructor 56 rebuilds the tree structure from the decompressed data and knowledge of the scanning order in which the tree data was binarized. The tree reconstructor 56 is thus able to reconstruct the location of the points from the point cloud (subject to the resolution of the tree coding).

In European patent application no. 18305037.6, the present applicants described methods and devices for selecting among available pattern distributions to be used in coding a particular node's pattern of occupancy based on some occupancy information from previously-coded nodes near the particular node. In one example implementation, the occupancy information is obtained from the pattern of occupancy of the parent to the particular node. In another example implementation, the occupancy information is obtained from one or more nodes neighboring the particular node. The contents of European patent application no. 18305037.6 are incorporated herein by reference. This is referred to as determining a "neighbor configuration" and selecting a context (i.e. a pattern distribution) at least partly based on the neighbor configuration.

In European patent application no. 18305415.4, the present applicants described methods and devices for binary entropy coding occupancy patterns. The contents of European patent application no. 18305415.4 are incorporated herein by reference.

Certain types of point cloud data tend to have strong directionality. Non-natural environments in particular exhibit strong directionality as those environments tend to feature uniform surfaces. For example, in the case of LiDAR the roadway and the walls of adjacent buildings are generally horizontally or vertically planar. In the case of interior scans within rooms, the floor, ceiling and walls are all planar. LiDAR for the purpose of automotive vision and similar applications tends to be lower resolution and also needs to be compressed quickly and efficiently.

Octrees are efficient tree structures because they are based around a uniform partitioning process of equal division of a cube into eight sub-cubes using three orthogonal planes in every case, so signaling their structure is efficient. However, octrees using current signaling processes are not able to exploit the efficiencies available from recognizing the planar nature of some non-natural environments. KD-trees, however, are able to better tailor the partitioning to the directionality of the point cloud. This makes them a more efficient and effective structure for these types of environments. The downside to KD-trees is that the signaling of their structure requires significantly more data than octrees. The fact that KD-trees are non-uniform means that some of the techniques used to improve octree compression are unavailable to KD-trees or would be computationally difficult to implement.

Accordingly, it would be advantageous to have a mechanism for representing non-natural environments using a uniform partitioning-based tree structure in a manner that improves compression by exploiting horizontal and/or vertical directionality.

In accordance with one aspect of the present application, improved point cloud compression processes and devices feature a planar coding mode. The planar mode is signaled to indicate that a volume meets certain requirements for planarity in terms of its occupancy. In particular, a volume is planar if all of its occupied sub-volumes are positioned or located in a common plane. The syntax for signaling may indicate whether a volume is planar and, if so, the position of the common plane. Through exploiting this knowledge of planarity, gains in compression may be achieved. Applying criteria for eligibility to enable the planar mode and mechanisms for context-adaptive coding of the planar mode signaling help improve compression performance.

In the description below, planarity is presumed to be with respect to a Cartesian axis aligned with the structure of the volumes and sub-volumes. That is a volume is planar if all its occupied sub-volumes are positioned in a common plane orthogonal to one of the axes. As a convention, the axes will presume that the z-axis is vertical, meaning that the (horizontal) plane is orthogonal to the z-axis. In many of the examples below, horizontal planarity will be used to illustrate concepts; however, it will be appreciated that the present application is not limited to horizontal planarity and may alternatively or additionally include vertical planarity with respect to the x-axis, the y-axis, or both the x and y axes. Moreover, in some examples, planarity not necessarily be aligned by orthogonality with the Cartesian axes. To illustrate, in one example, a diagonal vertical planarity may be defined that is at a 45 degree angle with both the x and y axes.

Figure 3:
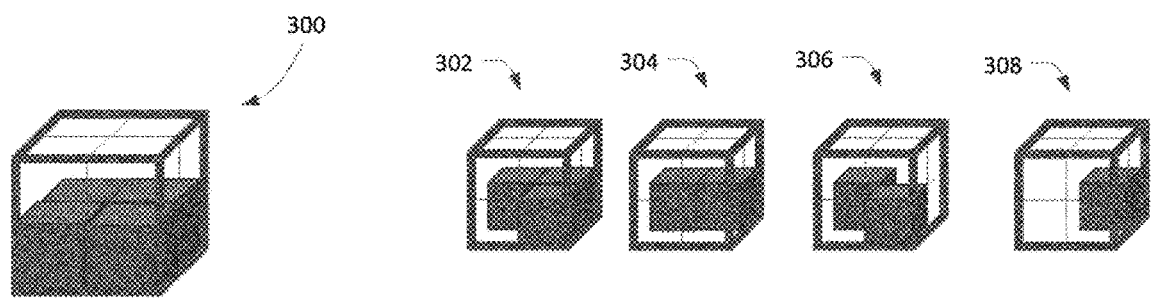
FIGS. 3 and 4 illustrate examples of a volume exhibiting planarity in its occupied child sub-volumes.
Figure 4:
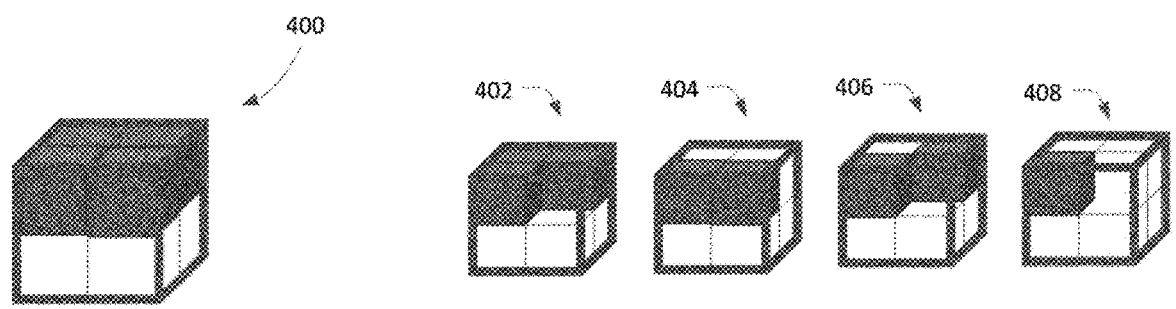

Reference is now made to FIGS. 3 and 4, each of which show example volumes 300 and 400. In this example, horizontal planarity will be illustrated and discussed, but those ordinarily skilled in the art will appreciated the extension of the concepts to vertical or other planarity.

Volume 300 is shown partitioned in to eight sub-volumes. Occupied sub-volumes are indicated using shading, whereas unoccupied sub-volumes are shown empty. It will be noted that the lower (in a z-axis or vertical sense) four sub-volumes in the volume 300 are occupied. This pattern of occupancy is horizontally planar; that is, each of the occupied sub-volumes is in the same horizontal plane, i.e. has the same z-position. Volume 400 shows another example of a horizontally planar pattern of occupancy. All the occupied sub-volumes of volume 400 are in the same horizontal plane. Volume 300 shows a case in which the lower plane is occupied. Volume 400 shows a case in which the upper plane is occupied. This may be termed the "plane position", where the plane position signals where the planar sub-volumes are within the volume. In this case, it is a binary 'upper' or 'lower' signal.

Planarity of a volume is not limited to the case in which all sub-volumes of a plane, e.g. all sub-volumes of the upper half of a 2×2×2 volume, are occupied. In some cases, only some of the sub-volumes in that plane are occupied, provided there are no occupied sub-volumes outside of that plane. In fact, as few as one occupied sub-volume may be considered "planar". Volumes 302, 304, 306, 308, 402, 404, 406, and 408 each illustrate examples of horizontally planar occupancy. Note with respect to volumes 308 and 408 that they meet the requirements for being horizontally planar since in each case the upper or lower half of the volume 308 and 408 is empty, i.e. all occupied sub-volumes (in these examples, one sub-volume) are located in one horizontal half of the volume 308 and 408. It will also be appreciated that in these examples, a volume with a single occupied sub-volume would also meet the requirements for vertical planarity with respect to the y-axis and vertical planarity with respect to the x-axis. That is, the volumes 308 and 408 are planar in three directions.

Planarity may be signaled with respect to a volume through a planar mode flag, e.g. isPlanar. In the case where there are multiple planar modes possible, e.g. with respect to the z-axis, y-axis, and x-axis, there may be multiple flags: isZPlanar, isYPlanar, isXPlanar. In this example, for ease of illustration, it is presumed that only horizontal planar mode is enabled.

The planar mode flag indicates whether a volume is planar or not. If it is planar, then a second syntax element, a plane position flag, planePosition, may be used to signal the position of the plane within the volume. In this example, the planePosition flag signals whether the planar occupied sub-volumes are in the upper half or lower half of the volume.

In a more complex implementation involving non-orthogonal planes, e.g. planes that are diagonal with respect to one or more of the axes, a more complex signaling syntax may be used involving multiple flags or a non-binary syntax element.

The planar mode flag and/or the plane position flag may be encoded in the bitstream using any suitable coding scheme. The flags may be entropy encoded in some implementations using prediction and/or context-adaptive coding to improve compression. Example techniques for determining context for coding the flags are discussed further below.

Occupancy Coding and Planar Mode

By signaling planarity, the coding of occupancy bits may be altered, since the planarity information allows for inferences to be made about the occupancy pattern that shortcut the signaling of occupancy. For example, if a volume is planar, then the four sub-volumes not pointed at by the plane position flag may be presumed empty and their occupancy bits need not be coded. Only the up-to-four bits of the occupied plane need be coded. Moreover, if the first three coded bits of that plane are zero (unoccupied), then the last (fourth) bit in the coding order may be inferred to be one (occupied) since the planar signaling indicated that the plane was occupied. Additionally, if planar signaling indicates that a volume is not planar, then there must be at least one occupied sub-volume in both planes, which allows for additional inferred occupancy of the last bits of either plane if the first three occupancy bits of either plane are zero.

Accordingly, signaling planar mode may provide efficiencies in coding of occupancy data. Nevertheless, planar mode signaling adds syntax elements to the bitstream and may not provide efficiencies in all situations. For example, in a dense point cloud and at certain depths signaling planarity may not be advantageous since any node with more than five occupied child nodes cannot be planar by definition. Therefore, it may be further advantageous to have eligibility criteria for enabling planar mode. It would be further advantageous to provide for eligibility criteria that adapt to the local data.

In one example, eligibility may be biased towards use with sparse clouds. For example, the eligibility criteria may be a based on a metric such as the mean number of occupied child nodes in a volume. This running mean may be determined for a certain depth of the tree and then used for eligibility of planar mode at the next lower depth. In one example, planar mode may be disabled if the mean number of occupied sub-volumes is greater than 3. This technique has the advantage of being simple, but lacks adaptation to local properties of the cloud.

In another example, a running probability factor may be determined. The probability factor may indicate the likelihood of a node being planar, i.e. a probability of planarity. If the probability is low, it indicates that the cost of signaling planarity will be high for little potential gain. A threshold eligibility value may be set and planar mode may be enabled for a given volume/node if the then-current probability factor is greater than the threshold:

$$p=\text{prob(planar)} \geq \text{threshold}$$

As an example, the threshold selected may be 0.6; however, it will be appreciated that other values may be used for other situations. The probability is updated during the coding process. The update process may be tuned for fast or slow updates for particular applications. A faster update may give greater weight or bias towards the most recently-coded nodes.

An example probability update process may be expressed as:

$$p_{new}=(Lp+\delta(\text{coded node}))/(L+1)$$

In the above expression, p is the current probability, $p_{new}$ is the updated probability, $\delta(\text{coded node})$ is planar status of the current node, which is 0 for non-planar and 1 for planar, and L is a weighting factor for tuning how quickly the update occurs. The weighting factor L may be set to a power of two minus one, such as 255, to allow for simple integer implementation; more particularly, the division may be implemented using a straightforward shift operation. Note that planar status does not necessarily mean that a planar mode flag was encoded, so that the probability tracks planarity in recent nodes whether or not planar mode was enabled. For example, during the decoding process, the planar status of any node is known after the decoding of the occupancy bits associated with the node independently of whether a planar mode flag was decoded or not.

The update of probability may occur when node occupancy is encoded or decoded, for example. In another example, the update of probability may occur when node planar information is decoded for a current node. The updated probability is then used to determine eligibility of the next node in the coding order for planar mode signaling.

As noted earlier, planar mode may be signaled for the horizontal plane (z-axis) or vertical planes (x-axis or y-axis), or for any two or all three. In the case where it is possible to signal planar modes for more than one direction, the eligibility criteria may differ. That is, each additional planar mode signaled for a node the benefits in terms of occupancy signaling are half. With the first planar mode, half the occupancy bits may be inferred if planar. With the second planar mode, only two of the remaining four occupancy bits may be inferred, and so on. Accordingly, the threshold for signaling an additional planar mode may be higher than the first planar mode.

The definition of "first", "second" and "third" planar mode may be based on the probabilities and their order from most probably to least probable. The thresholds may then be applied for eligibility with the first threshold being lower than the second threshold, and so on. Example threshold values are 0.6, 0.77, and 0.88, although these are merely illustrative. In another embodiment, there is only one threshold and only the most probable planar mode is enabled even if more than one of the planar modes meets the threshold.

Figure 5:
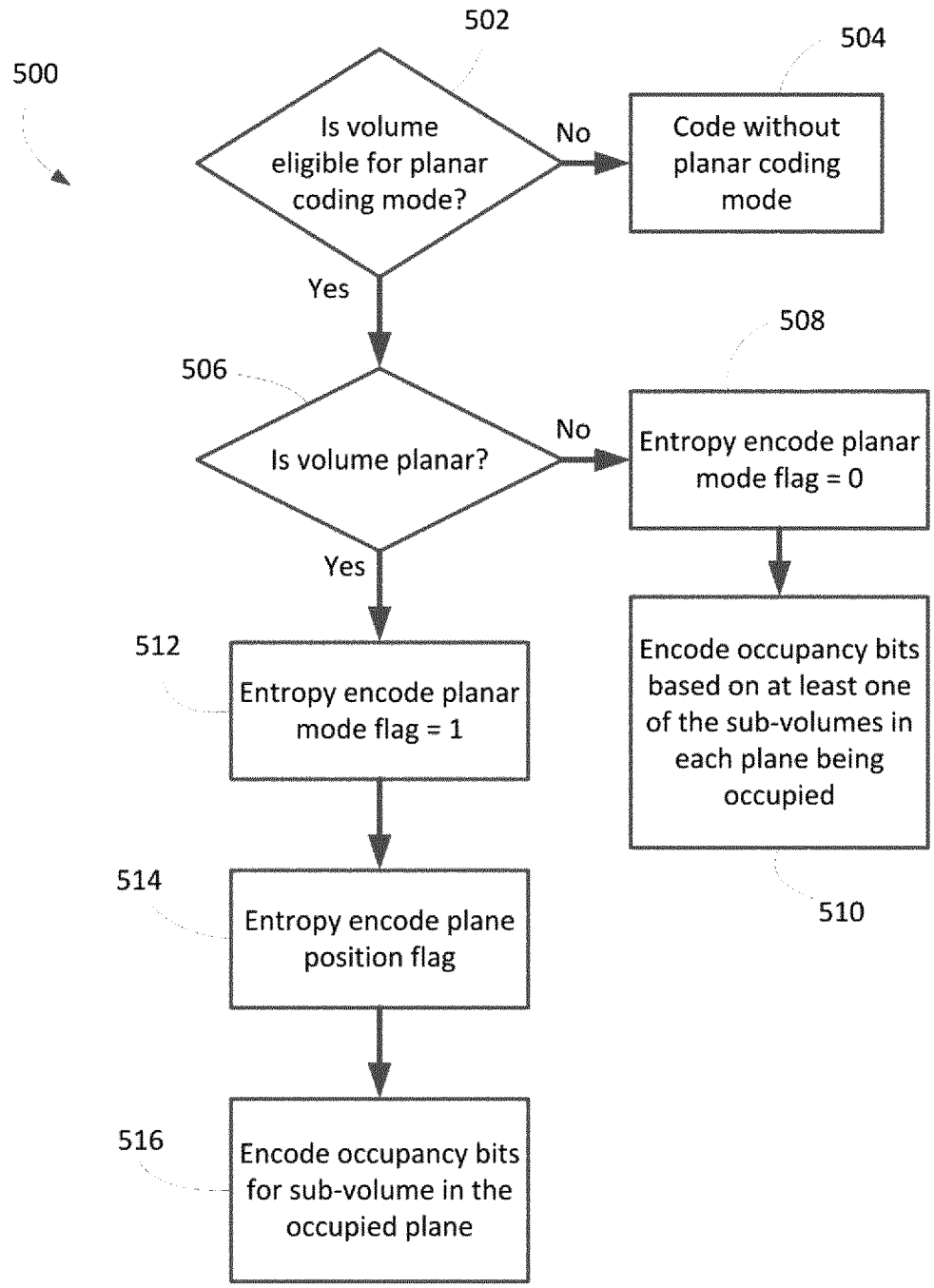
FIG. 5 shows, in flowchart form, one example method of encoding point cloud data using a planar coding mode.

Reference is now made to FIG. 5, which shows, in flowchart form, an example method 500 of encoding point cloud data using a planar mode. The method 500 reflects the process for encoding occupancy information for a volume. In this example, the volume is uniformly partitioned into eight sub-volumes, each having an occupancy bit, in accordance with octree-based coding. For simplicity, the present example assumes only one (e.g. horizontal) planar mode is used.

In operation 502, the encoder assesses whether the volume is eligible for planar coding mode. As discussed above, eligibility may be based on cloud density in one example, which may be assessed using mean number of occupied child nodes. To improve local adaptation, eligibility may be based on probability factor tracking. If planar coding mode is not eligible, then the occupancy pattern for the volume is encoded without using planar coding mode, as indicted by operation 504.

If planar mode is enabled, then in operation 506, the encoder assesses whether the volume is planar. If not, then in operation 508 it encodes the planar mode flag, e.g. isPlanar=0. In operation 510, the encoder then encodes the occupancy pattern based on there being at least one occupied sub-volume per plane. That is, the occupancy pattern is encoded and if the first three bits coded for either plane (upper or lower) are zero then the last (fourth) bit for that plane is not coded and is inferred to be one since the corresponding sub-volume must be occupied.

If planar mode is enabled and the volume is planar, then in operation 512 the planar mode flag is encoded, e.g. isPlanar=1. Because the volume is planar, the encoder then also encodes the plane position flag, planePosition. The plane position flag signals whether the planar occupied sub-volumes are in the upper half or lower half of the volume. For example, planePosition=0 may correspond to the lower half (i.e. lower z-axis position) and planePosition=1 may correspond to the upper half. The occupancy bits are then encoded based on knowledge of the planarity of the volume and the position of the occupied sub-volumes. That is, up to four bits are encoded since four may be inferred to be zero, and the fourth bit may be inferred to be one if the first three encoded are zero.

Figure 6:
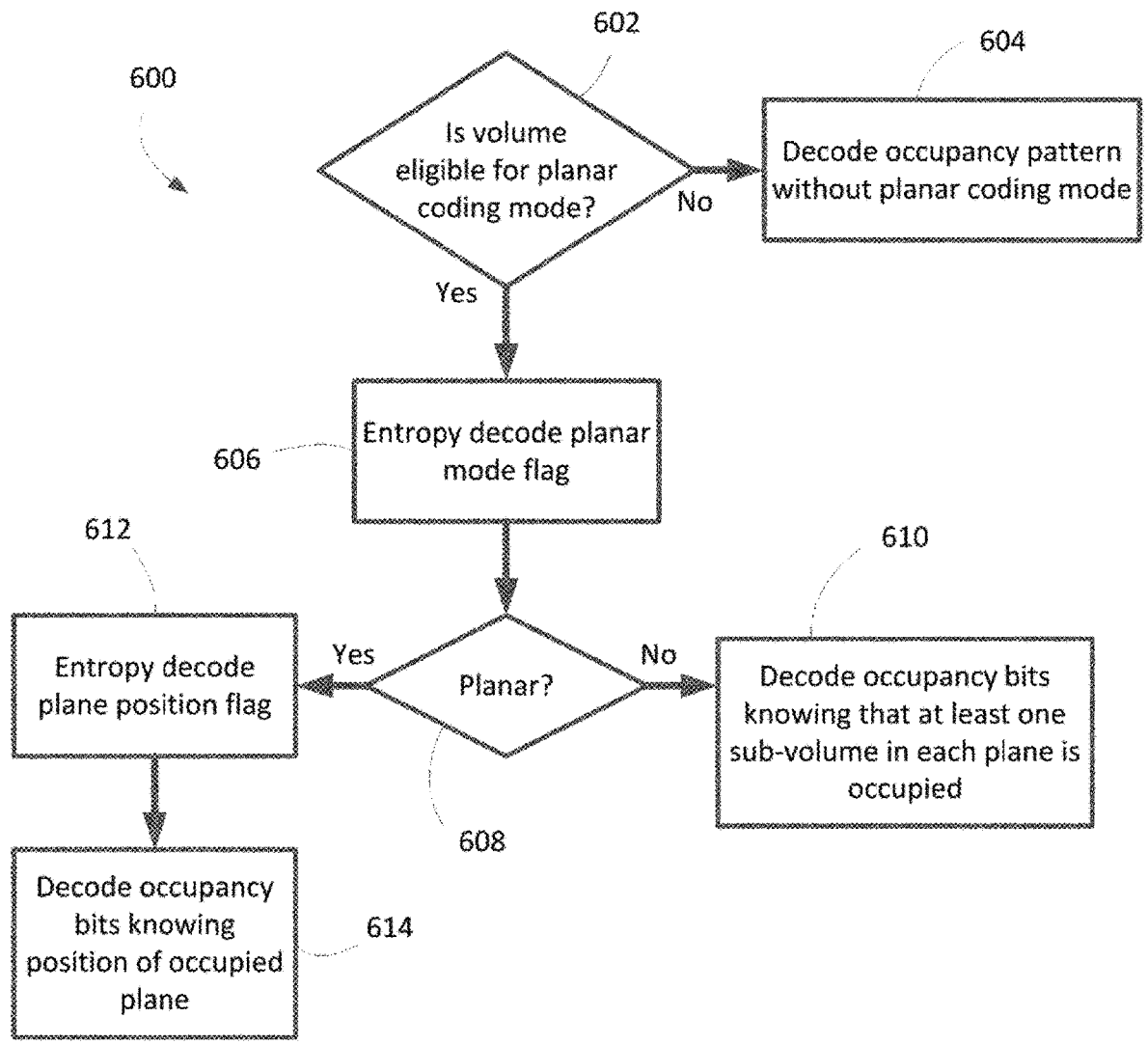
FIG. 6 shows, in flowchart form, one example method of decoding point cloud data using a planar coding mode.

An example method 600 of decoding encoded point cloud data is shown in FIG. 6. The example method 600 is implemented by a decoder that receives a bitstream of encoded data. For a current volume, the decoder determines whether the volume is eligible for planar mode in operation 602. The eligibility assessment is the same assessment as was carried out at the encoder. If not eligible, then the decoder entropy decoder the occupancy pattern as per usual without using planar mode signaling, as indicated by operation 604.

If planar mode is enabled, then in operation 606 the decoder decodes the planar mode flag. The decoded planar mode flag indicates whether the volume is planar or not, as indicated by operation 608. If not planar, then the decoder decodes occupancy bits knowing at least one sub-volume in each plane is occupied. This may allow the decoder to infer one or two of the occupancy bits depending on the value of the other bits decoded.

If the decoded planar mode flag indicates that the volume is planar, then in operation 612 the decoder decodes a plane position flag. The decoded plane position flag indicates whether the occupied sub-volumes are the upper half or lower half of the volume. Based on that knowledge, the decoder then infers the value of the four occupancy bits in the unoccupied half as zero and it decodes the up to four bits of the occupancy pattern for the occupied half, as shown by operation 614.

As noted earlier, the coding of occupancy bits may include entropy coding based, in part, on neighbor configuration, where the neighbor configuration reflects the occupancy of various volumes sharing at least a face with the current volume. In assessing neighbor configuration, if the neighbor configuration (NC) is zero, meaning none of the neighboring volumes is occupied, then a flag may be coded to signal whether the current volume has a single occupied sub-volume.

Figure 7:
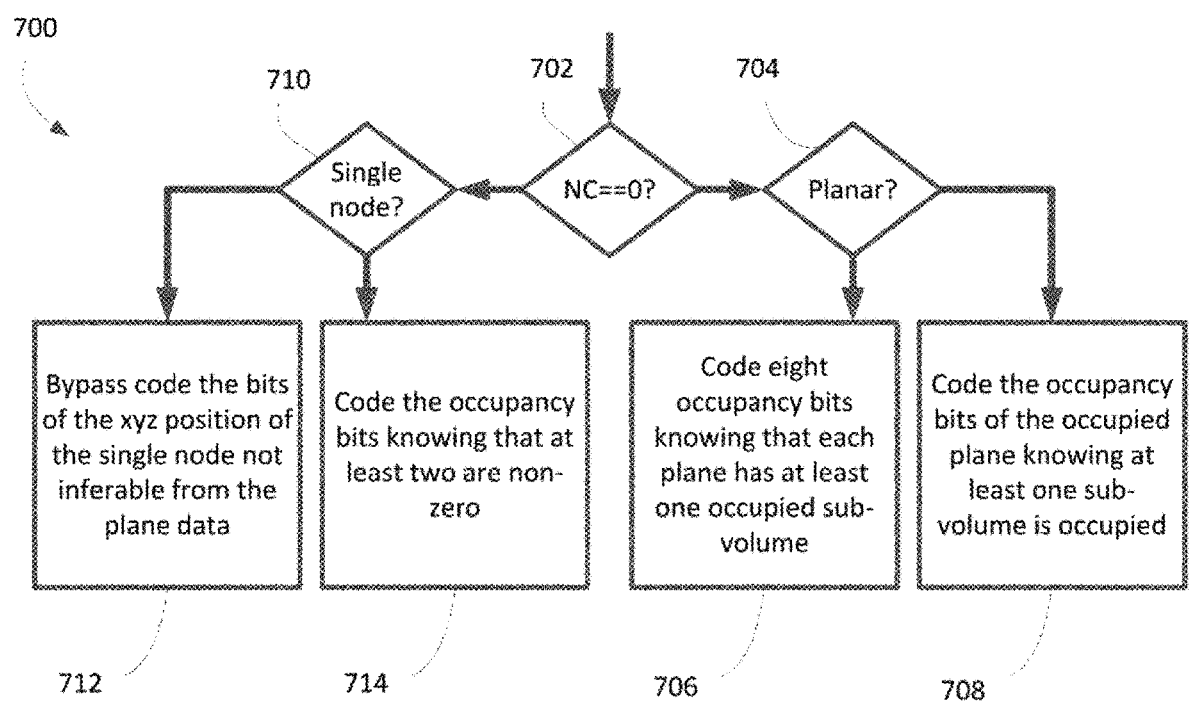
FIG. 7 shows a portion of one example of a process for coding occupancy bits based on planarity information.

The coding of occupancy bits using NC and single node signaling may be adapted based on planar mode signaling as shown in FIG. 7. FIG. 7 shows an example method 700 of occupancy bit coding. The portion of the flowchart showing the method 700 reflects the impact of planar signaling on occupancy bit coding. Although not shown, it may be presumed that suitable eligibility testing occurs and that a planar flag and position flag, if applicable, are encoded/decoded. In this example, it will be presumed that only one planar mode is possible, but extension to other modes or additional modes will be understood.

In operation 702, the coder assesses whether NC is zero, i.e. whether all neighboring volumes are empty. If not then, the coder assesses whether the volume is planar in operation 704. If not planar, then the coder encodes or decodes the eight occupancy bits knowing that at least one bit in each plane is 1, as shown by operation 706. If planar, then the coder infers the bits of the unoccupied plane to be zero and codes the other four bits knowing that at least one of the occupancy bits is 1.

If NC is zero, then the coder determines whether there is a single occupied sub-volume, which is indicated in the bitstream by a single node flag, as shown in operation 710. If single node is true, then in operation 712 data is bypass coded to signal any remaining x-y-z position data regarding the location of the single node within the volume that is not already available from coded planar mode and plane position flags. For example, if the planar mode is enabled for coding horizontal plane information, then to signal the single node location x and y flags are bypass coded, but the z-location is known from the plane position flag.

If single node is false, then the occupancy bits are coded knowing that at least two sub-volumes are occupied, as indicated by operation 714. This may include determining whether the volume is planar and, if so, its plane position, and then coding the occupancy bits accordingly. For example, if planar then the unoccupied plane may be inferred to contain all zero bits, and the bits of the occupied plane may be coded and up to two of them may be inferred based on the knowledge that at least two sub-volumes are occupied.

Figure 8:
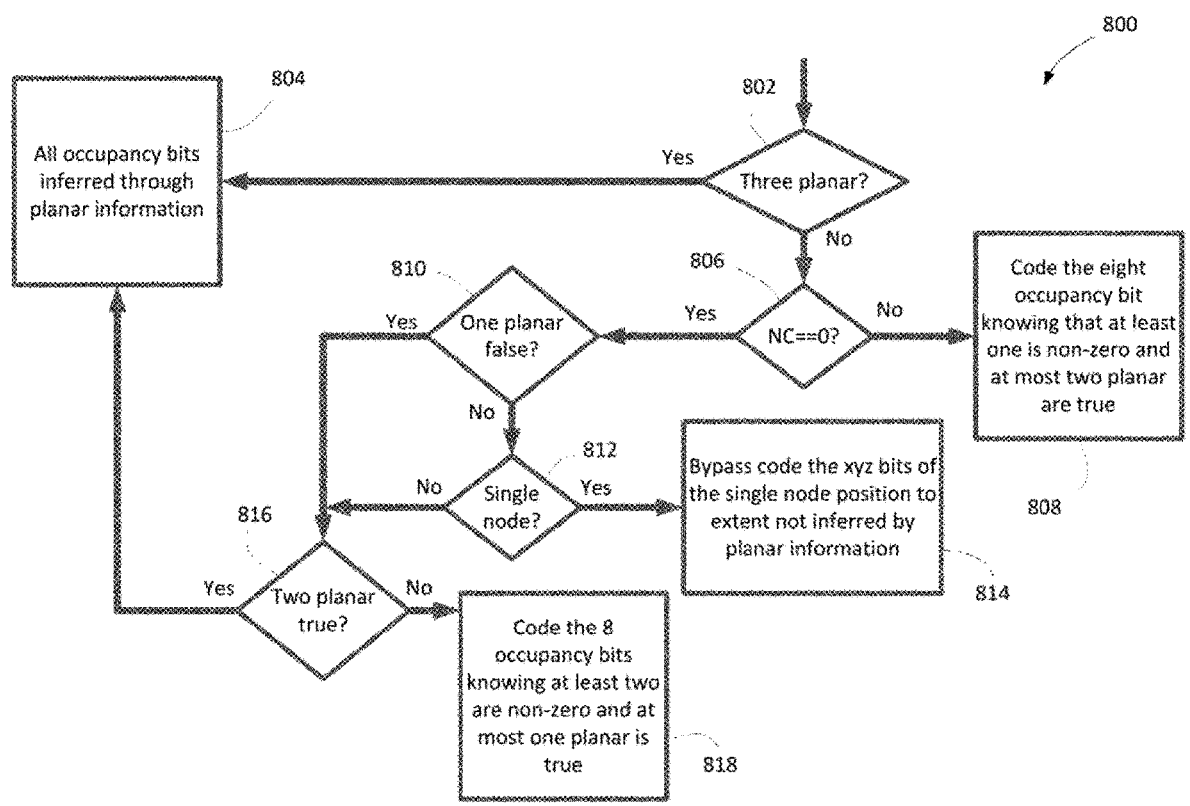
FIG. 8 shows a portion of another example of a process for coding occupancy bits based on planarity information.

Reference is now made to FIG. 8, which shows a flowchart illustrating one example method 800 of coding occupancy bits with three planar modes possible. The portion of the flowchart showing the method 800 reflects the impact of planar signaling on occupancy bit coding. Although not shown, it may be presumed that suitable eligibility testing occurs and that planar flags and position flags, if applicable, are encoded/decoded. The coder first assesses whether all three planar modes indicate that the volume is planar with respect to all three axes, as shown at operation 802. If so, then they collectively indicate the location of the single occupied sub-volume and all occupancy bits may be inferred, as shown by operation 804.

If not all planar, then the coder assesses whether the neighbor configuration is zero in operation 806. If NC is not zero, then the occupancy bits are coded based on planar mode signaling in operation 808. As discussed above, the occupancy bit coding may be masked by planar mode signaling allowing a number possible inferences to be made to short-cut the occupancy coding.

If NC is zero, then a single node flag may be coded. The coder first assesses whether at least one of the planar mode flags indicates that planar mode is false. If so, that would imply that it cannot be a single node situation because more than one sub-volume is occupied. Accordingly, if that is not the case, i.e. no planar is false, in operation 810 then the single node flag is assessed and coded in operation 812. If the single node flag is set, the x, y, z, bits of the single node position may be bypass coded to the extent that they are not already inferred from plane position data, as shown by operation 814.

If operation 810 determines that at least one planar mode flag indicates the volume is non-planar, or if in operation 812 the signal node flag indicates that it is not a single node, then the coder assesses in operation 816 whether there are two planar mode flags that indicate the volume is planar in two directions and, if so, then all occupancy bits may be inferred in operation 804. If not, then the occupancy bits are coded in operation 818 knowing planarity, if any, and that at least two bit are non-zero.

Those ordinarily skilled in the art will appreciate that a feature adopted into current test modes for point cloud coding is Inferred Direct Coding Mode (IDCM), which is for handling very isolated points. Because there is little correlation to exploit with neighboring nodes, the position of the isolated point is directly coded instead of coding the occupancy information of cascaded single child nodes. This mode is eligible under conditions of isolation of the node and, in case of eligibility, the IDCM activation is signaled by an IDCM flag. In case of activation, the local positions of the point or points belong to the node are coded and the node then becomes a leaf node, effectively halting the recursive partitioning and tree-based coding process for that node.

The present process of signaling planarity may be incorporated into coding processes with an IDCM mode by signaling planarity, if eligible, before signaling IDCM. Firstly, the eligibility of a node for IDCM may be impacted by the planar information. For example, if a node is not planar, the node may not become eligible for IDCM. Secondly, in case of IDCM activation, the planar knowledge helps coding the positions of the points in the volume associated with the node. For example, the following rules may be applied:

if the node is x-planar, the position planeXPosition of the plane is known, thus the highest bit of the x-coordinate of the points is known from the plane position. This bit is not coded in IDCM; the decoder will deduce it from the plane position if the node is y-planar, the position planeYPosition of the plane is known, thus the highest bit of the y-coordinate of the points is known from the plane position. This bit is not coded in IDCM; the decoder will deduce it from the plane position if the node is z-planar, the position planeZPosition of the plane is known, thus the highest bit of the z-coordinate of the points is known from the plane position. This bit is not coded in IDCM; the decoder will deduce it from the plane position The inference of the highest bits of the xyz-coordinates still holds in case the node is planar in several directions. For example, if the node is x-planar and y-planar, the highest bit for both the x-coordinate and the y-coordinate are inferred by planeXPosition and planeYPosition.

Entropy Coding of Planar Mode Syntax

Planar mode syntax, such as the planar mode flag or the plane position flag, may represent a significant portion of the bitstream. Accordingly, to make planar mode effective in compressing point cloud data, it may be advantageous to ensure the planar information is entropy coded with effective context determination.

Recall that whether a node/volume is planar or not is signaled using a planar mode flag, isPlanar. In the present discussion of examples, it will be assumed that the planar mode is applicable for horizontal planarity, i.e. with respect to the z-axis. The flag may be termed isZPlanar in this example. Entropy encoding of the flag may employ a binary arithmetic coder, e.g. a context-adaptive binary arithmetic coder (CABAC). The context (or internal probability) may be determined using one or more predictive factors.

The planar mode flag for a current node or sub-volume signals whether the child sub-volumes within the sub-volume are planar. The current node or sub-volume exists within a parent volume. As examples, the predictive factors for determining context for coding the planar mode flag may include one or more of:

(a) parent volume planarity;
(b) occupancy of adjacent neighboring volume; and
(c) distance to closest occupied already-coded node at same depth and at same z-axis position.

Figure 9:
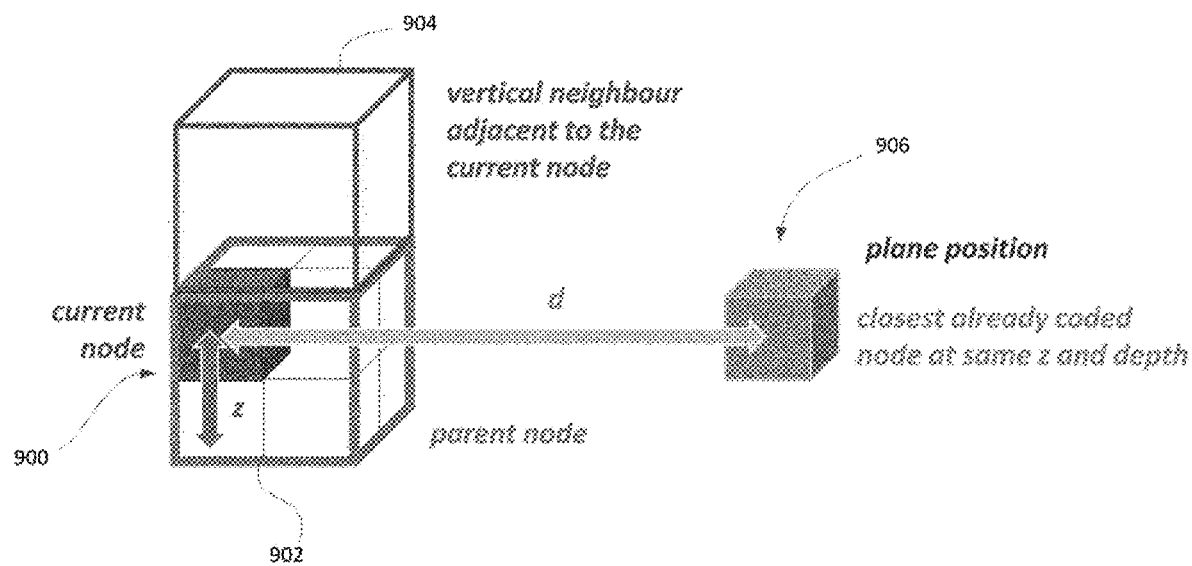
FIG. 9 diagrammatically illustrates possible factors in determining context for coding a planar mode flag or plane position flag.

FIG. 9 illustrates the three example factors with regard to a current node 900 within a parent node 902.

Factor (a) refers to whether the parent node 902 was planar or not. Irrespective of whether it was coded using planar mode, if the parent node 902 meets the criteria for planarity (in this case, horizontal planarity) then the parent node 902 is considered planar. The factor (a) is binary: "parent is planar" or "parent is not planar".

Factor (b) refers to the occupancy status of a neighboring volume 904 at the parent depth adjacent to a face of the parent volume aligned with the plane. In the case of horizontal planarity, the neighboring volume 904 is vertically above the parent node 902 if the current node 900 is in the top half of the parent volume 902. If the current node 900 were in the bottom half of the parent node 902, then the neighboring volume 904 would be vertically below. In the case of vertical planarity, the neighboring volume would be adjacent to one of the sides, depending on x-axis or y-axis planarity and location of the current node. Factor (b) is also binary: the neighbor is either occupied or not occupied.

Factor (c) refers to how far away a closest already-coded node 906 is under conditions that the already-coded node is located at the same depth as the current node 900 and lies in a common plane, i.e. is at the same z-axis position as the current node 900. The already-coded node 906 is not necessarily in an adjacent volume and could be some distance away, depending on the density of the cloud. The coder tracks already-coded nodes and identifies the closest one that meets these criteria. The distance d, between the current node 900 and an already coded node 906, may be determined from relative positions of the nodes 900 and 906. In some embodiments, an L1 norm may be used to determine distance, i.e. absolute value of delta-x plus absolute value of delta-y, for simplicity of calculation. In some embodiments, an L2 norm may be used to determine the distance, i.e. (the square root of) the sum of squares given by delta-x squared plus delta-y squared.

In some implementations, the distance d may be discretized into two values "near" and "far". The division between a "near" d and a "far" d may be suitably selected. By categorizing distance as either near or far, factor (c) is also binary. It will be appreciated that in some implementations the distance may be discretized into three or more values.

If all three example factors are used in context determination, then 2×2×2=8 separate contexts may be maintained for coding of the planar mode flag.

If the planar mode flag is coded for the current node 900 and the current node 900 is planar, then a plane position flag may be coded, such as planeZPosition. The plane position flag signals which half of current node 900 contains the occupied child sub-volumes. In the case of horizontal planarity, the plane position flag signals either the bottom half or the top half.

Entropy encoding of the plane position flag may also employ a binary arithmetic coder, e.g. CABAC. The context (or internal probability) may be determined using one or more predictive factors, possible examples of which include:
  (a') occupancy of adjacent neighboring volume 904;
  (b') distance to closest occupied already-coded node 906 at same depth and at same z-axis position;
  (c') if the closest occupied already-coded node 906 at the same depth and z-axis position is planar, its plane position; and
  (d') location of current node 900 within the parent node 902.

Factor (a') is the same as factor (b) discussed above with regard to planar mode flag context. Factor (b') is the same as factor (c) discussed above with regard to planar mode flag context. In some example implementations, factor (b') may discretize the distance into three categories: "near", "not too far", and "far". As discussed above, distance may be determined using an L1 norm, or an L2 norm, or any other suitable measure.

Factor (c') refers to whether the closest occupied already-coded node 906 is planar or not and, if so, whether it is top or bottom planar, i.e. its plane position. It turns out that even a distant already-coded node that is planar may be a strong predictor of planarity or plane position for a current node. That is, factor (c') may have three outcomes: not planar, same plane position as the current node 900, different plane position from current node 900. If the current node 900 and the closest already-coded occupied node 906 have the same plane position, then their occupied child sub-volumes are all aligned in a common horizontal plane at the same z-axis position.

Factor (d') refers to whether the current node 900 is located in the top half or bottom half of the parent node 902 (in the case of horizontal planarity). Because the parent is likely planar due to eligibility requirements, if the current node 900 is planar, then the plane position is slightly more likely to be at the "outside" of the parent node 902 and not towards the middle. Accordingly, the position of the current node 900 in its parent node 902 has a noticeable impact on the probability of the plane position within that current node 900.

In an implementation combining all four factors, there may be 2×3×2×2=24 predictive combinations in a case where the closest occupied already-coded node 906 at the same z and the depth (as the current node 900) is planar; otherwise, when the closest already-coded node 906 at the same z and the same depth is not planar, a specific context is used instead. Thus, 24+1=25 contexts may be used by the binary arithmetic coder to code the plane position flag in such an example.

Although the above examples refer to three factors for context determination in the case of the planar mode flag and four factors for context determination in the case of the plane position flag, it will be appreciated that the present application includes use of individual factors for context determination and all combinations and sub-combination of such factors.

Figure 10:
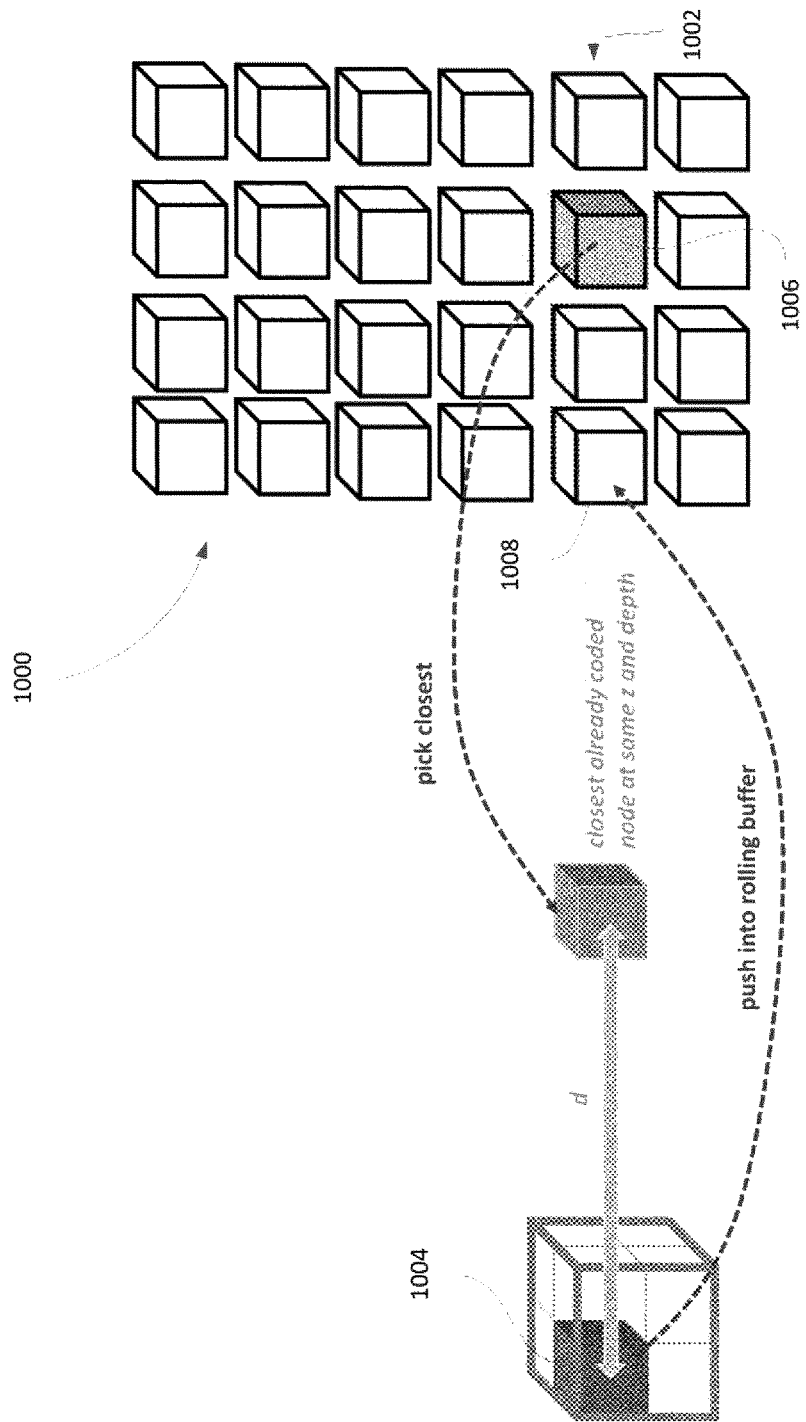
FIG. 10 shows one example mechanisms for tracking a closest already-coded occupied node at the same depth and in a common plane.

Reference is now made to FIG. 10, which diagrammatically illustrates one example implementation of a mechanism for managing the determination of a closest occupied already-coded node during the context determination process. In this example mechanism, the coding device uses a memory, e.g. a volatile or persistent memory unit, to implement a buffer 1000 that contains information regarding occupied already-coded nodes. In particular, the buffer 1000 allocates space to track already-coded nodes having the same z-axis location and depth in the tree. In this specific example, the buffer 1000 tracks information relating to up to four already-coded nodes having the same z-axis position and depth.

Each row of the example buffer 1000 corresponds to a z-axis position and depth. The four columns correspond to four recently-coded occupied nodes having that z-axis position. For example, an example row 1002 contains data regarding four already-coded occupied nodes. The stored data for each already-coded node may include the x and y position of the already-coded occupied node, whether the node was planar and, if so, the plane position.

In the course of coding a current node 1004, a coding device access the buffer 1000 to identify a closest occupied already-coded node from among the four stored nodes in the example row 1002, based on the example row 1002 being for the same z-axis position as the current node 1004. As discussed above, the distance metric may be based on an L1 norm, an L2 norm, or any other measure of distance. The stored x and y positions for each node in the buffer 1000 assist in making the determination of the closest node straightforward, particularly in the case of an L1 norm.

Once the closest node is identified, such as closest node 1006, its distance from the current node 1004 and perhaps its planarity and/or plane position are used in the context determination(s). The buffer 1000 is then updated by adding the current node 1004 to a first position 1008 of the buffer 1000 and right shifting all the other node data in that example row 1002 of the buffer 1000 causing the last item in the buffer 1000 to be discarded. In some examples, based on the distance determination it may be that the identified closest node retains higher potential relevance to current coding, so prior to adding the current node 1004 to the buffer 1000, the contents of the example row 1002 are first rearranged to as to move the closest node 1006 to the first position 1008 and shifting nodes to the right to accommodate, e.g. in this example the node data in the first position 1008 and a second position are shifted to the second position and third position, respectively. In this manner, the coding device avoids expelling the mostly-recently identified closest node from the buffer 1000 prematurely.

It will be appreciated that the described buffer 1000 is one example implementation of a mechanism for managing data regarding the closest node, but that the present application is not necessarily limited to this example and many other mechanisms for tracking closest node information may be used. Moreover, it will be appreciated that retaining only a fixed number of recently-coded occupied nodes in the buffer 1000 means that there is a chance that the identified node is not actually the closest occupied already-coded node but merely the closest already-coded node available from the buffer 1000; however, even when the buffer is limited to four candidates, as in the example above, the impact on performance is negligible.

Angular Mode Coding of Occupancy Patterns

Next, a specific mode for coding point clouds that have been acquired (e.g., sampled) by a beam assembly comprising a set of beams will be described. The beams may be optical beams, for example. Without intended limitation, reference will be made to a Lidar as an example of such beam assembly for acquiring point clouds, but it is understood that other beam assemblies are feasible as well and understood to be covered by the present description. Likewise, without intended limitation, reference will be made to laser beams, but other (optical) beams are feasible as well and understood to be covered by the present description. For example, the beam assembly may relate to any rotating beam assembly, including, but not limited to, Lidars. As an alternative, the beam assemblies may relate to scanning beam assemblies, or to solid state Lidars. In any case, these beam assemblies are assumed to emit beams at certain predefined (and known) angles, in particular, elevation angles. It is understood that any of the beam assemblies described throughout the application may be mounted on, for example, an automobile or any other vehicle.

Figure 11:
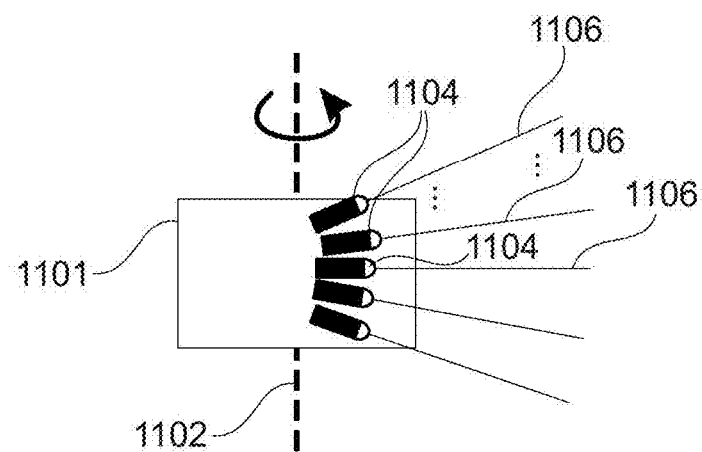
FIG. 11 shows a simplified illustration of an example of a beam assembly for acquiring point clouds.

Typically, Lidar-acquired point clouds are acquired by a set of spinning laser beams. An example of such set of spinning laser beams is schematically illustrated in FIG. 11. The most common setup is a vertically arranged array of lasers 1104 (e.g., 16, 32, or 64 lasers) that emit respective laser beams 1106. The lasers 1104 are mounted on a spinning head 1101 that rotates around a rotation axis 1102. Alternatively, the lasers 1104 themselves may rotate around the rotation axis 1102. The head 1101 including the lasers 1104 may be referred to as a beam assembly.

Figure 12:
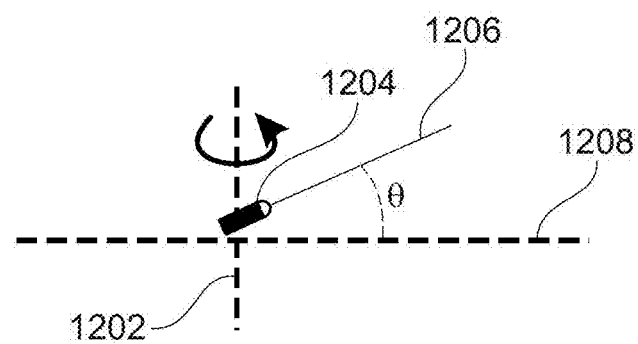
FIG. 12 shows a simplified illustration of an example of a single beam emitter in the beam assembly.
Figure 13:
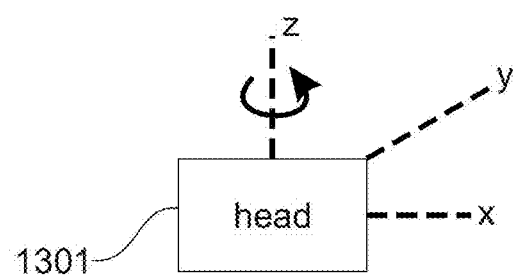
FIG. 13 shows an example assignment of coordinate axes relative to the beam assembly.

Naturally, acquired points by a particular laser beam have a fixed (or fixed up to a noise and/or measurement precision) vertical angle $\theta$ (e.g., elevation angle) of acquisition relative to a plane perpendicular to the head axis. This is schematically illustrated in FIG. 12, in which a laser 1204 emits a laser beam 1206 at an angle (e.g., elevation angle) $\theta$ of acquisition relative to the plane 1208 perpendicular to the head axis 1202. FIG. 13 shows a possible definition of coordinate axes for a head 1301.

Figure 14:
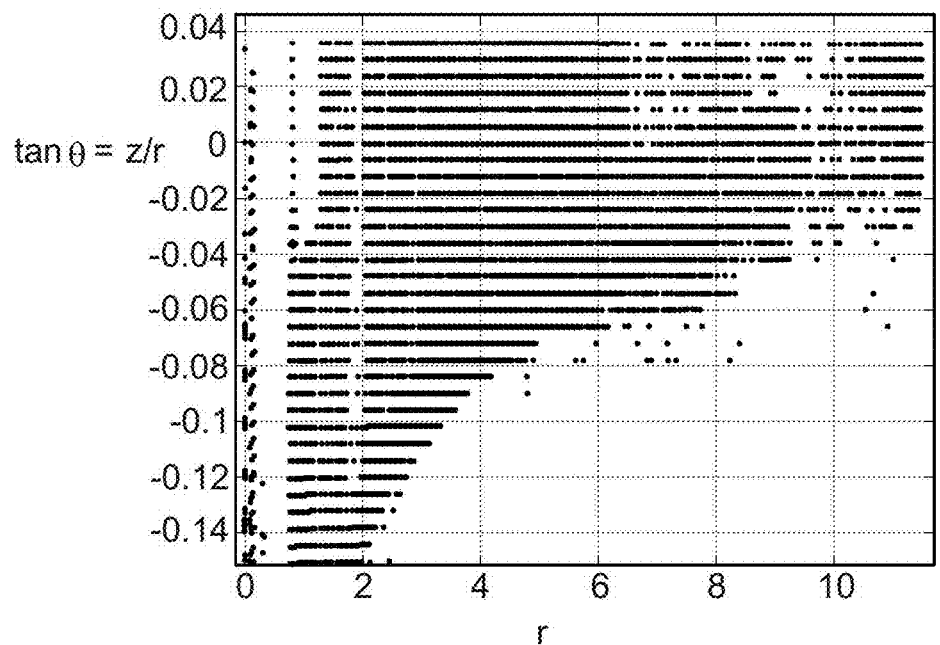
FIG. 14 shows a diagram including points of an example point cloud expressed in the (r, θ) plane.
Figure 15:
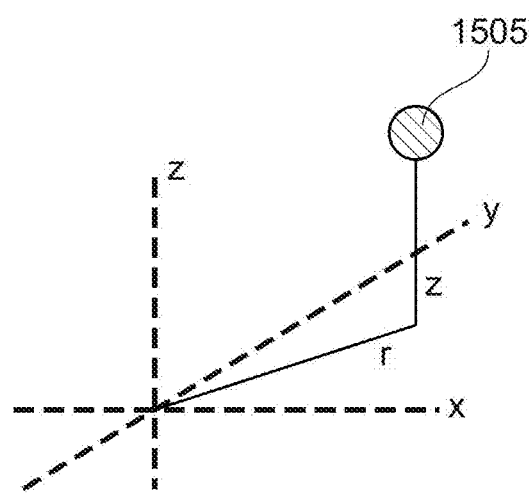
FIG. 15 shows an example assignment of coordinate axes relative to a point of the point cloud.

FIG. 14 shows, in a r–tan($\theta$) diagram, points of a point cloud obtained by an example Lidar with 64 laser beams. Somewhat fixed laser angles tan($\theta$) can be clearly observed in the diagram. Positive angles signify that the lasers are pointed above the horizontal plane (i.e., towards the sky), while negative angles signify that the lasers are pointed below the horizontal plane (i.e., to the ground). Notably, lasers of the Lidar are deliberately oriented at different angles—e.g., so that different lasers pick up different parts of the same tall object, like buildings, poles, tress, etc. By definition and as shown on FIG. 15, r is the horizontal distance of a point 1505 from the Lidar's head 1301 (or beam assembly in general), and the tangent of the vertical angle tan($\theta$) is defined as the ratio z/r where z is the vertical elevation of the point 1505 relative to the Lidar's head 1301.

As can be seen from FIG. 14, the points of the point cloud can be represented in a "quasi" 2D space. For example, a representation is theoretically possible in the 2D space (x,y) and a finite set of vertical angles $\theta$ corresponding to the laser beams. Or equivalently in the 2D polar space ($\varphi$, r), where $\varphi$ is the azimuthal angle, and the finite set of vertical angles $\theta$. In other words, one may represent the points in spherical coordinates ($\varphi$, r, $\theta$) where $\theta$ can take only a finite number of values. This is a consequence of occlusions, which lead to only at most one point per ($\varphi$, $\theta$). This quasi 2D space is theoretical but, practically, measurement noise/precision and time integration does not lead to a strictly finite set of possible $\theta$, which is a consequence of the mechanical mounting of the lasers. Instead, it is observed that the values of $\theta$ are spread around a finite number of values $\theta_{laser}$ and one must deal with the issue of "noise" around these values.

The aforementioned quasi-2D structure depends mainly on the position/orientation of one or more Lidars (or beam assemblies in general) and the intrinsic characteristics of the Lidar(s). As will be described in more detail below, it can be thus advantageous to include syntax elements (e.g., parameters, flags) into the bitstream that described characteristics of the Lidar(s) (or beam assembly/assemblies in general). These syntax elements may indicate at least one of a reference location of the beam assembly, origin locations of specific beams, or beam angles of specific beams. Including these syntax elements into the bitstream can be done at a frame or sequence level. In any case, this data should be present as close as possible to the compressed data bitstream to ensure decodability of the bitstream and minimize the risk of losing data needed for decodability.

Taking note of the above, some embodiments of the application seek to use knowledge obtained from Lidar characteristics (or characteristics of the relevant beam assemblies), of vertical laser angles $\{\theta_{laser}\}$ in an efficient representation of the point cloud such that the compression is improved. Moreover, as strong and robust compression capability has already been obtained by using an octree representation and the use of neighboring configurations of occupied nodes, some embodiments seek to use this knowledge in the context of coding an octree representation of the point cloud.

Possible solutions to profit from the quasi-2D structure of the point clouds are based on a change of the representation space. In these space-change-based solutions, the high-level syntax for coding the point cloud could signal information relative to the space change and characteristics of the Lidar in the changed space. A first drawback of such a space-change-based solution is that it is difficult to construct an invertible and discrete space change without requiring additional precision in the changed space. Consequently, it is difficult to obtain good performance for lossless compression of 3D point clouds. An example of space change is the representation of the point cloud in a monochromatic image where the image frame belongs to the bounded space $[0, 2\pi]*[-\pi/2, +\pi/2]$ for the couple $(\varphi, \theta)$ and the intensity of pixels is provided by the distance r. Of course, not all pixels of the "image" are occupied. The point cloud can thus be seen as a depth map in the angular space $(\varphi, \theta)$. This raises several issues such as the precision needed on $\varphi$ and $\theta$ to separate all points such that not two of them fall on the same pixel. Moreover, it is still to be proved that such representation can be efficiently used to compress a point cloud. This would probably use specific local prediction (for example to profit from the spread of $\theta$ around the fixed angle $\theta_{laser}$) and other compression techniques. It is obviously incompatible with the octree representation of a point cloud. Finally, a major drawback of the 2D frame representation is the inability to deal with point clouds acquired by more than one Lidar. This is a very practical use-case as some manufacturers envision having several Lidars mounted on a vehicle, for example on the sides of said vehicle instead of a single Lidar attached to the roof. Therefore, native 3D space representation seem to be the only reasonable representations to tackle the multiple Lidar acquisition.

In the framework of an octree representation of the geometry of a point cloud, the present application proposes to define and use the angles $\theta$ associated with points of the point cloud or with nodes of the octree, to improve the compression of the occupancy bits that are attached to a parent node and that signal the occupancy of the child nodes of this parent node. The corresponding coding mode that uses the angles $\theta$ associated with points of the point cloud or with nodes of the octree will be referred to as angular coding mode throughout this application. According to the angular coding mode, the angles $\theta$ associated with points or nodes are compared to fixed angles $\{\theta_{laser}\}$ associated with beams (e.g., laser beams), and this comparison is used to build an estimate of occupancy of the child nodes. Practically, a selection of a context in the binary entropy coder, that directly or indirectly (planar mode) codes the occupancy bit of the child node, is performed based on the value of the estimate. Possible implementations of this scheme will now be described in more details below. In general, the angular coding mode may be said to involve determining a context for entropy coding an occupancy pattern of a current volume (or node) based on angular information for child sub-volumes (or sub-nodes) or groups of child sub-volumes of the volume, wherein the angular information is indicative of one or more angles (e.g., elevation angles) relative to a location associated with the beam assembly that provides the beams.

Let $(x_{head}, y_{head}, z_{head})$ be the location of a (Lidar's) head (or beam assembly in general), oriented vertically along the z axis in the three-dimensional space XYZ (volumetric space) to which the points of the point cloud belong. The tangent $\tan(\theta)$ of the vertical angle $\theta$ of a point $(x,y,z)$ is the ratio of the elevation $z-z_{head}$ and the distance r of the point relatively to the head.

$$\tan \theta = (z-z_{head})/\sqrt{(x-x_{head})^2+(y-y_{head})^2}$$

Figure 16:
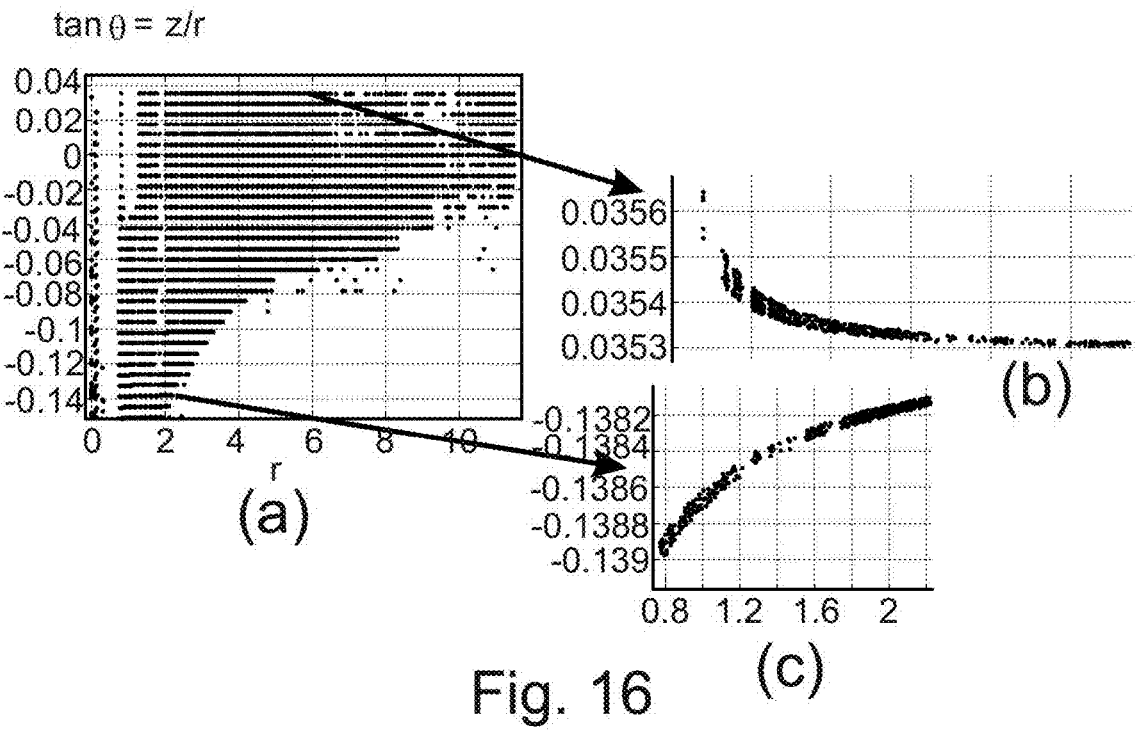
FIG. 16 shows details of the diagram in FIG. 14.

As can be seen from the r–tan($\theta$) diagram of FIG. 16, which shows detailed views relative to FIG. 14, the angle tan($\theta$) is somewhat constant, but not strictly constant, for the points probed by the same beam. In fact, as can be seen from panels (b) and (c) of FIG. 16, there exists for each beam a respective envelope in the (r, tan($\theta$)) diagram that contains the points acquired by this beam. The width of this envelope (in the tan($\theta$) direction) clearly depends on the distance r.

The width of this envelope is due to noise and acquisition precision, and widens for lower r. Notably, the envelopes for adjacent beams do not intersect with each other.

While the belonging of a point to a respective envelope already offers additional knowledge that can be leveraged for improved compression performance, it would be advantageous to obtain a corrected angle $\theta_{corr}$ that exhibits a more stable value through a wide range of distances r. This can be achieved, for example, by adding a correction term to the position of each beam emitter (e.g., laser) relative to the head position (or, in general, relative to the reference location of the beam assembly).

Figure 17:
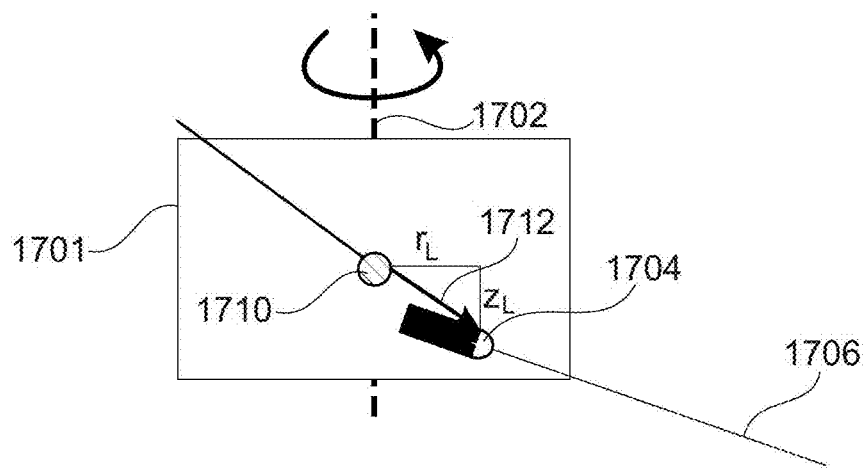
FIG. 17 shows an example of an arrangement of a beam emitter of the beam assembly relative to a reference location of the beam assembly.

FIG. 17 schematically illustrates a location of a beam emitter 1704 relative to the reference location 1710 of the beam assembly 1701, for explaining an example method of correcting the angle $\theta$ to obtain a corrected angle $\theta_{corr}$. In particular, the position (location) of a beam emitter (e.g., laser) L is corrected by a shift $(r_L, z_L)$ 1712 relative to the reference location 1710 of the beam assembly (e.g., head position), such that the respective beam 1706 is emitted from the vertical location $z_{head}+z_L$ and the distance (of a point) to the beam emitter laser is corrected to become $r-r_L$. As such, the corrected location of the beam emitter may be referred to as an origin location or beam origin location for the respective beam 1706. The corrected angle $\theta_{corr}$ depends on the beam emitter index (e.g., laser index) L and is provided by $$\tan \theta_{corr,L}=(z-z_{head}-z_L)/(\sqrt{(x-x_{head})^2+(y-y_{head})^2}-r_L)$$

For points not too close to the beam assembly (e.g., Lidar's head), i.e. for not too small values of the distance r, this angle can be approximated by $$\tan \theta_{corr,L} \approx (z-z_{head}-z_L)/\sqrt{(x-x_{head})^2+(y-y_{head})^2}=\tan \theta - z_L/r$$

and only the vertical correction $z_L$ is needed while the radial correction $r_L$ may be neglected. As such, the beam origin position may be determined, starting from the reference location of the beam assembly, based on a relative displacement that can be expressed in terms of $(r_L, z_L)$ or only in terms of $z_L$.

Figure 18:
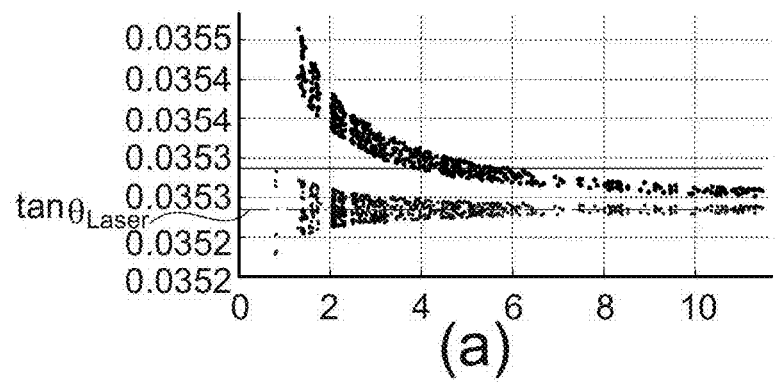
FIG. 18 shows a diagram including points of an example point cloud expressed in the (r, θ) plane after a correction of angle θ has been performed based on characteristics of the beam assembly.
Figure 18:
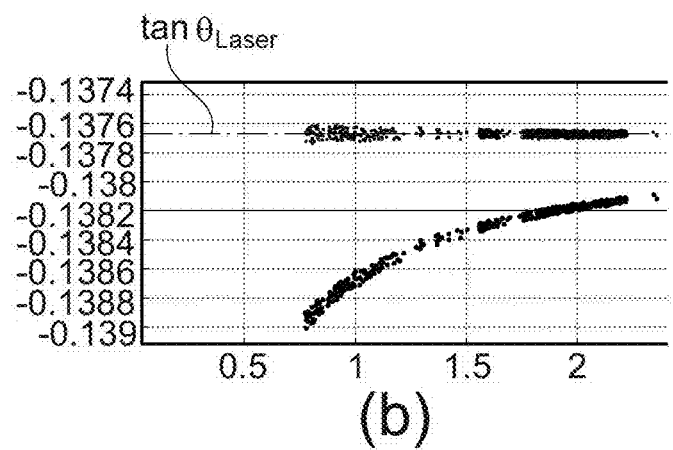

FIG. 18 shows the effect of the vertical correction $z_L$ on the angle $\theta$. Panel (a) corresponds to panel (b) in FIG. 16 and panel (b) corresponds to panel (c) in FIG. 16. The upper envelope in panel (a) and the lower envelope in panel (b) relate to uncorrected (i.e., initial) angles $\theta$. The lower envelope in panel (a) and the upper envelope in panel (b) relate to corrected angles $\theta_{corr}$. As can be clearly seen, the corrected angles exhibit a mean constant behavior substantially independent on the distance r. The angle $\theta_L=\theta_{laser}$ of the respective beam or beam emitter (e.g., laser) L is defined as this constant.

To enable a correction of angles $\theta$ both at the encoder side and the decoder side, the following values may be determined by or provided to the encoder, and encoded into the bitstream such that the decoding process can use the same beam assembly information (e.g., Lidar information) as the encoding process:

the reference location (e.g., center location) of the beam assembly, such as the (Lidar's) head position $(x_{head}, y_{head}, z_{head})$, for example the relative position $(r_L, z_L)$ for each beam emitter (e.g., laser)

the constant angle $\theta_L$ for each beam emitter (e.g., laser)

Examples of syntax elements describing characteristics of the beam assembly or beam assemblies that have been used for acquiring (e.g., sampling) point clouds that are to be coded will be described in more details below.

As an example, the reference location of the beam assembly (e.g., position of the Lidar's head) may be provided by a user, and the relative positions and corrected angles of the beam emitters (e.g., lasers) of the beam assembly may be found algorithmically. In one example, this may be performed as follows:

1. first, by analyzing the histogram of non-corrected angles θ, points belonging to a same laser beam L are extracted
2. then, the relative position $(r_L, z_L)$ of the laser beam L is determined by minimizing the standard deviation of the corrected angles $θ_{corr,L}$ over the extracted points. This can be performed by a classical minimization algorithm, for example. In case only the vertical shift $z_L$ is considered, this is a simple minimization on an interval of candidate vertical relative positions.
3. finally, the constant angle $θ_L$ of the laser L is the mean value of the corrected angles $θ_{corr,L}$ over the extracted points.

Next, example methods for determining corrected angles for specific points of the point clouds or specific volumes, sub-volumes, or groups of sub-volumes will be described. In particular, a method is described for the determination of the tangent $\tan(θ_{corr,L})$ of the corrected angle of a point of a point cloud, relatively to a beam (e.g., laser beam) L. In a similar manner, a corrected angle may be determined for a node (or its associated volume) of the octree by simply assimilating the node to the point located at its center. Analogous considerations apply to sub-volumes of the volume, or groups of sub-volumes.

Concerning volumes (associated with respective nodes of the octree), it is understood that there is a condition on the size and location of a volume to determine unambiguously by which beam the volume (e.g., points in the volume) has been acquired. If two beams intersect the volume, there is ambiguity. To address this issue, the present application proposes to introduce the concept of (angular) eligibility of a volume for the angular coding mode.

In one example, the angular eligibility of a volume (or its associated node) is determined as follows:

1. compute the distance r of (the reference location, e.g., center, of) the volume from the reference location of the beam assembly (e.g., the location of the Lidar's head ($x_{head}$, $y_{head}$, $z_{head}$))
2. compute the tangent angular size Δθ of the volume by Δθ=E/r where E is the typical length of the volume (e.g., the length of an edge of a cube)
3. the volume is eligible if $2Δθ≤Δθ_{min,laser}=\min|\tan(θ_{L1})-\tan(θ_{L2})|$ where the minimum is taken over all beam pairs, i.e. the angular size of the node is smaller than the angular delta between the (angularly) closest two beams. The factor 2 is chosen as a non-limiting example for providing some security margin. Other factors (e.g., factors larger than or equal to 1) are feasible as well.

Figure 19:
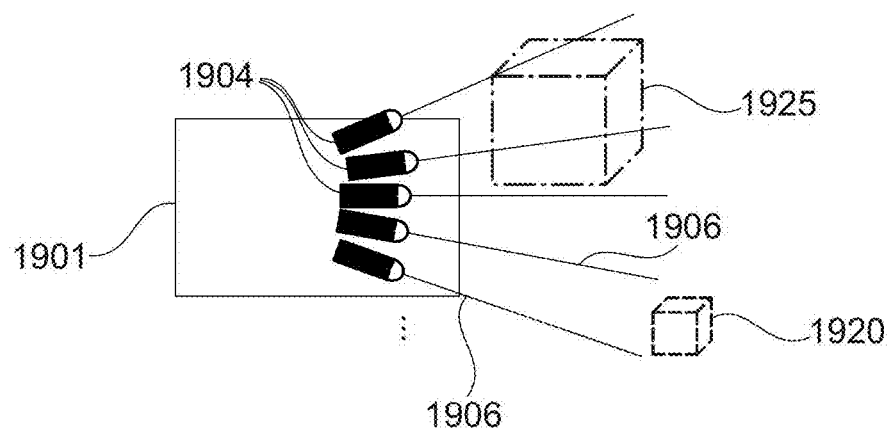
FIG. 19 shows examples of angular sizes of volumes of point cloud data relative to angle differences between beams emitted by the beam assembly.

FIG. 19 shows examples of an angular eligible volume 1920 and a volume 1925 that is not angular eligible. Namely, the size of volume 1925 and its distance from the beam assembly 1901 is such that it is sampled by multiple beams 1906 from multiple beam emitters 1904. On the other hand, the size of volume 1920 and its distance from the beam assembly 1901 is such that it is at most sampled by a single beam 1906.

In general, determining angular eligibility of a volume (or its associated node) may proceed by first determining a measure of an angular size of the volume as seen from a reference location of the beam assembly. The reference location may be the head's location, as noted above. The measure of angular size may relate to an angle under which an edge of the volume is seen from the reference location, and may be determined, for example, based on a length of the edge of the volume and a distance of (the reference location of) the volume to the reference location of the beam assembly. As such, the measure of angular size may be the angular size Δθ defined above, for example. Then, the measure of the angular size is compared to a measure of a difference angle between adjacent beams of the beam assembly, such as the difference angle $Δθ_{min,laser}$ defined above. That is, the difference angle may be the difference angle between the closest adjacent beams of the beam assembly. Finally, it is determined whether or not the volume is angular eligible based on a result of the comparison. For instance, determining angular eligibility may be based on whether the angular size is smaller than half the difference angle (or any other suitable fraction of the difference angle, to provide for a suitable safety margin). As will be described in more details below, angular eligibility of a volume may imply that a context for coding an occupancy pattern of (sub-volumes of) the volume may be determined or selected based on angular information.

Once angular eligibility has been determined, the belonging to a beam L for the angular eligible volume can be determined, for example, by the following approach:

1. determine, from the position (x,y,z) of the reference location of the volume (e.g., the center of the volume), z and r relative to the beam assembly's position ($x_{head}$, $y_{head}$, $z_{head}$)
2. compute the non-corrected angle $\tan(θ)=z/r$ $$\tan θ = (z - z_{Lidar})/\sqrt{(x - x_{Lidar})^2 + (y - y_{Lidar})^2}$$

3. determine to which closest beam L the volume/point belongs to by finding the beam index L for which $|\tan(θ)-\tan(θ_L)|$ is minimum Once the beam (e.g., laser beam) L has been determined, the corrected angle may be computed by the formula $$\tan θ_{corr,L} = \frac{z - z_{Lidar} - z_L}{\left(\sqrt{(x - x_{Lidar})^2 + (y - y_{Lidar})^2} - r_L\right)}$$

or $$\tan θ_{corr,L} \approx (z - z_{Lidar} - z_L)/\sqrt{(x - x_{Lidar})^2 + (y - y_{Lidar})^2} = \tan θ - z_L/r$$

Therein, the second equality may be practically useful as it avoids computing another inverse square root.

In general, the following approach may be followed for determining the corrected angle $θ_{corr}$ for a volume associated with a node of the octree. Initially, a first angle (e.g., elevation angle) is determined for a reference location within the volume, relative to a reference location of the beam assembly. The reference location within the volume may be the center of the volume, for example. The reference location of the beam assembly may be the center location of the beam assembly, for example. Based on the first elevation angle, a specific beam (or the corresponding beam emitter) L that is assumed to have acquired (or that has actually acquired) the points within the volume is determined. Next, an origin location (beam origin location) for that specific beam is determined or acquired. This may be done by any suitable approach described above. Having available the origin location of the specific beam, corrected elevation angles for sub-volumes or groups of sub-volumes (e.g., planes within the volume) can be determined relative to the origin location for the specific beam.

Figure 20:
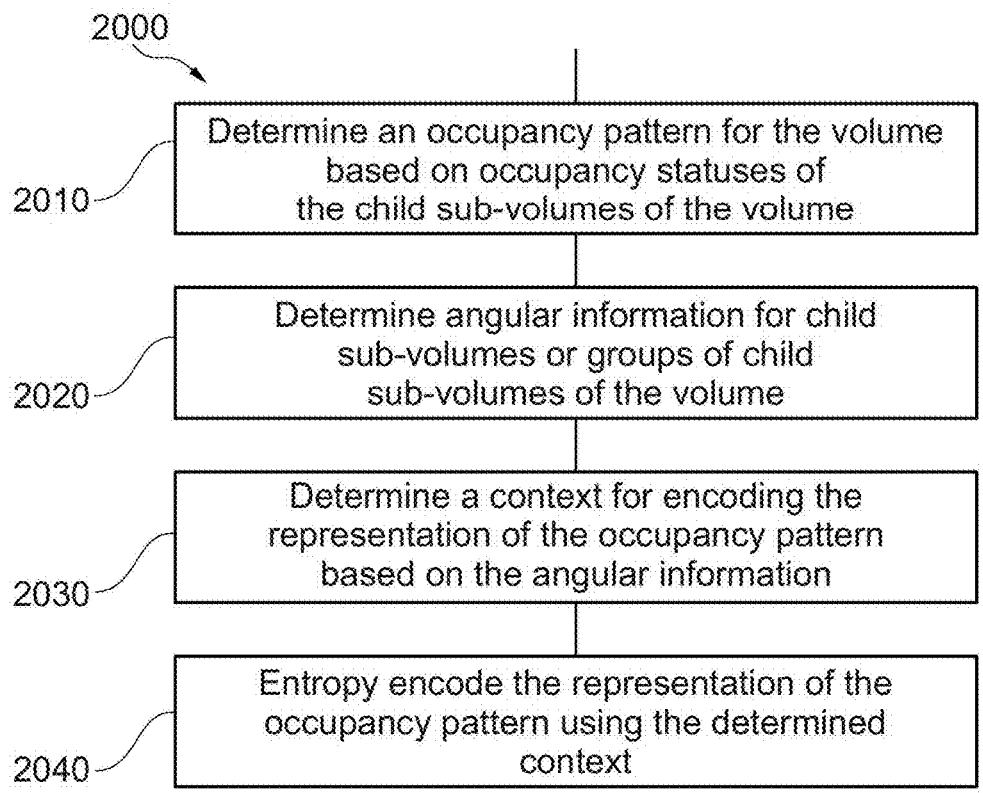
FIG. 20 shows, in flowchart form, one example method of encoding point cloud data using an angular coding mode.

FIG. 20 illustrates, in flowchart form, an example of a method 2000 of encoding a point cloud acquired by means of a beam assembly comprising a set of beams, to generate a bitstream of compressed point cloud data. The point cloud is defined by a tree structure (e.g., octree structure) having a plurality of nodes having parent-child relationships and representing a three-dimensional location of an object, as described elsewhere in the application. The point cloud is located within a volumetric space recursively split into sub-volumes and containing points of the point cloud. The point cloud may be defined with respect to a Cartesian axis in the volumetric space, which may be the vertically oriented z-axis normal to a horizontal plane and substantially parallel to a main axis or main orientation axis (e.g., rotating axis) of the beam assembly (e.g., Lidar). In the volumetric space, a volume is partitioned into a set of child sub-volumes, and the volume is associated with a node of the tree, with its sub-volumes being associated with the child nodes of the node. An occupancy bit associated with each respective child sub-volume indicates whether that respective child sub-volume contains at least one of the points. The occupancy bits of the child sub-volumes may be said to define an occupancy pattern. In method 2000, operations 2010 to 2040 are performed for a current node associated with a volume split into child sub-volumes.

In operation 2010, an occupancy pattern for the volume is determined based on occupancy statuses of the child sub-volumes of the volume. Operations 2020 to 2040 relate to entropy encoding a representation of the occupancy pattern into the bitstream. In operation 2020, angular information for child sub-volumes or groups of child sub-volumes of the volume is determined. This angular information is indicative of one or more angles (e.g., elevation angles) relative to a location associated with the beam assembly within the volumetric space. Elevation angles may indicate elevation angles of respective child sub-volumes or groups of child sub-volumes above a plane that is substantially orthogonal to a main direction (e.g., main axis) of the beam assembly (such as a common rotation axis of the set of beams, e.g., a rotation axis of a Lidar), when seen from a location associated with the beam assembly. In some implementations, the plane may be the horizontal plane (e.g., x-y-plane). The angles may be expressed as their tangents, for example. The location associated with the beam assembly may be the (reference) location of the beam assembly or the origin location of a specific beam of the beam assembly. In operation 2030, a context for encoding the representation of the occupancy pattern is determined based on the angular information. Finally, in operation 2040, the representation of the occupancy pattern is entropy encoded using the determined context.

Figure 21:
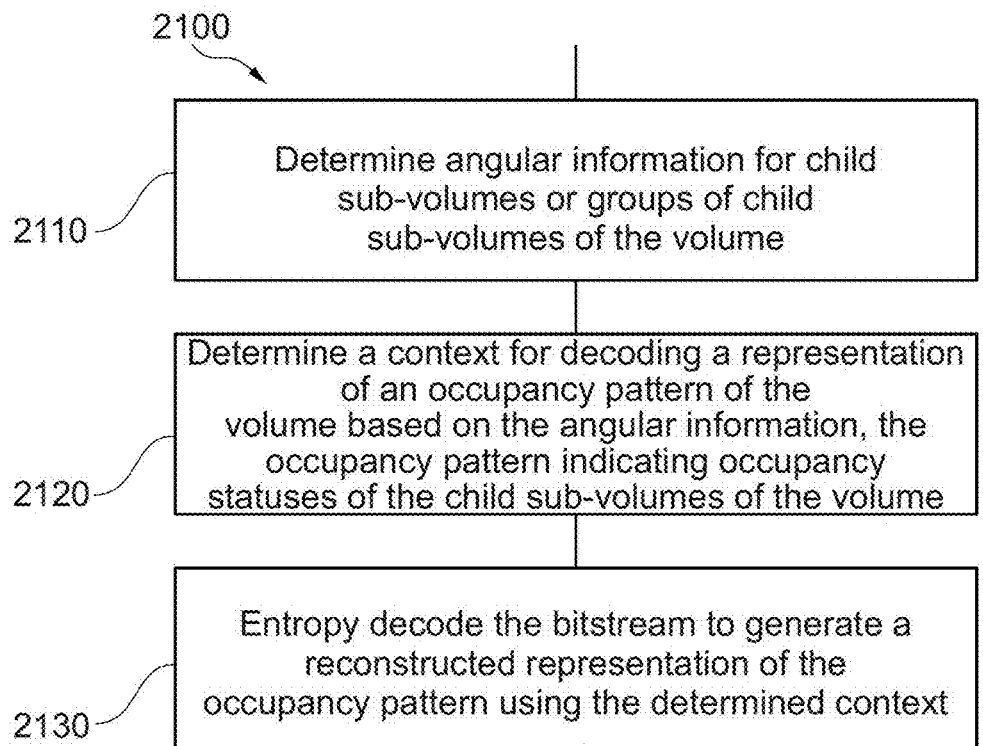
FIG. 21 shows, in flowchart form, one example method of decoding point cloud data using the angular coding mode.

FIG. 21 illustrates, in flowchart form, an example of a method 2100 of decoding a bitstream of compressed point cloud data to generate a reconstructed point cloud. In line with method 2000, it is assumed that the point cloud has been acquired by means of a beam assembly comprising a set of beams. Further, the point cloud is assumed to be defined in the same manner as described above for method 2000. Operations 2110 to 2130 are performed for a current node associated with a volume split into child sub-volumes.

In operation 2110, angular information for child sub-volumes or groups of child sub-volumes of the volume is determined. This angular information is indicative of one or more angles (e.g., elevation angles) relative to a location associated with the beam assembly within the volumetric space. In operation 2120, a context for decoding a representation of an occupancy pattern of the volume is determined based on the angular information. As above, the occupancy pattern indicates occupancy statuses of the child sub-volumes of the volume. Finally, in operation 2130, the bitstream is entropy decoded to generate a reconstructed representation of the occupancy pattern using the determined context.

As noted above, the angular information may relate to corrected angles (e.g., corrected elevation angles), in the sense that the corrected angles are measured with reference to the beam origin location of the specific beam that is assumed to have acquired (e.g., sampled) points in the current volume. Accordingly, determining the angular information may comprise determining a first (e.g., initial) elevation angle for a reference location within the volume relative to a reference location of the beam assembly. Once this first elevation angle is available, it can be used for determining the specific beam that can be assumed to have acquired the points within the volume. Knowing the specific beam, its origin location can be determined, for example by using a look-up table or by determining it algorithmically. Finally, the one or more elevation angles for child sub-volumes or groups of child sub-volumes of the volume can be determined relative to the origin location of the specific beam. These elevation angles would then correspond to corrected elevation angles.

Next, an embodiment that uses the angular information for determining a context for entropy coding a plane position flag in the planar coding mode introduced above will be described.

It has been observed that directly coding the planar information, i.e. the planar mode flag (e.g., flag isPlanar) and the bit for the plane position flag (e.g., flag planePosition) for the plane position, without compression might lead to an inefficient planar mode. Therefore, compressing the syntax associated with the planar mode could prove advantageous. Such compression of the plane position flag can be achieved by selecting a context for the binary entropy coder for the plane position flag based on a prediction method, as described above.

For the z-planar mode, if the node is planar (isZPlanar==true), the plane position (bottom or top) must be signaled by an extra bit planeZPosition. This bit is also coded using a binary arithmetic coder whose context depends on a predictive information as shown in FIG. 9. This predictive information is made of any, some, or all of:
 the occupancy of the parent node's vertical neighbor adjacent to the current node,
 the distance d from the closest already coded node at same z and same depth, where d may be discretized into three values "near" or "not too far" or "far",
 the plane position (if any, bottom or top) of the closest already coded node at same z and same depth (as the current node), and
 the vertical coordinate z of the current node relative to its parent node.

Using all of the above predictive information, this leads to 2×3×2×2=24 possible predictive combinations in case the closest already coded node at the same z and the depth (as the current node) is planar; otherwise when the closest already coded node at the same z and the same depth is not planar, an extra specific context is used instead. Thus, 24+1=25 contexts may be used by the binary arithmetic coder to code the plane position.

The present embodiment proposes to enhance or replace the predictive information of the bitplaneZPosition by using the knowledge of angular information (e.g., $\tan(\theta_{corr,L})$) for angular eligible nodes.

Accordingly, the context determination in operation 2030 or operation 2120 in this embodiment may depend on whether the volume is (determined to be) a planar volume. Methods 2000 and 2100 may include a respective determination step to this end. As described above, a planar volume is a volume, partitioned into a plurality of sets of child sub-volumes in respective parallel planes, for which all child sub-volumes containing at least one point are positioned in the same plane. The parallel planes may be understood to be parallel to the horizontal plane, or orthogonal to the main axis of the beam assembly (e.g., the rotation axis of the Lidar's head). For the case of an octree, for example, there would be a first set of four child sub-volumes and a second set of four child sub-volumes, and the plane position flag would indicate whether the child sub-volumes containing points are located in either the first set or the second set.

If the volume is (determined to be) a planar volume, determining the context for coding the representation of the occupancy pattern in operation 2030 or operation 2120 comprises determining a context for coding a plane position flag based on the angular information defined above. This plane position flag (e.g., flag planeZPosition) signals a position of the plane in which the child sub-volumes containing at least one point are positioned. Moreover, entropy coding the representation of the occupancy pattern in operation 2040 or operation 2130 comprises entropy coding the plane position flag using the determined context.

In some implementations, the predictive information given above may be superseded, partly superseded, or enhanced, by the angular information. Accordingly, determining the context for coding the plane position flag may be based, at least in part, on one or more of: (a') occupancy of a neighboring volume at the depth of a parent volume of the volume, (b') the distance between the volume and the closest already-coded occupied volume, (c') a plane position, if any, of the closest already-coded occupied volume, or (d') a position of the volume within the parent volume, in addition to the angular information. The distance may be near, not too far, or far and is based on calculating a distance metric and comparing it to a first threshold and a second threshold. In general, determining the context for coding the plane position flag may be based on a combination of three or more (or four or more) of (a'), (b'), (c'), (d'), and the angular information.

The angular information that is used for determining the context may comprise respective elevation angles for each of the plurality of parallel planes of the volume, relative to the origin location of the specific beam that has been determined for the volume. Accordingly, determining the angular information may comprise determining these elevation angles for respective planes. The elevation angles may be determined for reference locations (e.g., center locations) within each parallel plane, relative to the origin location of the specific beam. Determining the context for coding the plane position flag may comprise comparing the respective elevation angles for each of the plurality of parallel planes to a beam angle $\theta_L$ (or $\tan(\theta_L)$) of the specific beam assumed to have sampled the volume, and determining the context for coding the plane position flag based on results of respective comparisons.

Figure 22:
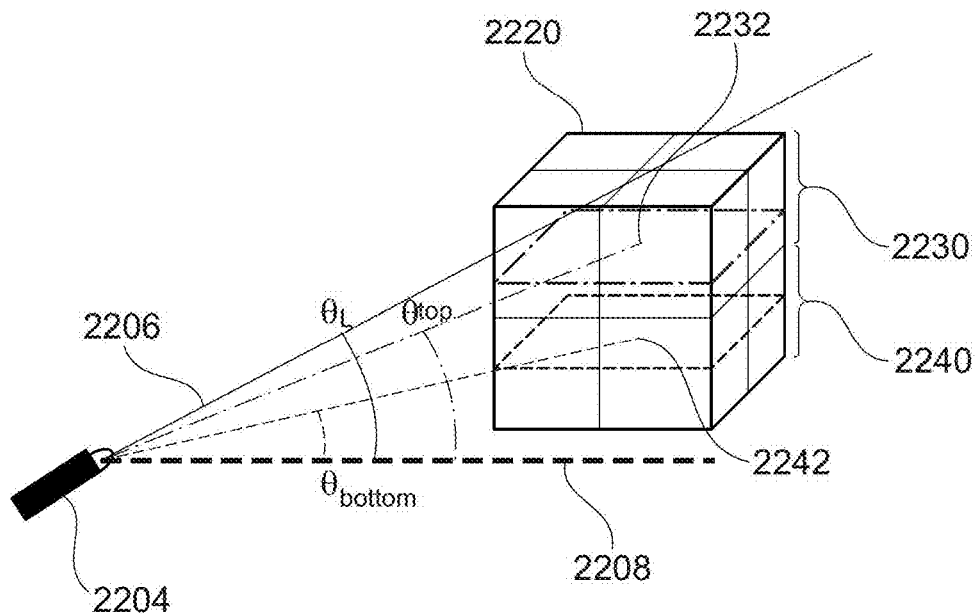
FIG. 22 shows examples of angles of groups of sub-volumes of a volume of point cloud data relative to a beam emitter.

For the case of an octree, the above amounts to calculating two angles, namely the bottom and top corrected vertical angles, for the bottom and top virtual planes, respectively. In some implementations, the determination of the two angles may be subject to whether the child nodes of the node are angular eligible. These two angles correspond to the corrected angles $\tan(\theta_{bottom,L})$ and $\tan(\theta_{top,L})$ associated with the points located at the center of the two bottom and top virtual planes and are illustrated in FIG. 22. In this figure, the angular eligible volume 2220 has (a set of sub-volumes corresponding to) an upper plane 2230 and (a set of sub-volumes corresponding to) a lower plane 2240. The corrected angle $\tan(\theta_{top,L})$ measures the elevation of the center location 2232 of the upper plane 2230 above the horizontal plane 2208 when seen from the origin location of the beam emitter 2204 emitting the beam 2206 that has sampled points in the volume 2220. Likewise, the corrected angle $\tan(\theta_{bottom,L})$ measures the elevation of the center location 2242 of the lower plane 2240 above the horizontal plane 2208 when seen from the origin location of the beam emitter 2204.

Once the elevation angles $\tan(\theta_{top,L})$ and $\tan(\theta_{bottom,L})$ for the virtual planes of the volume are calculated, they can be used for determining the context for entropy coding the plane position flag. For example, determining the context may be based on at least one of: differences between the beam angle $\tan(\theta_L)$ of the specific beam and respective elevation angles for each of the plurality of parallel planes, magnitudes of differences between the beam angle of the specific beam and respective elevation angles for each of the plurality of parallel planes, and a quantization result of a difference between a largest one among magnitudes of differences between the beam angle of the specific beam and respective elevation angles for each of the plurality of parallel planes and a smallest one among magnitudes of differences between the beam angle of the specific beam and respective elevation angles for each of the plurality of parallel planes. In some implementations, this may involve comparing said differences between the beam angle of the specific beam and respective elevation angles for each of the plurality of parallel planes to each other and/or comparing said magnitudes of differences between the beam angle of the specific beam and respective elevation angles for each of the plurality of parallel planes to each other. Quantization may be ternary quantization, for example.

For the case of an octree, the context for entropy coding the plane position flag may be determined using the two angles $\tan(\theta_{bottom,L})$ and $\tan(\theta_{top,L})$ (possibly together with the predictive information (a') to (d') given above).

For example, an angular context index may be determined from bottom/top vertical angles $\tan(\theta_{bottom,L})$ and $\tan(\theta_{top,L})$ by computing the context index as follows:

a first bit of the context index depends on whether or not the differences $\tan(\theta_L)-\tan(\theta_{bottom})$ and $\tan(\theta_L)-\tan(\theta_{top})$ have the same sign a second bit of the context index depends on which of $|\tan(\theta_L)-\tan(\theta_{bottom})|$ and $|\tan(\theta_L)-\tan(\theta_{top})|$ has the highest magnitude the context index depends also on the quantization (e.g., ternary quantization) of the difference D=max−min among $|\tan(\theta_L)-\tan(\theta_{bottom})|$ and $|\tan(\theta_L)-\tan(\theta_{top})|$. The quantization may be performed relative to the inverse radius r associated with the node center, i.e. the value D*r may be quantized In pseudo-code, the determination of the angular context index in the above example may be obtained by

```
m = tan(θ_L)− tan(θ_top)
M = tan(θ_L)− tan(θ_bottom)
context_index = m*M >= 0 ? 1 : 0
m = | m |
M = | M |
context_index += m<M ? 2 : 0
if (m > M) {
   temp = m
   in = M
   M = temp
}
D = M − m
QD = (D*r >= 0.5 ? 1 : 0) + (D*r >= 1 ? 1 : 0) + (D*r >= 1.5 ? 1 : 0)
context_index += 4*QD
```

In the above example, the quantity D*r is quantized over four values {0,1,2,3} corresponding to the value of D*r being smaller than 0.5, between 0.5 and 1, between 1 and 1.5 or greater than 1.5. Consequently, the angular context index can take 2*2*4=16 values.

As noted above, the angular context can either replace the predictive information used in the planar mode context determination (e.g., predictive information (a') to (d')) or enhance the predictive information to create a new (i.e., bigger) set of planar/angular contexts.

Next, an embodiment that uses the angular information for determining contexts for entropy coding occupancy bits for the child sub-volumes of a volume will be described.

The occupancy of the child nodes (child sub-volumes) of a current node (current volume) is signaled by respective occupancy bits that are coded by arithmetic entropy coders for which "contexts" are selected depending on the occupancy of neighboring nodes. For the case of an octree, the occupancy of eight child nodes is signaled by eight respective occupancy bits.

Thus, in the present embodiment, determining the context for coding the representation of the occupancy pattern comprises determining contexts for coding occupancy bits for child sub-volumes of the volume. Further, entropy coding the representation of the occupancy pattern comprises entropy coding the occupancy bits using the determined contexts.

Conventionally, the context selection for the occupancy bits is performed on the arithmetic coder itself through the so-called OBUF mechanism that provides the index of a binary entropy coder, among a (very) limited number of coders, selected to code an occupancy bit. The index of the selected coder can be obtained, for example, depending on the following information:
   the value of the preceding coded occupancy bits,
   neighboring information,
   inter/intra prediction.
In practice, the index may be provided by the output of a Look UP Table (LUT) whose entries mirror the above information. In general, each occupancy bit may be coded by an entropy coder that is selected for that occupancy bit from a predefined set of entropy coders.

The present embodiment proposes to determine the contexts for the occupancy bits based, at least in part, on the angular information. In some implementations, this may amount to modifying the OBUF LUT entries of the coder index by adding the angular information to the list of information used by the entries.

Figure 23:
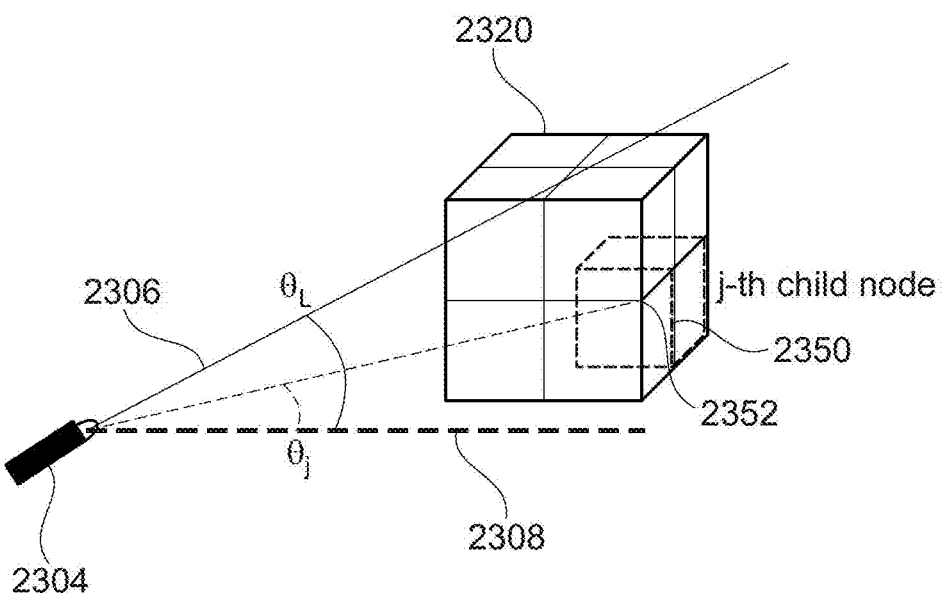
FIG. 23 shows examples of angles of sub-volumes of a volume of point cloud data relative to a beam emitter.

FIG. 23 shows an example of a determination of the angular information for determining the context for entropy coding the occupancy bits of the child nodes of the current node. For an angular eligible current volume (associated with a current node) 2320, once the specific beam L 2306 which is assumed to have acquired (e.g., sampled) the points in the volume 2320 has been determined, the corrected angle $\tan(\theta_{j,L})$ is computed for each of the child nodes j 2350 (e.g., eight child nodes in the case of an octree) of the current node. These angles may be computed for the center locations 2352 of the child nodes (or their associated child sub-volumes). As noted before, the angles may be elevation angles relative to the horizontal plane 2308 when seen from the origin location of the beam 2306 (or equivalently the location of the beam emitter 2304). Then, for each child node j, the angular distance $\Delta_j$ from the specific beam L may be determined by $$\Delta_j = |\tan(\theta_L) - \tan(\theta_{j,L})|$$

In general, determining the angular information in operation 2020 or operation 2110 in this embodiment comprises determining respective elevation angles for each of the child sub-volumes of the volume, relative to the origin location of the specific beam. Then, the contexts for coding occupancy bits for child sub-volumes of the volume can be determined by comparing the respective elevation angles for each of the child sub-volumes of the volume to a beam angle of the specific beam (e.g., by computing differences or angular distances $\Delta_j$ between respective angles), and by determining the contexts for coding occupancy bits for child sub-volumes of the volume based on results of respective comparisons.

Two example methods for using the comparison results (e.g., angular distances $\Delta_j$) in the context determination (e.g., as an enhancement of the OBUF LUT entries) will be described hereinbelow.

In the first example, selecting coders (contexts) for the occupancy bits may involve ordering the occupancy bits based on respective measures of differences $\Delta_j$ between the elevation angles for each of the child sub-volumes of the volume and the beam angle of the specific beam. Then, respective coders (contexts) may be selected based on the order indices of respective occupancy bits of the child sub-volumes.

Specifically, a method according to the first example may proceed as follows:
1. order the child sub-volumes depending on the value of their $\Delta_j$'s, for example from smaller to higher. Each child sub-volume j is thus assigned an order index $0 \leq o(j) \leq 7$.
2. Optionally, the order index o(j) may be capped by a value smaller than 7.
3. The ordering index o(j) is directly used in the OBUF LUT entry with the expectation that smaller indices (i.e., smaller $\Delta_j$ in the present example) lead to a higher probability of occupancy.

In the second example, selecting coders (contexts) for the occupancy bits may involve quantizing respective measures of differences $\Delta_j$ between the elevation angles $\theta_{j,L}$ for each of the child sub-volumes of the volume and the beam angle $\theta_L$ of the specific beam L and selecting respective coders (contexts) based on respective quantized values of said measures of differences.

Specifically, a method according to the second example may proceed as follows:
1. For each child sub-volume j, quantize the value $\Delta_j$ (or $\Delta_j*r$) to obtain a discrete value $Q(\Delta_j)$. The quantized value may be capped to a given threshold.

2. The quantized value $Q(\Delta_j)$ can be directly used in the OBUF LUT entry with the expectation that smaller values lead to a higher probability of occupancy.

It is understood that any statements made in this application with regard to angles likewise applies to the angles' tangents, and vice versa. In particular, computations involving the tangents of respective angles could be likewise performed based on the angles themselves, and vice versa, possibly after appropriate trigonometric transformations. In some implementations, it may be advantageous to use the tangent of angles to avoid the usage of costly trigonometric functions or their approximations.

Influence of the Volume Shape on the Angle Determination

The shape of an angular eligible volume has an influence on the capability of the angular information to discriminate between occupied and non-occupied sets of sub-volumes. More precisely, volumes stretched in the vertical direction tend to provide a better discrimination when considering elevation angles used to determine context for the entropy coder that codes occupancy information representative of the occupancy of the sets of sub-volumes.

Figure 29:
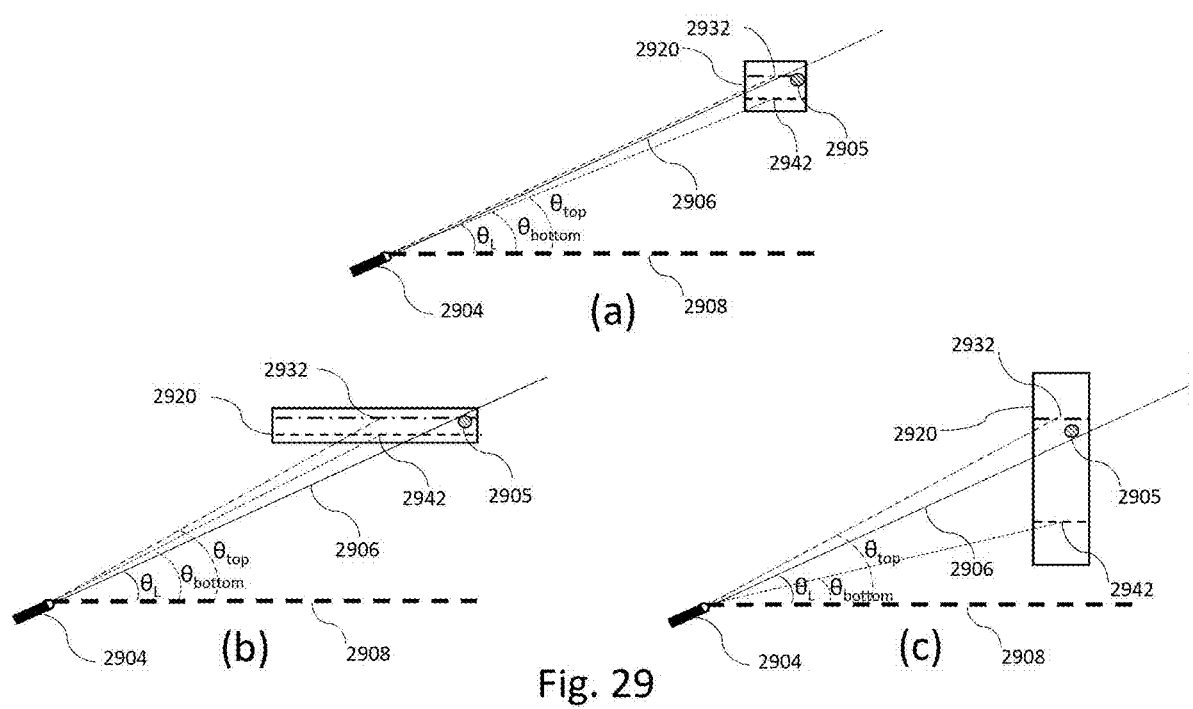
FIG. 29 shows examples of shapes of a volume of point cloud data and angles of groups of sub-volumes of the volume relative to a beam emitter.

Reference is now made to FIG. 29 in which each panel (a), (b) and (c) is a two-dimensional representation (in the plane (r,z)) of FIG. 22. Here, the two-dimensional representation is used for the sake of simplicity to represent the influence of the shape of the angular eligible volume 2920 on the corrected angle $\tan(\theta_{top})$ (respectively $\tan(\theta_{bottom,L})$) obtained by measuring the elevation of the center location 2932 of an upper plane (respectively the center location 2942 of a lower plane) above the horizontal plane 2908 from the origin location of the beam emitter 2904. The emitted beam 2906 has sampled point 2905 in the volume 2920. Panel (a) depicts the volume 2920 as being essentially cubic, panel (b) depicts the volume 2920 as being elongated in the radial direction (relative to the Lidar's main axis), and panel (c) depicts the volume 2920 as being elongated in the direction of the Lidar's main axis. One should consider volumes 2920 encompassing essentially the same cubic measure to compare the effect of their shape on the angle determination. It is geometrically observed that volumes 2920, encompassing essentially the same cubic measure, having a higher ratio H/W, where H is the volume height along the main axis direction and W is the volume width along the radial direction, lead to a higher angle discrimination, $\tan(\theta_{top})$ against $\tan(\theta_{bottom,L})$ relatively to the beam angle $\tan(\theta_L)$, to predict the occupied set of sub-volumes. Thus, it may be advantageous, when using angular mode coding, to construct a tree such that the volumes associated with the nodes of the tree have a ratio H/W strictly greater than 1.

In a first example, high ratio H/W for the volumes associated with the nodes of the tree representing the geometry of the point cloud may be obtained by starting from an initial volume (or bounding box), associated with the root node, that itself has a high ratio H/W and then splitting this initial volume recursively following a tree structure (e.g. an octree structure or any other tree structure) such that all sub-volumes associated with child nodes have the same ratio H/W until a minimum size is reached.

In a second example, high ratio H/W for the volumes associated with the nodes of the tree representing the geometry of the point cloud may be obtained by starting from an initial volume (or bounding box), associated with the root node, that has any arbitrary ratio H/W, then splitting this initial volume recursively along the radial (e.g. along x and y axes) direction such as sub-volumes associated with child nodes are obtained fulfilling a ratio condition H/W>=r>1, where r is a given ratio parameter, and finally continuing the splitting recursively following a tree structure (e.g. an octree structure or any other tree structure) such that all subsequent sub-volumes keep preserving the same ratio condition H/W=r until a minimum sub-volume size is reached. For example, a minimum sub-volume size may be reached when the radial (e.g. the x size or/and the y size) size of a sub-volume has become the minimum acceptable size (e.g., size 1) and further splitting of said sub-volume can only be performed along the main axis (e.g., the z axis) without guaranteeing the ratio condition anymore. Further splitting may be performed until sub-volume sizes have become minimum (e.g., size 1 along the three axes).

Without loss of generality, the sizes H and W associated with a volume are representative of the height (along the head main axis) and the width along the radial axis of the volume. Practically, H may be the length of the segment obtained by projecting the volume onto the main axis (e.g. the z axis), such that H is well defined for any volume having a convex shape. Likewise, W may be the maximum among the lengths $L_x$ and $L_y$ of the two segments obtained by projecting the volume onto the (radial) axis (e.g. the x and y axes) orthogonal to the main axis, such that W is well defined for any volume having a convex shape.

In an embodiment of the second example, the ratio condition H/W=r>1 is obtained when an initial volume, which may be a (rectangular) cuboid (e.g. a shoe-box shape), is split recursively using Binary Tree (BT) and/or Quad-Tree (QT) partitioning along radial axes (e.g. the x and y axes). By definition, a BT partitioning along a radial axis split a volume into two sub-volumes by cutting the volume using a plane orthogonal to a radial axis (x or y axis). A QT partitioning along the radial axes split a volume into four sub-volumes by cutting the volume using two planes, each of them being orthogonal to one of the radial axes. In a specific embodiment, BT and QT partitioning may be performed such that the splitting planes are parallel to a face of the cuboid volume, and such that sub-volumes of the volume are all cuboids having the same sizes. Splitting the initial volume recursively using BT and/or QT partitioning along radial axes is performed until cuboid sub-volumes with a desired H/W=r>1 ratio are obtained.

In another embodiment, splitting the initial volume recursively using BT and/or QT partitioning along radial axes is performed until cuboid sub-volumes have reached a minimum radial size (e.g. the x size and the y size are both 1) and then further partitioning is performed along the main axis (e.g. the z axis) only until subsequent cuboid sub-volumes have reached a minimum overall size (e.g. size 1 along the three axes).

In another embodiment, splitting the initial volume recursively using only BT partitioning along one radial axes (e.g. x axis or y axis) is performed until obtained cuboid sub-volumes have equal sizes in both radial directions (e.g. size in x is equal to size in y), then a first further QT partitioning is performed along both radial axes (e.g. x and y axes) until subsequent cuboid sub-volumes have reached a minimum radial size (e.g. the x size and the y size are both 1), and then a second further partitioning is performed along the main axis (e.g. the z axis) only until subsequent cuboid sub-volumes have reached a minimum overall size (e.g. size 1 along the three axes).

In another embodiment, splitting the initial volume recursively using only BT partitioning along one radial axes (e.g. x axis or y axis) is performed until obtained cuboid sub-volumes have equal sizes in both radial directions (e.g. size in x is equal to size in y), then a first further QT partitioning is performed along both radial axes (e.g. x and y axes) until subsequent cuboid sub-volumes have reached a desired ratio condition H/W=r>1, then a second further partitioning is performed along all the axes (e.g. x, y and z) until minimum radial size is reached, and finally a third further partitioning is performed along the main axis (e.g. the z axis) only until subsequent cuboid sub-volumes have reached a minimum overall size (e.g. size 1 along the three axes).

In yet another embodiment of the second example, a target ratio r may be signaled in the bitstream. Both the encoder and the decoder may split volumes associated with nodes along radial axes, for example by using BT and or QT partitioning, until the H/W ratio of an obtained sub-volume becomes at least r (e.g. H/W>=r). Once the target ratio H/W>=r has been reached for a sub-volume, this sub-volume may then be further split by using an octree partitioning or any other tree partitioning (e.g. Binary Tree partitioning along the main axis). A decoder may receive a target ratio r from the bitstream, decode the target ratio r and use it for the partitioning of the initial volume. In case no target ratio r is present in the bitstream, the value of the target ratio r may be either inferred to a predetermined value (for example r=1) or the partitioning of the initial volume may start directly by any tree partitioning without targeting any value for the ratio H/W of sub-volumes.

Angular Mode Syntax

As has been described above, the angular information (e.g., $\tan(\theta_{corr,L})$) may be used to improve the compression capability of the geometry of a point cloud represented, for example, by an octree. One question that may arise in the context of angular mode coding is which information should be put into a dedicated syntax in the bitstream to fully describe the quasi-2D space to which the points of a point cloud acquired by a beam assembly (e.g., Lidar) belong, and to aid the determination of the angular information. Another question is where this information should be put in the bitstream.

Since it is an important goal to use the information provided by the syntax to improve the compression capability of a point cloud codec, it should be ensured that the proposed syntax is sufficiently compact to not unnecessarily negatively impact the size of the bitstream. Moreover, the syntax should be flexible enough to be able to describe also somewhat complex acquisition scenarios involving multiple beam assemblies (e.g., Lidar's) with various positions and orientations (not necessarily vertical). The present embodiment proposes syntax (e.g., high-level syntax) that addresses the aforementioned questions and needs.

Firstly, possible characteristics of beam assemblies (such as Lidars or Lidar heads, for example) will be described with reference to FIGS. 24 to 26. Without intended limitation, reference will be made to Lidars or Lidar heads, but other implementations of beam assemblies for acquiring point clouds should be understood to be likewise encompassed by the present description.

Figure 24:
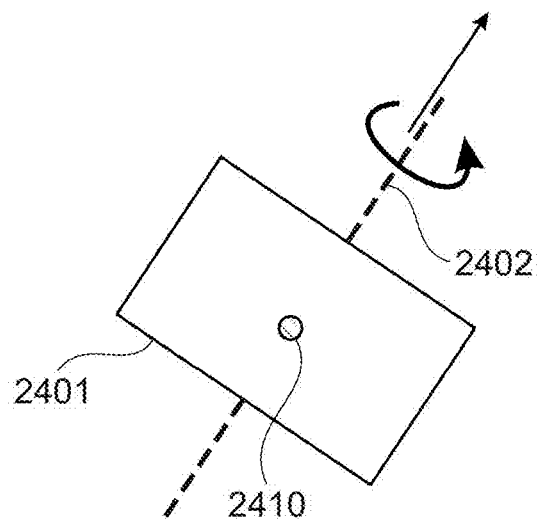
FIG. 24 shows an example arrangement of a main axis of a beam assembly.
Figure 25:
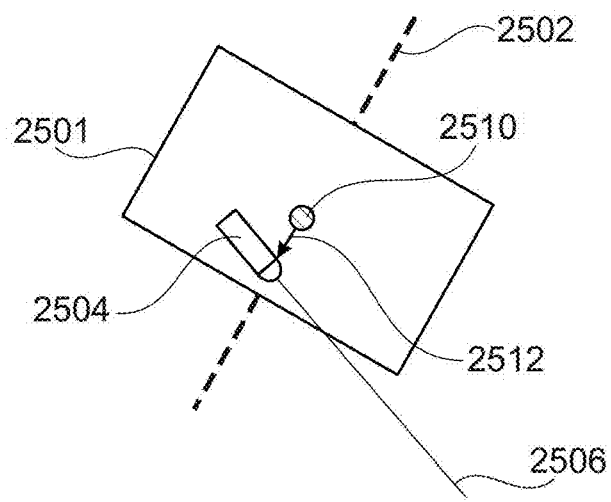
FIG. 25 shows an example of an arrangement of a beam emitter of the beam assembly of FIG. 24 relative to a reference location of the beam assembly.

A point cloud may be captured (e.g., acquired) by one or more Lidar heads. For example, several Lidars (Lidar heads) may be attached to a vehicle, each of them acquiring (e.g., sampling, probing) a part of the scene. In case of a single Lidar head, it is natural to align the 3D xyz space (e.g., the aforementioned volumetric space) with the Lidar orientation. For example, the vertical axis z may be arranged to be in parallel to the Lidar's head rotation axis, and the Lidar's head center may be located at the origin O=(0,0,0) of the xyz coordinates. However, such an alignment should not be imposed. Worse, it cannot hold for more than one Lidar when dealing with several Lidars acquiring the same point cloud. Consequently, it is proposed to include at least the following Lidar position information into the syntax:

the number of (Lidar) heads
for each head
the head position ($x_{head}$, $y_{head}$, $z_{head}$)
the head orientation (main axis, main orientation axis), e.g., the orientation of the axis of rotation of the head Reference is now made to FIG. 24, which shows, in schematic form, a Lidar head 2401 (as a non-limiting example of a beam assembly). Also shown are the center location 2410 and the main axis (e.g., rotation axis) 2402 of the Lidar head 2401. The orientation of a Lidar head 2401 may or may not be parallel to an axis of the xyz coordinates of the 3D space in which the point cloud is defined. In case it is not, the main axis (e.g., axis of rotation) of the head may be signaled in the bitstream by either two angles (e.g., $\varphi$, $\theta$) in spherical coordinates or a (unitary) 3D vector. It is understood that the main axis 2402 is assumed to run through the reference location 2410 of the beam assembly.

In order to ensure the syntax to be compact for a single Lidar head use case, it is advantageous to have shortcuts in signaling the specific situation where the head is located at the origin, i.e. $x_{head}=y_{head}=z_{head}=0$, and/or the main axis is parallel to one of the xyz coordinate axes. Examples of such shortcuts will be described below.

Concerning beams (e.g., lasers), in order to be able to compute the corrected angles described above, it is proposed to include, for each head, the following information into the syntax:

for each head
number of beams (e.g., lasers) attached to or comprised by the head
for each beam
beam relative position (e.g., relative position of the beam origin to the reference/center location of the head)
beam angle As discussed above, relative positions of beams may be important for calculating corrected angles that ensure that the angles of point acquired by a given beam are constant independently on the distance r from the head. The main correction factor is the relative position $d_L$ of a beam (beam origin), relative to the head position, along the main axis (e.g., rotation axis). This is shown in FIG. 25, in which a beam emitter (e.g., laser) 2504 that emits a beam 2506 is displaced from the center location 2510 of the head 2501 by a displacement vector 2512. In this case, the displacement vector 2512 extends along the main axis (e.g., rotation axis) 2502 of the head 2501, so that the displacement vector 2512 can be expressed by the distance $d_L$ along the main axis 2502. Accordingly, the syntax may include an indication of the relative displacement or distance $d_L$ (e.g. the signed length of the vector 2512) for each beam emitter of a given head.

Figure 26:
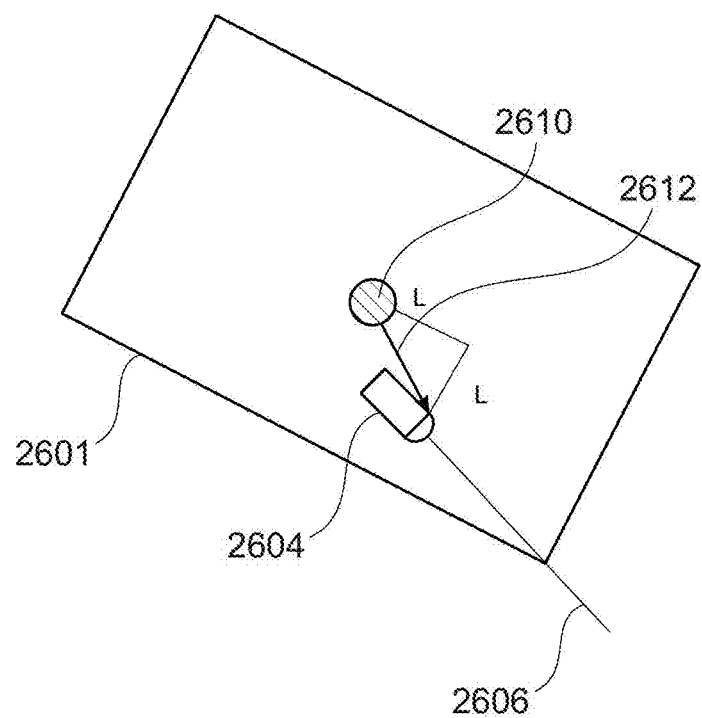
FIG. 26 shows another example of an arrangement of a beam emitter of the beam assembly of FIG. 24 relative to a reference location of the beam assembly.

However, in some implementations more complex 3D corrections involving a 3D ($d_L, r_L$) relative position of the beam emitter may be used, as depicted in FIG. 26. As shown therein, the beam emitter (e.g., laser) 2604 that emits a beam 2606 is displaced from the center location 2610 of the head 2601 by a relative displacement vector 2612. This relative displacement vector 2612 can be expressed by a distance $d_L$ along the main axis and a (radial) distance $r_L$ orthogonal to the main axis. In view thereof, it is proposed that the syntax structure should allow for a compact formulation in case the relative position is along the rotation axis, i.e., $r_L=0$, so that signaling $d_L$ instead of ($d_L$, $r_L$) would be sufficient, and/or in case the relative position is zero, i.e., $d_L=r_L=0$ and the beam emitter is actually located at the head position. The latter case may happen for some types of Lidars, or if a correction has already been applied during the processing of the raw Lidar data, or if the user does not know the relative positions of the beam emitter(s) and wants to put zero by default.

Concerning the angles of the beams, because compression algorithms may use the tangents of the angles instead of angles themselves, it may be advantageous to signal $\tan(\theta_L)$ instead of $\theta_L$ in the syntax in order to avoid the computation of trigonometric functions.

Finally, it may be advantageous to completely bypass the process of inferring information on the beam assembly from the bitstream, for example if the angular coding mode is not to be used or if information relating to the set of beams that has acquired the point cloud is not included in the bitstream.

Figure 27:
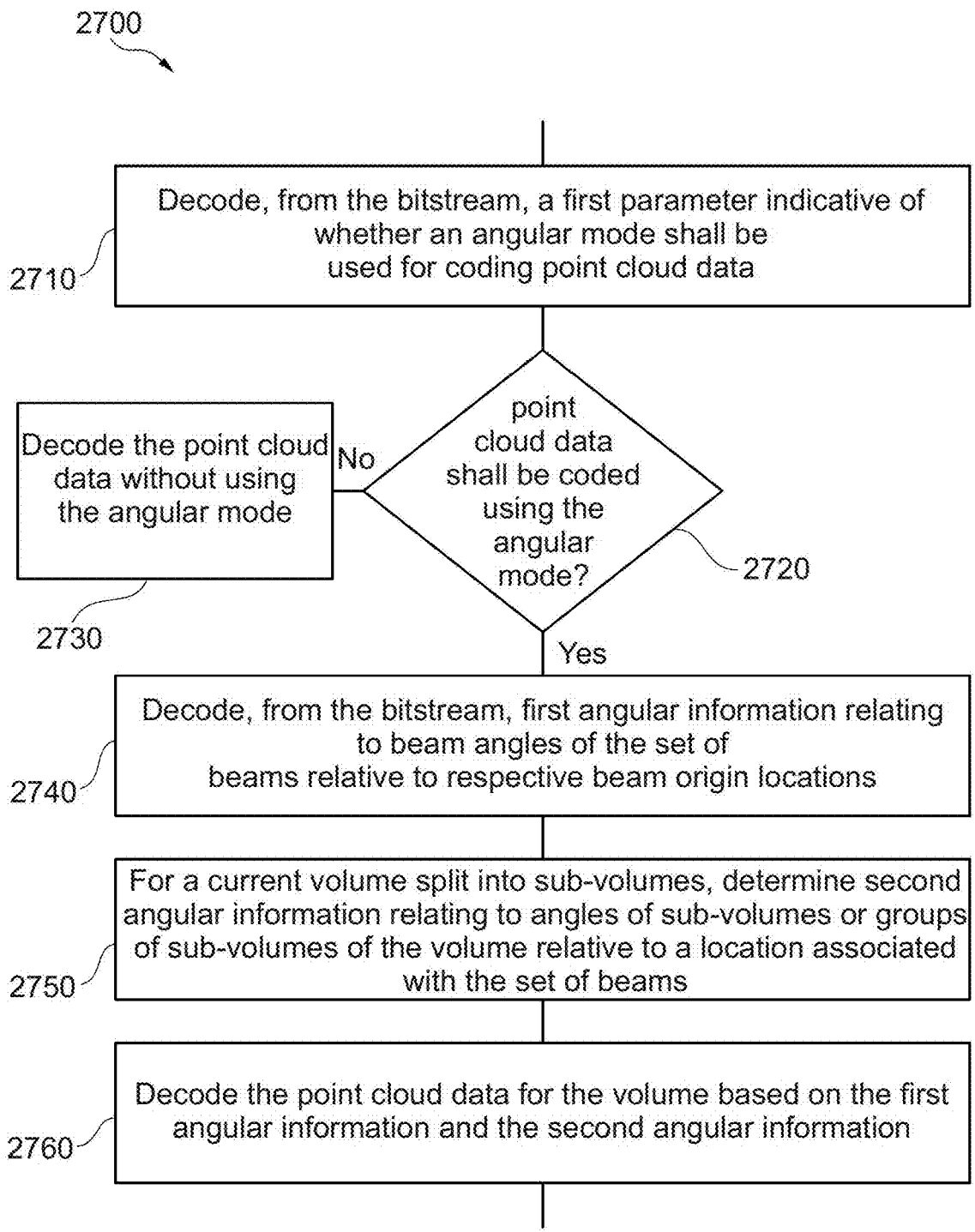
FIG. 27 shows, in flowchart form, one example method of decoding point cloud data from a bitstream based on syntax elements indicative of characteristics of a beam assembly that has acquired the point cloud.

A method 2700, proposed in view of the above considerations, is illustrated, in flowchart form, in FIG. 27. This method is a method of decoding a bitstream of compressed point cloud data to generate a reconstructed point cloud. The point cloud is assumed to have been acquired by means of a set of beams, for example by sampling (e.g., probing) one or more objects by means of the set of beams. Further, the point cloud is assumed to be located within a volumetric space recursively split into sub-volumes and containing points of the point cloud. Although this may be the case in some implementations, it is not strictly necessary that the point cloud data is defined in a tree structure (e.g., an octree).

In operation 2710, a first parameter indicative of whether an angular mode shall be used for coding point cloud data is decoded from the bitstream. One example of the first parameter is the angular_flag parameter defined below. In operation 2720, it is checked, based on the decoded first parameter, whether the point cloud data shall be coded using the angular mode. If so (Yes in operation 2720), the method proceeds to operation 2740. Otherwise (No in operation 2720), the method proceeds to operation 2730. In operation 2730, the point cloud data is decoded without using the angular mode, e.g., without using angular information. In operation 2740, first angular information relating to beam angles of the set of beams relative to respective beam origin locations is decoded from the bitstream. The first angular information may relate to parameters, flags, or other syntax elements that are included in the bitstream. In operation 2750, for a current volume split into sub-volumes, second angular information relating to angles of sub-volumes or groups of sub-volumes of the volume relative to a location associated with the set of beams is determined. This may proceed, for example, in the same or similar manner as in operation 2110 described above. All locations may be defined with respect to the volumetric space, such as with respect to a coordinate system of the volumetric space, for example. The location associated with the set of beams may be a reference location of the set of beams (e.g., a center location of a beam assembly), or one of the beam origin locations, for example. In operation 2760, the point cloud data for the volume is decoded based on the first angular information and the second angular information. This may involve selecting a context based on the first angular information and the second angular information and entropy decoding the point cloud data using the selected context. For example, the decoding may proceed in the same or similar manner as in operation 2130 described above. For certain applications, it is expected that the angular mode will be applied systematically (e.g., for certain automotive use cases), in which case the angular_flag may be omitted from the bitstream, and it will be inferred that the angular coding mode shall be used. In other applications, the opposite is expected, the angular mode will not be applied, in which case, the angular_flag may be omitted from the bitstream, and it will be inferred that the angular coding mode is not used. The understanding of the inference could be defined in a profile of a point cloud codec, for instance by describing which coding mode (and e.g. flags) is or is not used. Further, the angular mode may be dependent on a planar mode. If a profile or a planar mode flag indicates that planar coding mode shall not be used, it implies that the angular coding mode is also not used and related syntax elements are not present in the bitstream.

Figure 28:
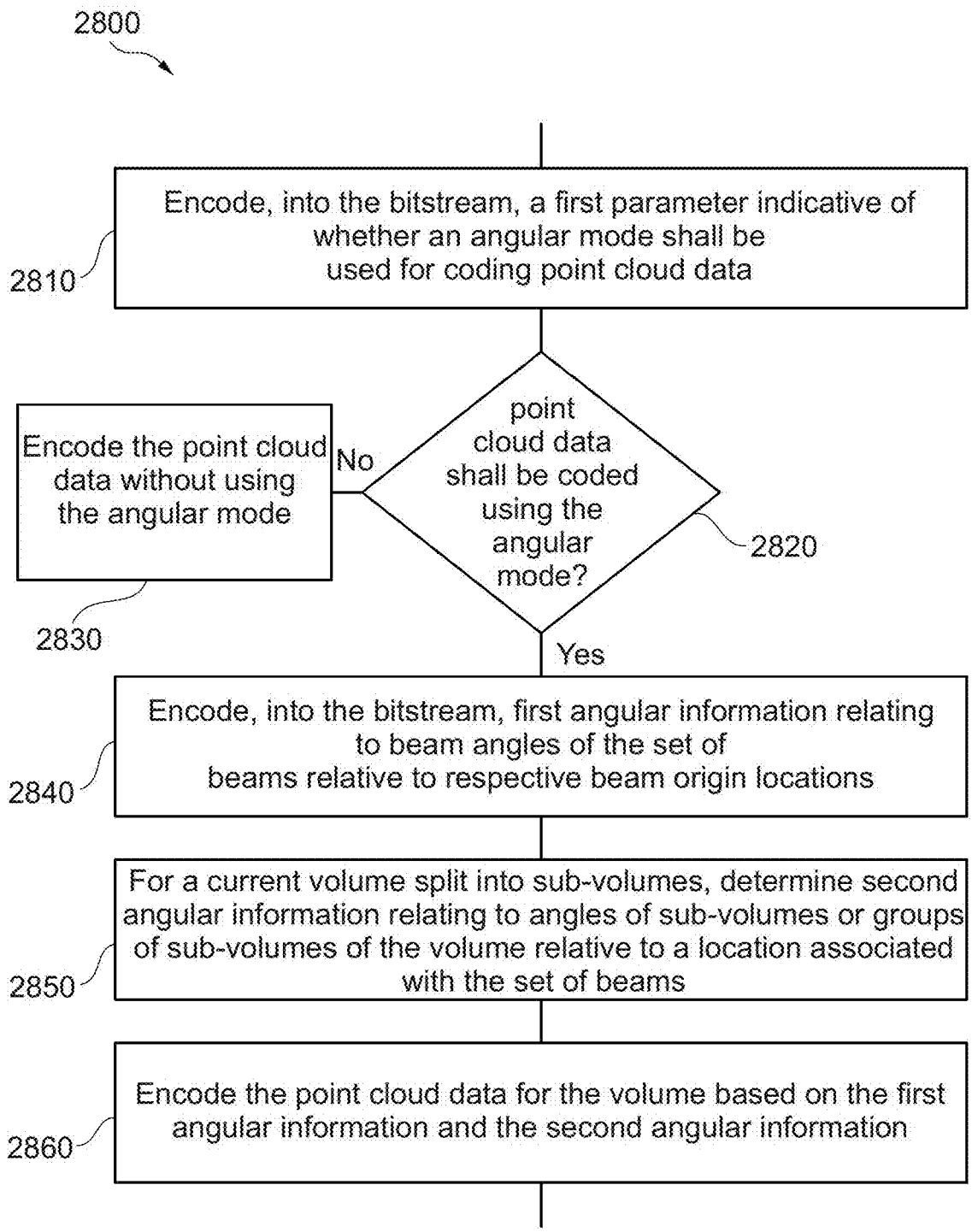
FIG. 28 shows, in flowchart form, one example method of encoding point cloud data into a bitstream along with syntax elements indicative of characteristics of a beam assembly that has acquired the point cloud.

Reference is now made to FIG. 28, which shows, in flowchart form, a corresponding method 2800 of encoding a point cloud acquired by means of a set of beams, to generate a bitstream of compressed point cloud data. It is understood that method 2800 is the counterpart method to method 2700 and mirrors respective operations of that method. Accordingly, also for encoding the point cloud is located within a volumetric space recursively split into sub-volumes and containing points of the point cloud.

In operation 2810, a first parameter indicative of whether an angular mode shall be used for coding point cloud data is encoded into the bitstream. In operation 2820 it is checked, based on the first parameter, whether the point cloud data shall be coded using the angular mode. If so (Yes in operation 2820), the method proceeds to operation 2840. Otherwise (No in operation 2820), the method proceeds to operation 2830. In operation 2830, the point cloud data is encoded without using the angular mode, e.g., without using angular information. In operation 2840, first angular information relating to beam angles of the set of beams relative to respective beam origin locations is encoded into the bitstream. In operation 2850, for a current volume split into sub-volumes, second angular information relating to angles of sub-volumes or groups of sub-volumes of the volume relative to a location associated with the set of beams is determined. In operation 2860, for the current volume, the point cloud data for the volume is encoded based on the first angular information and the second angular information. This may involve selecting a context based on the first angular information and the second angular information and entropy encoding the point cloud data using the selected context. For example, the encoding may proceed in the same or similar manner as in operation 2040 described above.

In view of the head (e.g., Lidar) and beam (e.g., laser) characteristics needed to compute corrected angles, the application further proposes the following implementation examples of operation 2740, i.e., decoding the first angular information from the bitstream.

In one implementation example, decoding the first angular information comprises, for a beam assembly (e.g., head) comprising at least some beams of the set of beams, decoding a second parameter from the bitstream that is indicative of a number of beams in the beam assembly. Based on this parameter, the number of beams in the beam assembly can be determined. Then, for each beam among the number of beams indicated by the second parameter, one or more third parameters are decoded that are indicative of the beam origin location of the respective beam. These steps may be performed for each of a plurality of beam assemblies that jointly provide the set of beams. The num_of_lasers parameter described below is an example of the second parameter.

At the encoder side, encoding the first angular information in this implementation example comprises encoding the second parameter that indicates the number of beams in the beam assembly, and for each beam, encoding one or more third parameters that indicate the beam origin location of the respective beam.

In the above implementation example, the one or more third parameters may comprise a parameter indicative of whether the beam origin location of the beam is expressed relative to a reference location of the beam assembly, a parameter indicative of a coordinate of the beam origin location of the beam along a main axis of the beam assembly, a parameter indicative of whether the beam origin location is (radially) displaced from the main axis of the beam assembly, and a parameter expressing a (radial) displacement of the beam origin location from the main axis of the beam assembly. The one or more third parameters may further comprise parameters indicating the main axis of the beam assembly.

Thus, in the present implementation example, decoding the one or more third parameters indicative of a beam origin location of the respective beam can comprise decoding a parameter indicative of whether the beam origin location of the beam is expressed relative to a reference location of the beam assembly. The laser_relative_position_to_head_flag described below is an example of this parameter. If the beam origin location of the beam is expressed relative to a reference location of the beam assembly, a parameter indicative of a coordinate of the beam origin location of the beam along a main axis of the beam assembly is decoded. The laser_relative_position_dL parameter described below is an example of this parameter. Further, a parameter indicative of whether the beam origin location is (radially) displaced from the main axis of the beam assembly is decoded. The relative_position_rL flag described below is an example of this parameter. Then, if the beam origin location is (radially) displaced from the main axis of the beam assembly, a parameter expressing a (radial) displacement of the beam origin location from the main axis of the beam assembly is decoded. The laser_relative_rL parameter described below is an example of this parameter.

At the encoder side, the above may correspond to encoding the parameter indicative of whether the beam origin location of the beam is expressed relative to a reference location of the beam assembly. If the beam origin location of the beam is expressed relative to a reference location of the beam assembly, the parameter indicative of a coordinate of the beam origin location of the beam along a main axis of the beam assembly is encoded into the bitstream. Further, a parameter indicative of whether the beam origin location is (radially) displaced from the main axis of the beam assembly is encoded into the bitstream. Then, if the beam origin location is (radially) displaced from the main axis of the beam assembly, the parameter expressing a (radial) displacement of the beam origin location from the main axis of the beam assembly is encoded into the bitstream.

In this implementation example, it may be further necessary to decode information for determining or inferring the reference location (e.g., center location) of the beam assembly and the orientation (e.g., main axis) of the beam assembly. This may proceed in the manner set out below for respective implementation examples.

In another implementation example that may be combined with the foregoing implementation example, decoding the first angular information may comprise decoding information (e.g., parameters) for inferring or determining the number of beam assemblies (e.g., heads) that constitute the set of beams. Accordingly, in this implementation example, decoding the first angular information comprises checking whether the bitstream comprises a fourth parameter indicative of a number of beam assemblies that each comprise at least some beams of the set of beams. If so, the fourth parameter is decoded from the bitstream. If the fourth parameter is not present in the bitstream or is equal to zero, it is inferred that the number of beam assemblies is one, i.e., that all beams in the set of beams are part of the same single beam assembly (e.g., head). On the other hand, if the fourth parameter is equal to one, a fifth parameter that is indicative of a number of beam assemblies minus two is decoded from the bitstream. The num_of_heads_flag described below is an example of the fourth parameter. The num_of_heads_minus2 parameter described below is an example of the fifth parameter.

At the encoder side, the above would amount to the following. If the number of beam assemblies is one, either encoding into the bitstream the fourth parameter with the appropriate value (e.g., bit value) indicating a single beam assembly, or not encoding the fourth parameter into the bitstream. If the number of beam assemblies is greater than one, the fourth parameter is encoded into the bitstream with the value not indicating a single beam assembly. Further, the fifth parameter indicating the number of beam assemblies minus two is encoded into the bitstream as well.

In another implementation example that may be combined with one or more of the above implementation examples, decoding the first angular information may comprise, for a beam assembly comprising at least some beams of the set of beams, decoding information (e.g., parameters) for inferring or determining the reference location (e.g., center location) for the beam assembly. Accordingly, in this implementation example, decoding the first angular information comprises, for a beam assembly comprising at least some beams of the set of beams, checking whether the bitstream comprises a sixth parameter indicative of whether a reference location of the beam assembly is at the origin O=(0,0,0) of the coordinate system of the volumetric space. If so, the sixth parameter is decoded from the bitstream. If the sixth parameter is not present in the bitstream or if the sixth parameter indicates that the reference location of the beam assembly is at the origin O of the coordinate system, the origin O of the coordinate system is taken as the reference location of the beam assembly. Otherwise, parameters indicating the coordinates of the reference location of the beam assembly are decoded from the bitstream. The head_absolute_is_000_flag described below is an example of the sixth parameter. The head_absolute_x, head_absolute_y, and head_absolute_z parameters described below are examples of the parameters indicating the coordinates of the reference location of the beam assembly.

At the encoder side, the above would amount to the following. If the reference location of the beam assembly is at the origin O of the coordinate system, the sixth parameter is encoded into the bitstream with the appropriate value (e.g., bit value) indicating this fact, or the sixth parameter is not encoded into the bitstream. If the reference location of the beam assembly is not at the origin O of the coordinate system, the sixth parameter is encoded into the bitstream with the appropriate value (e.g., bit value) indicating this fact, together with the parameters indicating the coordinates of the reference location of the beam assembly.

In another implementation example that may be combined with one or more of the above implementation examples, decoding the first angular information may comprise, for a beam assembly comprising at least some beams of the set of beams, decoding information (e.g., parameters) for inferring or determining the orientation (e.g., main axis) of the beam assembly. Accordingly, in this implementation example, decoding the first angular information comprises, for a beam assembly comprising at least some beams of the set of beams, decoding a seventh parameter from the bitstream that is indicative of whether a main axis of the beam assembly is arranged along a coordinate axis of the volumetric space. If the seventh parameter indicates that the main axis of the beam assembly is arranged along a coordinate axis of the volumetric space, a parameter indicative of the specific coordinate axis that the main axis of the beam assembly is arranged along to is decoded from the bitstream. This specific coordinate axis is then taken as the (orientation of the) main axis of the beam assembly. In particular, the main axis may be taken to be in parallel to the specific coordinate axis and running through the reference location (e.g., center location) of the beam assembly. Otherwise, If the seventh parameter indicates that the main axis of the beam assembly is not arranged along a coordinate axis of the volumetric space, parameters indicative of angles expressing an orientation of the main axis of the beam assembly are decoded from the bitstream and the main axis of the beam assembly is determined based on these parameters. The head_parallel_to_axis_flag described below is an example of the seventh parameter. The axis_index parameter described below is an example of the parameter indicative of the specific coordinate axis that the main axis of the beam assembly is arranged along to. Finally, the head_orientation_phi and head_orientation_theta parameters described below are examples of the parameters indicative of angles expressing the orientation of the main axis. If the seventh parameter is not present in the bitstream, it is inferred that the main axis of the beam assembly is arranged along a coordinate axis of the volumetric space.

At the encoder side, the above would amount to the following. If the main axis of the beam assembly is arranged along a coordinate axis of the volumetric space, the seventh parameter is encoded into the bitstream with an appropriate value (e.g., bit value) indicating this fact. Further, the parameter indicative of the specific coordinate axis that the main axis of the beam assembly is arranged along to is encoded into the bitstream as well. Otherwise, if the main axis of the beam assembly is not arranged along a coordinate axis of the volumetric space, the seventh parameter is encoded into the bitstream with a value (e.g., bit value) indicating this fact. Further, the parameters indicative of angles expressing an orientation of the main axis of the beam assembly are encoded into the bitstream as well. Alternatively, when the main axis of the beam assembly is arranged along a coordinate axis of the volumetric space, only the parameter indicative of the specific coordinate axis that the main axis of the beam assembly is encoded into the bitstream.

In another implementation example that may be combined with one or more of the above implementation examples, decoding the first angular information may comprise, for a beam assembly comprising at least some beams of the set of beams, decoding information (e.g., parameters) for inferring or determining the beam angles of the beams provided by the beam assembly. Accordingly, in this implementation example, decoding the first angular information may comprise, for a beam assembly comprising at least some beams of the set of beams, decoding an eighth parameter from the bitstream that is indicative of a number of beams in the beam assembly. The number of beams in the beam assembly is then determined based on the eighth parameter. For each beam among the number of beams in the beam assembly, one or more ninth parameters are decoded from the bitstream that are indicative of a beam angle of the respective beam. The num_of_lasers parameter described below is an example of the eighth parameter.

At the encoder side, the above would amount to the following. An eighth parameter is encoded into the bitstream to indicate the number of beams in the beam assembly. For each beam among the number of beams in the beam assembly, one or more ninth parameters are then encoded into the bitstream to indicate a beam angle of the respective beam.

In the present implementation example, decoding the one or more ninth parameters indicative of a beam angle of the respective beam may comprise decoding a parameter indicative of whether the beam angle is expressed as a tangent of an angle, followed by decoding a parameter expressing the beam angle. The angle_is_tangent_flag described below is an example of the parameter indicative of whether the beam angle is expressed as a tangent of an angle. The laser_angle parameter described below is an example of the parameter expressing the beam angle.

At the encoder side, this would amount to encoding the parameter indicative of whether the beam angle is expressed as a tangent of an angle with an appropriate value (e.g., bit value) indicating this fact into the bitstream if the beam angle is expressed as a tangent, followed by encoding a parameter expressing the beam angle. It may be beneficial to encode directly the parameter expressing the beam angle, in which case the beam angle parameter represents an angle.

Also, for the present embodiments, using the angular information for coding point cloud data for the current volume may be made conditional upon whether the volume is angular eligible. Accordingly, methods 2700 and/or 2800 may comprise a step of first determining whether (or that) the volume is eligible for coding the point cloud data for the volume based on the first angular information and the second angular information. This may involve, for a beam assembly comprising at least some beams of the set of beams, determining a measure of an angular size of the volume as seen from a reference location of the beam assembly. The determined measure of angular size is compared to a measure of a difference angle between angles of adjacent beams of the beam assembly (e.g., the smallest difference angle between any pair of beams). The actual determination of whether (or that) the volume is eligible for decoding the point cloud data for the volume based on the first angular information and the second angular information can then be performed based on a result of the comparison. In general, this may proceed in the same or similar manner as the determination of angular eligibility described above with reference to FIG. 19.

As noted above, determining the second angular information in operation 2750 may proceed in the same or similar manner as in operation 2110 described above. Likewise, determining the second angular information in operation 2850 may proceed in the same or similar manner as in operation 2020 described above. Accordingly, determining the second angular information may comprise determining a first angle for a reference location within the volume relative to a reference location of a beam assembly comprising at least some beams of the set of beams. The reference location within the volume may be the center location of the volume, for example. The reference location of the beam assembly may be the center location of the rotating beam assembly, for example. This reference location may be determined for example based on the first angular information described above. Based on the first elevation angle, a specific beam of the beam assembly is determined that is assumed to have acquired the points within the volume. For this specific beam, the beam origin location is determined, for example based on the first angular information described above. The beam origin location of the specific rotating beam may then serve as the location associated with the beam assembly as defined in operation 2750 or operation 2850. Finally, the angles of sub-volumes or groups of sub-volumes of the volume relative to the beam origin location of the specific beam are determined based on the beam origin location. In general, this may proceed in the same or similar manner as the correction of angles described above.

In view of the aforementioned requirements for computing corrected angles, the syntax described in Table 1 and Table 2 below is proposed. It ensures that the syntax is compact for the simplest case of a head located at the origin O and parallel to one of the xyz axes. It also ensues a compact syntax for beams that do not need relative position correction or only a correction along the main axis (e.g., head rotation axis). In the tables below, u(n) indicates an unsigned integer using n bits and s(n) indicates a signed integer using n bits. It has been observed that 3 bits of decimal precision for the relative positions ($d_L$, $r_L$) and 18 bits of decimal precision for the angle $\theta_L$ or the tangent tan ($\theta_L$) is sufficient to obtain optimal compression performance when using beam angles.

TABLE 1

| | |
|---|---|
| num_of_heads | u(4) |
| for each head { | |
|   head_absolute_is_000_flag | u(1) |
|   if (!head_absolute_is_000_flag) | |
|     head_absolute_x | s(32) |
|     head_absolute_y | s(32) |
|     head_absolute_z | s(32) |
|   } | |
|   head_parallel_to_axis_flag | u(1) |
|   if (head_parallel_to_axis_flag) | |
|     axis_index | u(2) |
|   else { | |
|     head_orientation_phi | u(32) |
|     head_orientation_theta | u(32) |
|   } | |
|   num_of_lasers | u(10) |
|   for each laser { | |
|     angle_is_tangent_flag | u(1) |
|     laser_angle | s(32) |
|     laser_relative_position_to_head_flag | u(1) |
|     if (laser_relative_position_to_head_flag) { | |
|       laser_relative_position_dL | s(16) |
|       relative_position_rL_flag | u(1) |
|       if (relative_position_rL_flag) | |
|         laser_position_relative_rL | s(16) |
|       } | |
|     } // end relative position | |
|   } // end laser | |
| } // end head | |

An alternative syntax with additional flags would allow to completely bypass the angular process, or infer a few more values for some of the syntax elements. An example of such syntax is shown in Table 2 below.

TABLE 2

| | |
|---|---|
| angular_flag | u(1) |
| if(angular_flag) { | |
|   num_of_heads_flag | u(1) |
|   if (num_of_heads_flag) // if not num_of_heads inferred to 1 | |
|     num_of_heads_minus2 | u(8) |
|   for each head { | |
|     head_absolute_is_000_flag | u(1) |
|     if (!head_absolute_is_000_flag) | |
|       head_absolute_x | s(32) |

TABLE 2-continued

| | |
|---|---|
|       head_absolute_y | s(32) |
|       head_absolute_z | s(32) |
|     } | |
|     head_parallel_to_axis_flag | u(1) |
|     if (head_parallel_to_axis_flag) | |
|       axis_index | u(2) |
|     else { | |
|       head_orientation_phi | u(32) |
|       head_orientation_theta | u(32) |
|     } | |
|     num_of_lasers | u(10) |
|     for each laser { | |
|       angle_is_tangent_flag | u(1) |
|       laser_angle | s(32) |
|       laser_relative_position_to_head_flag | u(1) |
|       if (laser_relative_position_to_head_flag) { | |
|         laser_relative_position_dL | s(16) |
|         relative_position_rL_flag | u(1) |
|         if (relative_position_rL_flag) | |
|           laser_relative_position_rL | s(16) |
|         } | |
|       } // end relative position | |
|     } // end laser | |
|   } // end head | |
| } // end angular | |

The information signaled in the proposed syntax does depend on the beam assembly's (e.g., Lidar's) physical characteristics and the position/orientation of the beam assembly in the scene represented by the point cloud (e.g., in the volumetric space containing the point cloud). However, it does not depend on the local structure of the point cloud. Therefore, the proposed syntax can be a high-level syntax put at frame or sequence level. In practical examples, the proposed syntax may be put in
  the Geometry Parameter Set (gps)
  the Sequence Parameter Set (sps)
  the Geometry Slice Header
  an SEI message sent out of band
Additionally, these syntax elements can be placed in any high-level syntax and header such as the equivalent of a video parameter set (as in, for example, Versatile Video Coding, the new MPEG video codec following HEVC), a frame header or future sensor parameter set, for example.

Next, an example of semantics to be used for the proposed syntax (e.g., used in the above tables) will be described.

angular_flag equal to 0 indicates that heads and beams (e.g., lasers) information is not present in the syntax. The angular_flag is an example of the first parameter defined above. Angular_flag equal to 1 may indicate that heads and beams information is present in the syntax. When equal to 0, the coding method for the node (e.g., volume) does not use angular information.

num_of_heads_flag equal to 0 indicates that the number of (Lidar's) heads is inferred to be one. If num_of_heads_flag equal to 1, it indicates that num_of_heads_minus2 is present in the syntax, and the number of Lidars/heads is equal to num_of_heads_minus2+2. When not present in the bitstream, the number of Lidars/heads is inferred to be one.

head_absolute_is_000_flag equal to 1 indicates that the head absolute position is inferred to be x=y=z=0. When head_absolute_is_000_flag is equal to 0, it indicates that head_absolute_x, head_absolute_y and head_absolute_z are present in the bitstream to signal the absolute head position. When head_absolute_is_000_flag is not present in the bitstream, it may be inferred that the head absolute position is x=y=z=0. Absolute is understood as the coordinates in the xyz coordinate system in which the point cloud is represented.

head_absolute_x indicates the absolute position on the x axis of the head (capturing device) on, for example, 32-bit signed integer with 3 bits of decimal precision, such that the x absolute position of the head is head_absolute_x/8.

head_absolute_y indicates the absolute position on the y axis of the head (capturing device) on, for example, 32-bit signed integer with 3 bits of decimal precision, such that the y absolute position of the head is head_absolute_y/8.

head_absolute_z indicates the absolute position on the z axis of the head (capturing device) on, for example, 32-bit signed integer with 3 bits of decimal precision, such that the z absolute position of the head is head_absolute_z/8.

head_parallel_to_axis_flag equal to 1 indicates that the head is oriented parallel to an axis. In this case, axis_index is present in the stream. head_parallel_to_axis_flag equal to 0 indicates that the head is not oriented parallel to an axis, and in this case head_orientation_phi and head_orientation_theta are present in the stream instead of axis_index. If head_parallel_to_axis_flag is not present in the bitstream, it is inferred to be equal to 1.

axis_index indicates which axis the head is parallel to. For example, axis_index equal to 0 indicates that the head is oriented parallel to the x axis, equal to 1 indicates that the head is oriented parallel to the y axis, and equal to 2 indicates that the head is oriented parallel to the z axis.

head_orientation_phi and head_orientation_theta indicate the orientation of the head in spherical coordinates. For example, head_orientation_phi is the azimuthal angle in the xy plane, and head_orientation_theta is the polar angle relative to the z axis. Both may be signed 32-bit integers with 18 bits of decimal precision.

num_of_lasers specifies the number of lasers (or beams) for a given head. It may be a 10-bit integer in the range of 1 to 1023.

angle_is_tangent_flag equal to 1 indicates that the information provided by laser_angle is the tangent of an angle. angle_is_tangent_flag equal to 0 indicates that the information provided by laser_angle is an angle. When not present in the bitstream, the angle_is_tangent_flag is inferred to be equal to 1 laser_angle is the (tangent of) the angle associated with a given laser. This is the elevation angle relative to the plane perpendicular to the head direction and to which the laser (or beam emitter) position belongs. It may be a signed 32-bit integer with 18 bits of decimal precision.

laser_relative_position_to_head_flag equal to 0 indicates that the laser/beam emitter position is the same as the head absolute position. laser_relative_position_to_head_flag equal to 1 indicates that the laser/beam emitter position is not the same as the head absolute position; in this case laser_relative_position_dL and relative_position_rL_flag are present in the bitstream. When laser_relative_position_to_head_flag is not present in the bitstream, it is inferred to be equal to 0.

laser_relative_position_dL indicates the position of the laser (beam emitter) relative to the head absolute position along the direction of orientation of the head. It may be a 16-bit signed integer with 3 bits of decimal precision.

relative_position_rL_flag equal to 0 indicates that laser_relative_rL is not present in the bitstream and is inferred to 0. relative_position_rL_flag equal to 1 indicates that laser_relative_rL is present in the bitstream. When relative_position_rL_flag is not present in the bitstream, it is inferred to be equal to 0.

laser_relative_rL indicates the (radial) distance of the laser (beam emitter) from the line parallel to the direction of orientation of the head passing by the head absolute position. It may be a 16-bit signed integer with 3 bits of decimal precision.

Figure 30:
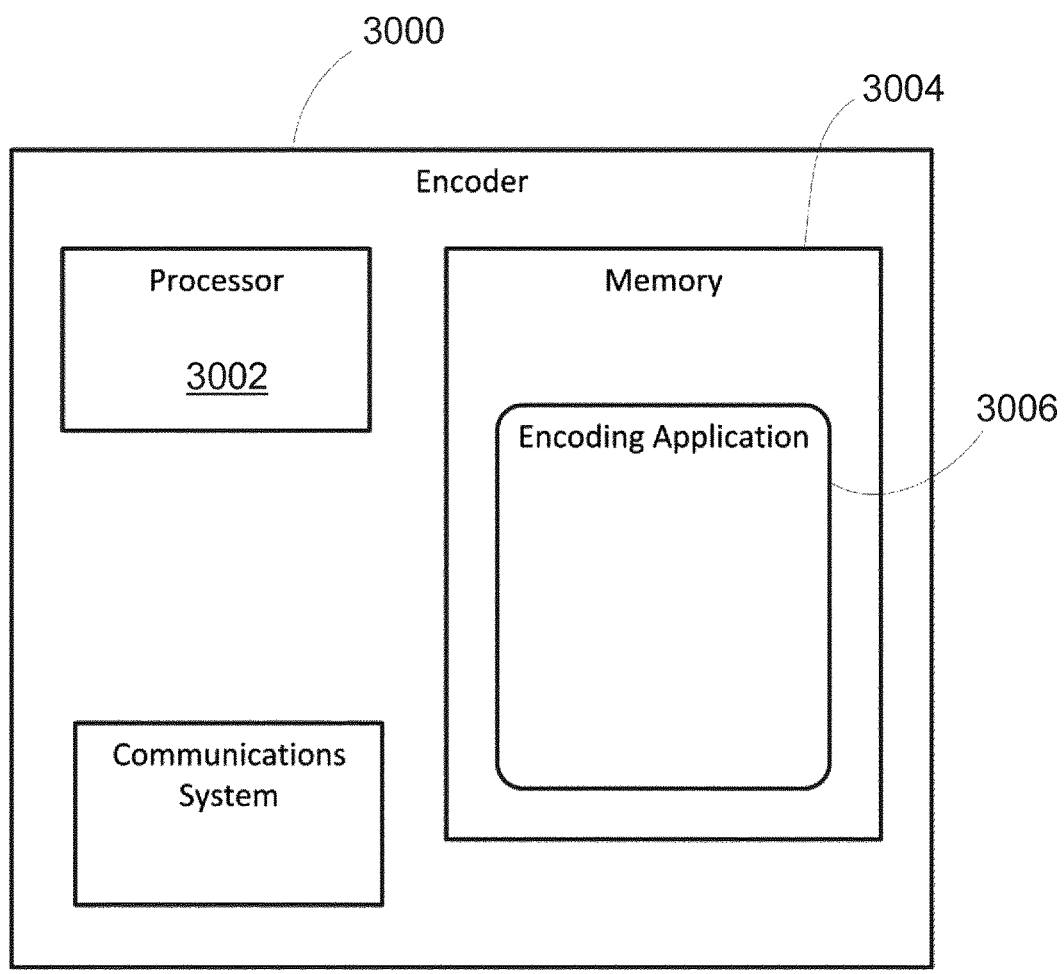
FIG. 30 shows an example simplified block diagram of an encoder.

Reference is now made to FIG. 30, which shows a simplified block diagram of an example embodiment of an encoder 3000. The encoder 3000 includes a processor 3002, memory 3004, and an encoding application 3006. The encoding application 3006 may include a computer program or application stored in memory 3004 and containing instructions that, when executed, cause the processor 3002 to perform operations such as those described herein. For example, the encoding application 3006 may encode and output bitstreams encoded in accordance with the processes described herein. It will be understood that the encoding application 3006 may be stored on a non-transitory computer-readable medium, such as a compact disc, flash memory device, random access memory, hard drive, etc. When the instructions are executed, the processor 3002 carries out the operations and functions specified in the instructions so as to operate as a special-purpose processor that implements the described process(es). Such a processor may be referred to as a "processor circuit" or "processor circuitry" in some examples.

Figure 31:
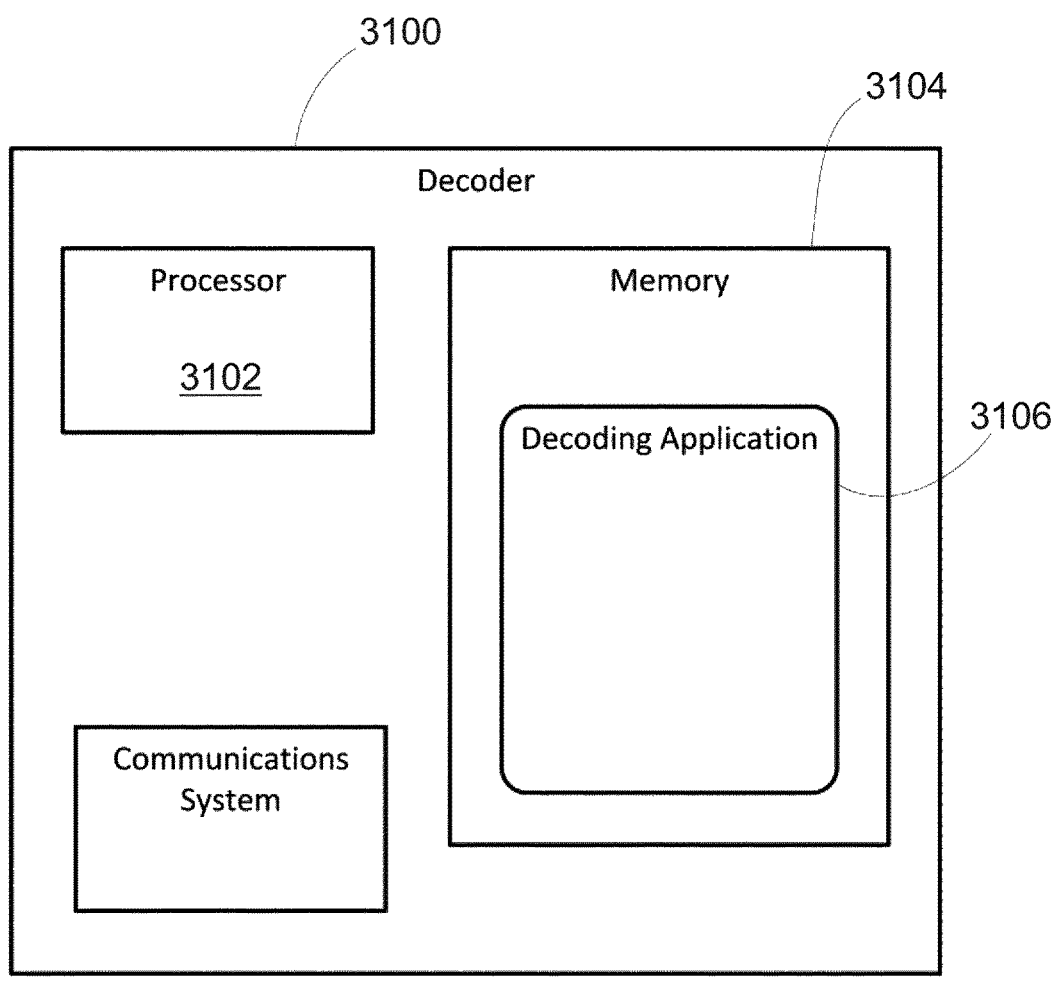
FIG. 31 shows an example simplified block diagram of a decoder.

Reference is now also made to FIG. 31, which shows a simplified block diagram of an example embodiment of a decoder 3100. The decoder 3100 includes a processor 3102, a memory 3104, and a decoding application 3106. The decoding application 3106 may include a computer program or application stored in memory 3104 and containing instructions that, when executed, cause the processor 3102 to perform operations such as those described herein. It will be understood that the decoding application 3106 may be stored on a computer-readable medium, such as a compact disc, flash memory device, random access memory, hard drive, etc. When the instructions are executed, the processor 3102 carries out the operations and functions specified in the instructions so as to operate as a special-purpose processor that implements the described process(es). Such a processor may be referred to as a "processor circuit" or "processor circuitry" in some examples.

It will be appreciated that the decoder and/or encoder according to the present application may be implemented in a number of computing devices, including, without limitation, servers, suitably-programmed general purpose computers, machine vision systems, and mobile devices. The decoder or encoder may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the decoder and/or encoder described herein and the module, routine, process, thread, or other software component implementing the described method/process for configuring the encoder or decoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

The present application also provides for a computer-readable signal encoding the data produced through application of an encoding process in accordance with the present application.

Impact on Compression Performance

Testing using planar mode in the three directions x, y and z with an example implementation has been carried out with a number of example point clouds having different characteristics and in comparison with a current implementation of the Motion Picture Experts Group (MPEG) Test Model. The different types of point clouds used in experimentation include those relating to outdoor scenes involving urban building environments, indoor building environments, 3D maps, LiDAR roadway scans, and natural landscapes. Negligible to modest compression gains are seen in the case of natural landscapes. Compression gains of 2 to 4% are seen in the case of 3D maps, up to 10% in the case of outdoor building scenes, 6 to 9% in the case of LiDAR data, and up to more than 50% in the case of some indoor building scenes.

It has further been observed that the angular mode provides extra gains of more than 15% for lossless coding and 5-8% for lossy coding compared to the planar mode only. The combination of planar+angular provides gains of 22-24% (lossless) and 11-17% (lossy) compared to the MPEG Test Model.

It has yet further been observed that using the angular mode with a tree constructed such that the volumes associated with the nodes of tree have a typical ratio H/W, height over radial width, being a least 4 provides even more extra gains of about 5% compared to the angular mode using a cubic octree partitioning having ratio H/W=1 for all volumes associated with the nodes of the octree.

Certain adaptations and modifications of the described embodiments can be made. Therefore, the above discussed embodiments are considered to be illustrative and not restrictive.

What is claimed is:

1. A method of decoding a bitstream of compressed point cloud data to generate a reconstructed point cloud, the point cloud having been acquired by means of a set of beams, the point cloud being located within a volumetric space recursively split into sub-volumes and containing points of the point cloud, the method comprising:
    decoding, from the bitstream, a first parameter indicative of whether an angular mode shall be used for coding point cloud data; and
    if the first parameter indicates that point cloud data shall be coded using the angular mode:
    decoding, from the bitstream, first angular information relating to beam angles of the set of beams relative to respective beam origin locations; and
    for a current volume split into sub-volumes:
    determining second angular information relating to angles of sub-volumes or groups of sub-volumes of the volume relative to a location associated with the set of beams; and
    decoding the point cloud data for the volume based on the first angular information and the second angular information by selecting a context based on the first angular information and the second angular information and entropy decoding the point cloud data using the selected context, the method further comprising first determining that the volume is eligible for decoding the point cloud data for the volume based on the first angular information and the second angular information by, for a beam assembly comprising at least some beams of the set of beams:
    determining a measure of an angular size of the volume as seen from a reference location of the beam assembly;
    comparing the measure of the angular size to a measure of a difference angle between angles of adjacent beams of the beam assembly; and
    determining that the volume is eligible for decoding the point cloud data for the volume based on the first angular information and the second angular information based on a result of the comparison.

2. The method according to claim 1, wherein decoding the first angular information comprises, for a beam assembly comprising at least some beams of the set of beams:
    decoding, from the bitstream, a second parameter indicative of a number of beams in the beam assembly and determining the number of beams in the beam assembly based on the second parameter;
    for each beam among the number of beams indicated by the second parameter, decoding, from the bitstream, one or more third parameters indicative of the beam origin location of the respective beam.

3. The method according to claim 2, wherein decoding the one or more third parameters indicative of a beam origin location of the respective beam comprises:
    decoding a parameter indicative of whether the beam origin location of the beam is expressed relative to a reference location of the beam assembly; and
    if the beam origin location of the beam is expressed relative to a reference location of the beam assembly:
    decoding a parameter indicative of a coordinate of the beam origin location of the beam along a main axis of the beam assembly;
    decoding a parameter indicative of whether the beam origin location is displaced from the main axis of the beam assembly; and
    if the beam origin location is displaced from the main axis of the beam assembly, decoding a parameter expressing a displacement of the beam origin location from the main axis of the beam assembly.

4. The method according claim 1, wherein decoding the first angular information comprises:
    checking whether the bitstream comprises a fourth parameter indicative of a number of beam assemblies that each comprise at least some beams of the set of beams, and if so, decoding the fourth parameter from the bitstream;
    if the fourth parameter is not present or is equal to zero, inferring the number of beam assemblies to be one;
    if the fourth parameter is equal to one, decoding a fifth parameter that is indicative of a number of beam assemblies minus two.

5. The method according to claim 1, wherein decoding the first angular information comprises, for a beam assembly comprising at least some beams of the set of beams:
    checking whether the bitstream comprises a sixth parameter indicative of whether a reference location of the beam assembly is at the origin of a coordinate system of the volumetric space, and if so, decoding the sixth parameter;
    if the sixth parameter is not present in the bitstream or if the sixth parameter indicates that the reference location of the beam assembly is at the origin of the coordinate system, taking the origin of the coordinate system as the reference location of the beam assembly; and
    otherwise decoding, from the bitstream, parameters indicating the coordinates of the reference location of the beam assembly.

6. The method according to claim 1, wherein decoding the first angular information comprises, for a beam assembly comprising at least some beams of the set of beams:

decoding, from the bitstream, a seventh parameter indicative of whether a main axis of the beam assembly is arranged along a coordinate axis of the volumetric space;

if the seventh parameter indicates that the main axis of the beam assembly is arranged along a coordinate axis of the volumetric space, decoding a parameter indicative of the specific coordinate axis that the main axis of the beam assembly is arranged along to, and taking the specific coordinate axis as the main axis of the beam assembly; and otherwise, decoding parameters indicative of angles expressing an orientation of the main axis of the beam assembly and determining the main axis of the beam assembly based on these parameters.

7. The method according to claim 1, wherein decoding the first angular information comprises, for a beam assembly comprising at least some beams of the set of beams:

decoding, from the bitstream, an eighth parameter indicative of a number of beams in the beam assembly and determining the number of beams in the beam assembly based on the eighth parameter; and for each beam among the number of beams in the beam assembly, decoding, from the bitstream, one or more ninth parameters indicative of a beam angle of the respective beam.

8. The method according to claim 7, wherein decoding the one or more ninth parameters indicative of a beam angle of the respective beam comprises:

decoding a parameter indicative of whether the beam angle is expressed as a tangent of an angle; and decoding a parameter expressing the beam angle.

9. The method according to claim 1, wherein determining the second angular information comprises:

determining a first angle for a reference location within the volume relative to a reference location of a beam assembly comprising at least some beams of the set of beams;

determining a specific beam of the beam assembly that is assumed to have acquired the points within the volume, based on the first elevation angle;

determining a beam origin location of the specific beam; and determining the angles of sub-volumes or groups of sub-volumes of the volume relative to the beam origin location of the specific beam.

10. A decoder for decoding a bitstream of compressed point cloud data to produce a reconstructed point cloud, the point cloud having been acquired by means of a set of beams, the point cloud being located within a volumetric space recursively split into sub-volumes and containing the points of the point cloud, the decoder comprising:

a processor;

a memory; and a decoding application containing instructions executable by the processor that, when executed, cause the processor to:

decode, from the bitstream, a first parameter indicative of whether an angular mode shall be used for coding point cloud data; and when the first parameter indicates that point cloud data shall be coded using the angular mode:

decode, from the bitstream, first angular information relating to beam angles of the set of beams relative to respective beam origin locations; and for a current volume split into sub-volumes:

determine second angular information relating to angles of sub-volumes or groups of sub-volumes of the volume relative to a location associated with the set of beams; and decode the point cloud data for the volume based on the first angular information and the second angular information by selecting a context based on the first angular information and the second angular information and entropy decoding the point cloud data using the selected context, the instructions further comprising first determining that the volume is eligible for decoding the point cloud data for the volume based on the first angular information and the second angular information by, for a beam assembly comprising at least some beams of the set of beams:

determining a measure of an angular size of the volume as seen from a reference location of the beam assembly;

comparing the measure of the angular size to a measure of a difference angle between angles of adjacent beams of the beam assembly; and determining that the volume is eligible for decoding the point cloud data for the volume based on the first angular information and the second angular information based on a result of the comparison.

11. The decoder according to claim 10, wherein the instructions, when executed, are to cause the processor to decode the first angular information by, for a beam assembly comprising at least some beams of the set of beams:

decoding, from the bitstream, a second parameter indicative of a number of beams in the beam assembly and determining the number of beams in the beam assembly based on the second parameter;

for each beam among the number of beams indicated by the second parameter, decoding, from the bitstream, one or more third parameters indicative of the beam origin location of the respective beam.

12. The decoder according to claim 11, wherein decoding the one or more third parameters indicative of a beam origin location of the respective beam comprises:

decoding a parameter indicative of whether the beam origin location of the beam is expressed relative to a reference location of the beam assembly; and if the beam origin location of the beam is expressed relative to a reference location of the beam assembly:

decoding a parameter indicative of a coordinate of the beam origin location of the beam along a main axis of the beam assembly;

decoding a parameter indicative of whether the beam origin location is displaced from the main axis of the beam assembly; and if the beam origin location is displaced from the main axis of the beam assembly, decoding a parameter expressing a displacement of the beam origin location from the main axis of the beam assembly.

13. The decoder according to claim 10, wherein the instructions, when executed, are to cause the processor to decode the first angular information by:

checking whether the bitstream comprises a fourth parameter indicative of a number of beam assemblies that each comprise at least some beams of the set of beams, and if so, decoding the fourth parameter from the bitstream;

if the fourth parameter is not present or is equal to zero, inferring the number of beam assemblies to be one;

if the fourth parameter is equal to one, decoding a fifth parameter that is indicative of a number of beam assemblies minus two.

14. The decoder according to claim 10, wherein the instructions, when executed, are to cause the processor to decode the first angular information by, for a beam assembly comprising at least some beams of the set of beams:
checking whether the bitstream comprises a sixth parameter indicative of whether a reference location of the beam assembly is at the origin of a coordinate system of the volumetric space, and if so, decoding the sixth parameter;
if the sixth parameter is not present in the bitstream or if the sixth parameter indicates that the reference location of the beam assembly is at the origin of the coordinate system, taking the origin of the coordinate system as the reference location of the beam assembly; and
otherwise decoding, from the bitstream, parameters indicating the coordinates of the reference location of the beam assembly.

15. The decoder according to claim 10, wherein the instructions, when executed, are to cause the processor to decode the first angular information by, for a beam assembly comprising at least some beams of the set of beams:
decoding, from the bitstream, a seventh parameter indicative of whether a main axis of the beam assembly is arranged along a coordinate axis of the volumetric space;
if the seventh parameter indicates that the main axis of the beam assembly is arranged along a coordinate axis of the volumetric space, decoding a parameter indicative of the specific coordinate axis that the main axis of the beam assembly is arranged along to, and taking the specific coordinate axis as the main axis of the beam assembly; and
otherwise, decoding parameters indicative of angles expressing an orientation of the main axis of the beam assembly and determining the main axis of the beam assembly based on these parameters.

16. The decoder according to claim 10, wherein the instructions, when executed, are to cause the processor to decode the first angular information by, for a beam assembly comprising at least some beams of the set of beams:
decoding, from the bitstream, an eighth parameter indicative of a number of beams in the beam assembly and determining the number of beams in the beam assembly based on the eighth parameter; and
for each beam among the number of beams in the beam assembly, decoding, from the bitstream, one or more ninth parameters indicative of a beam angle of the respective beam.

17. A non-transitory processor-readable medium storing processor-executable instructions for decoding a bitstream of compressed point cloud data to produce a reconstructed point cloud, the point cloud having been acquired by means of a set of beams, the point cloud being located within a volumetric space recursively split into sub-volumes and containing the points of the point cloud, wherein the instructions, when executed by a processor, cause the processor to:
decode, from the bitstream, a first parameter indicative of whether an angular mode shall be used for coding point cloud data; and
when the first parameter indicates that point cloud data shall be coded using the angular mode:
decode, from the bitstream, first angular information relating to beam angles of the set of beams relative to respective beam origin locations; and
for a current volume split into sub-volumes:
determine second angular information relating to angles of sub-volumes or groups of sub-volumes of the volume relative to a location associated with the set of beams; and
decode the point cloud data for the volume based on the first angular information and the second angular information by selecting a context based on the first angular information and the second angular information and entropy decoding the point cloud data using the selected context, the instructions further comprising first determining that the volume is eligible for decoding the point cloud data for the volume based on the first angular information and the second angular information by, for a beam assembly comprising at least some beams of the set of beams:
determining a measure of an angular size of the volume as seen from a reference location of the beam assembly;
comparing the measure of the angular size to a measure of a difference angle between angles of adjacent beams of the beam assembly; and
determining that the volume is eligible for decoding the point cloud data for the volume based on the first angular information and the second angular information based on a result of the comparison.

* * * * *